J. W. DARLEY, Jr.
BUTTON SEWING MACHINE.
APPLICATION FILED JUNE 28, 1918.

1,336,346.

Patented Apr. 6, 1920.
23 SHEETS—SHEET 3.

Fig. 3.

Inventor
John W. Darley Jr.

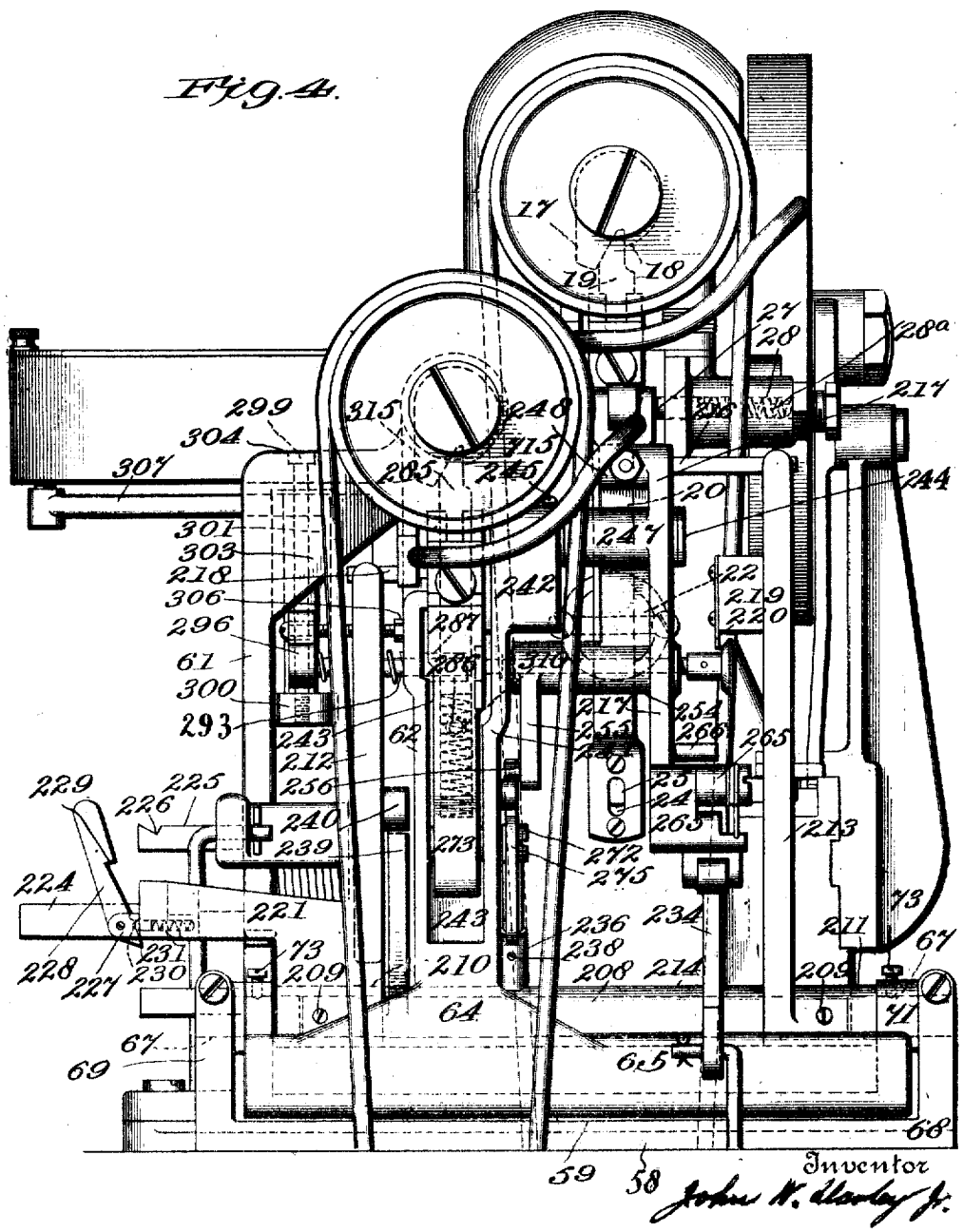

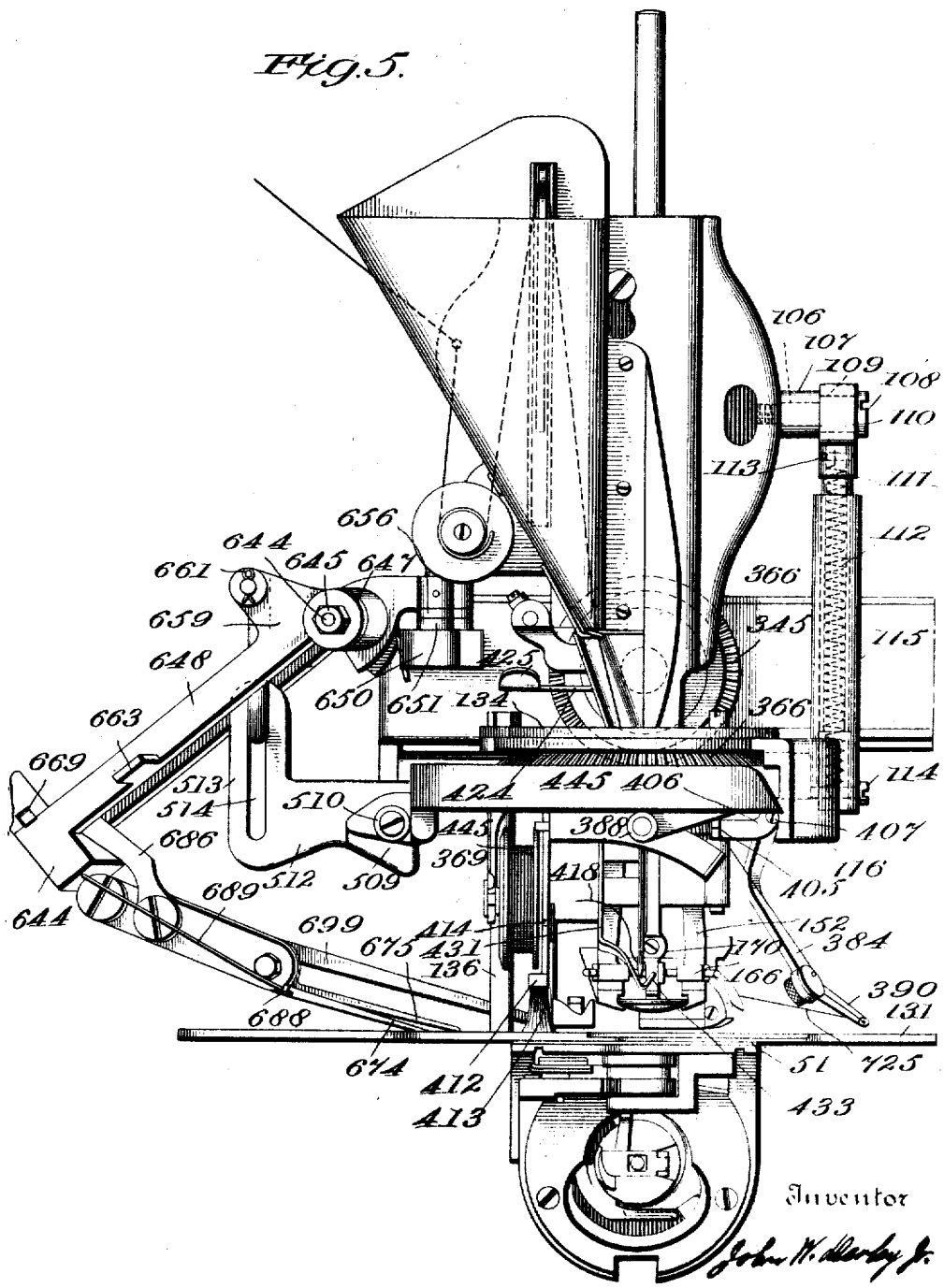

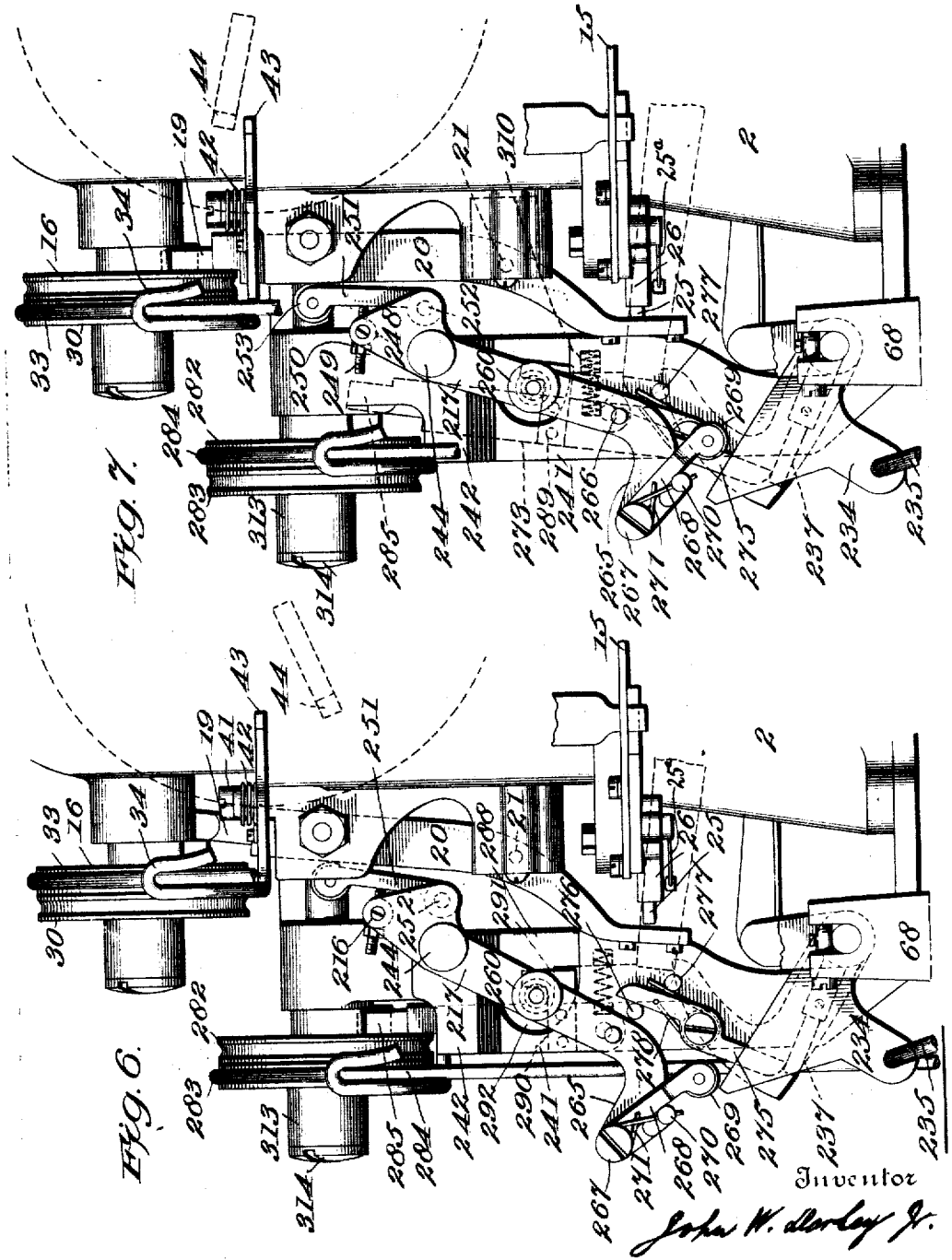

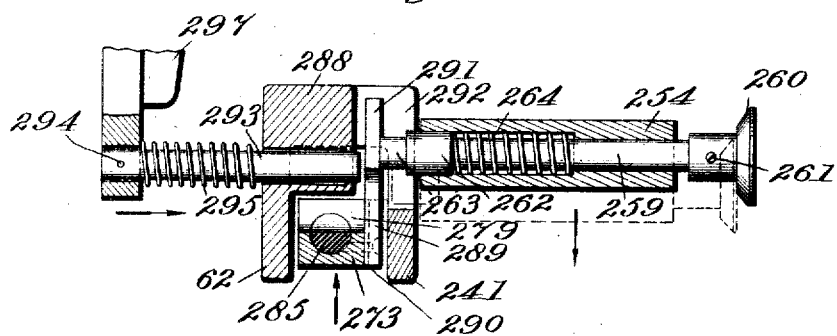
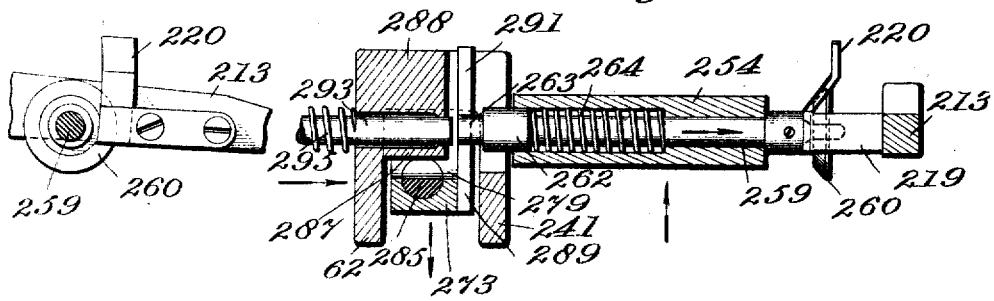
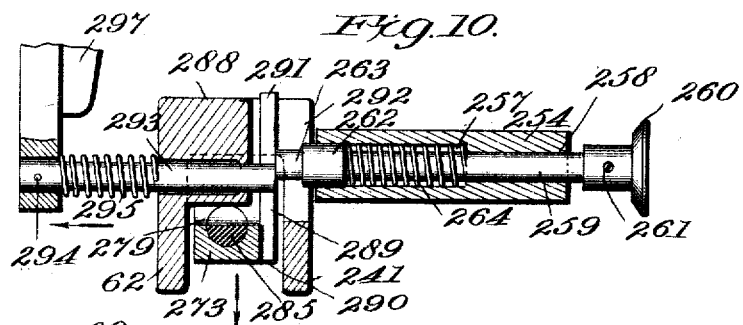
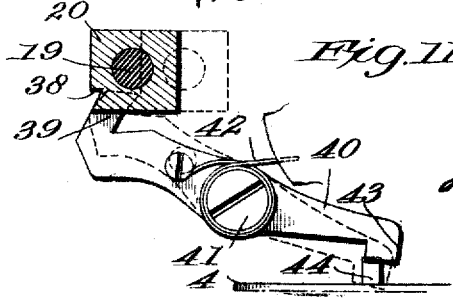

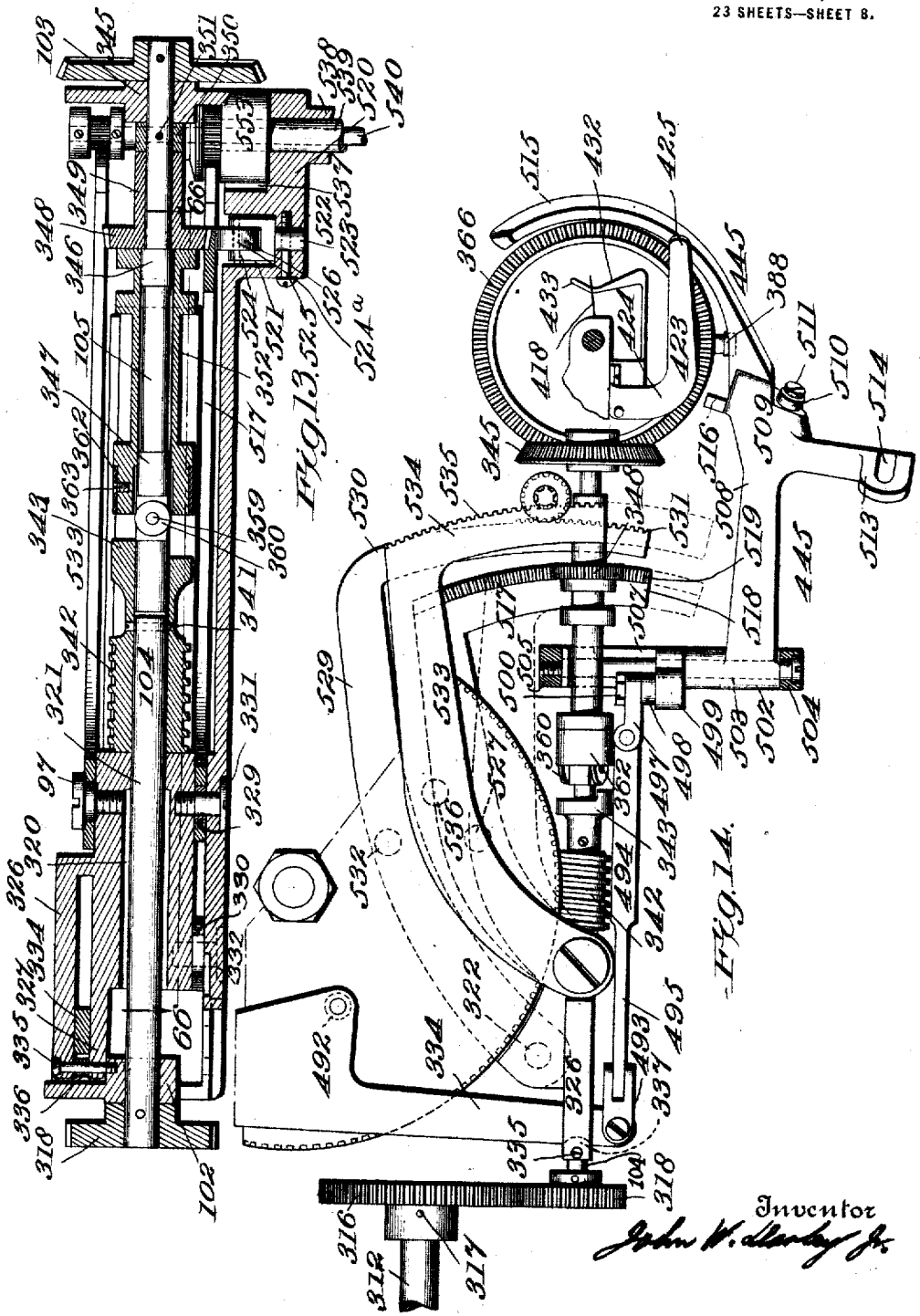

J. W. DARLEY, Jr.
BUTTON SEWING MACHINE.
APPLICATION FILED JUNE 28, 1918.
1,336,346.
Patented Apr. 6, 1920.
23 SHEETS—SHEET 9.
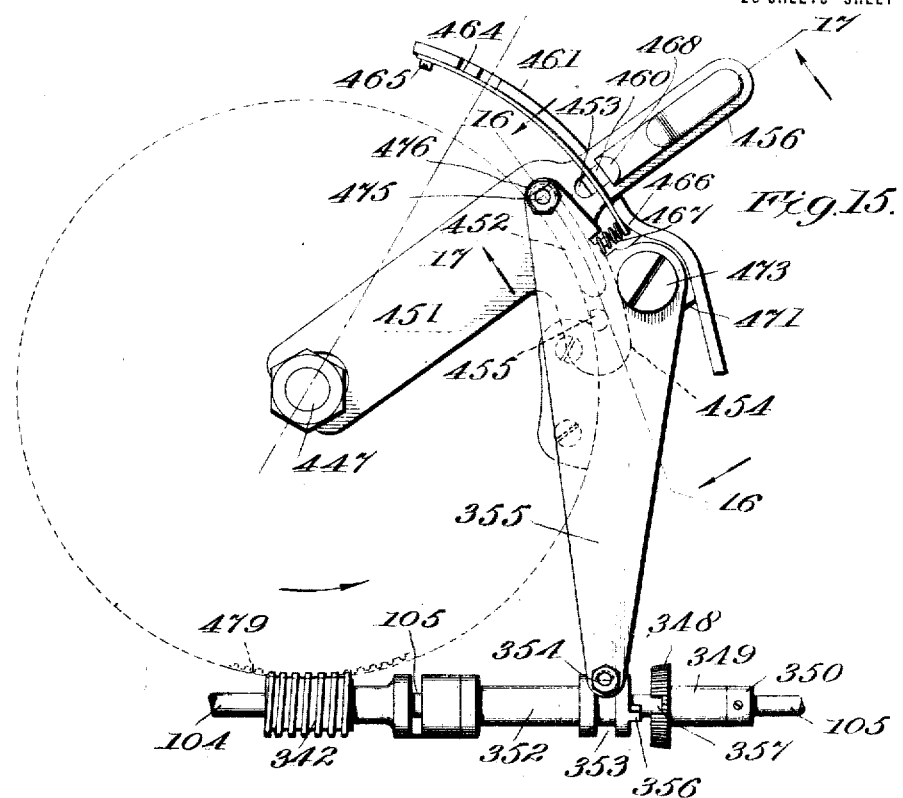
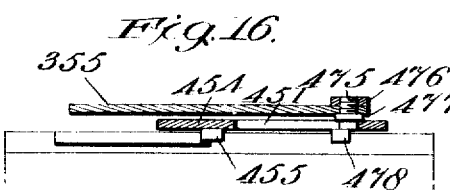
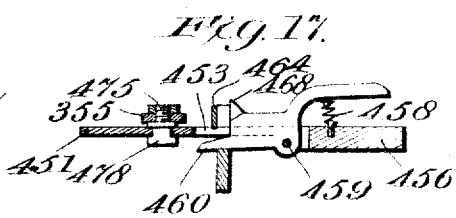
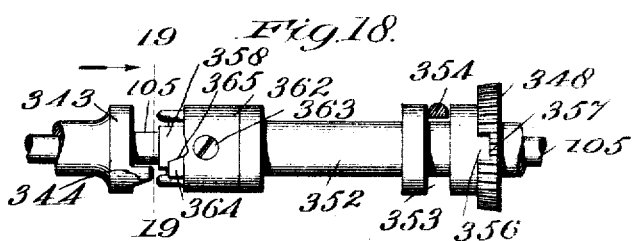
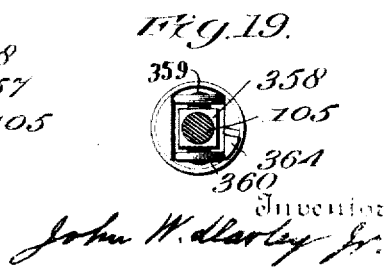

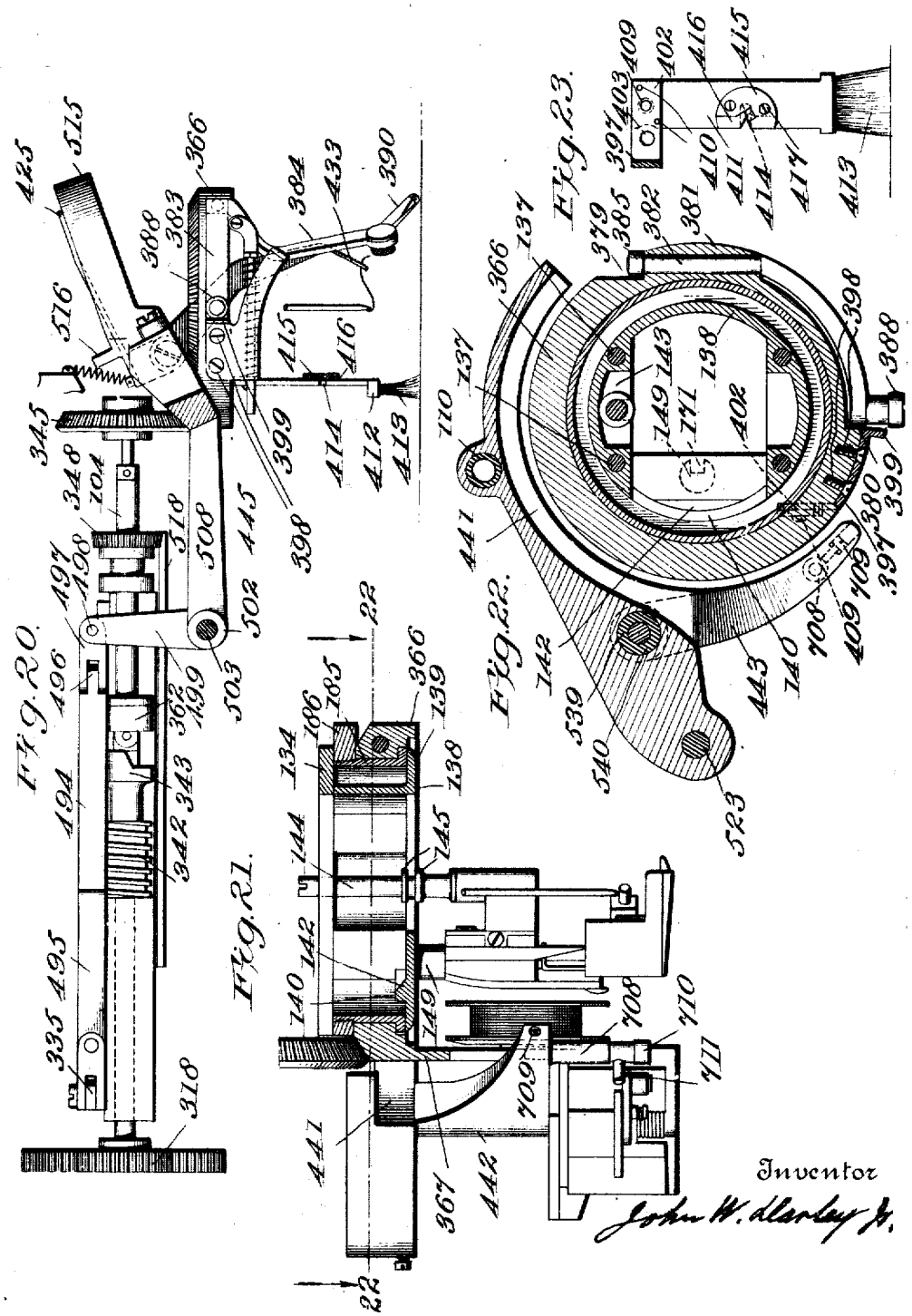

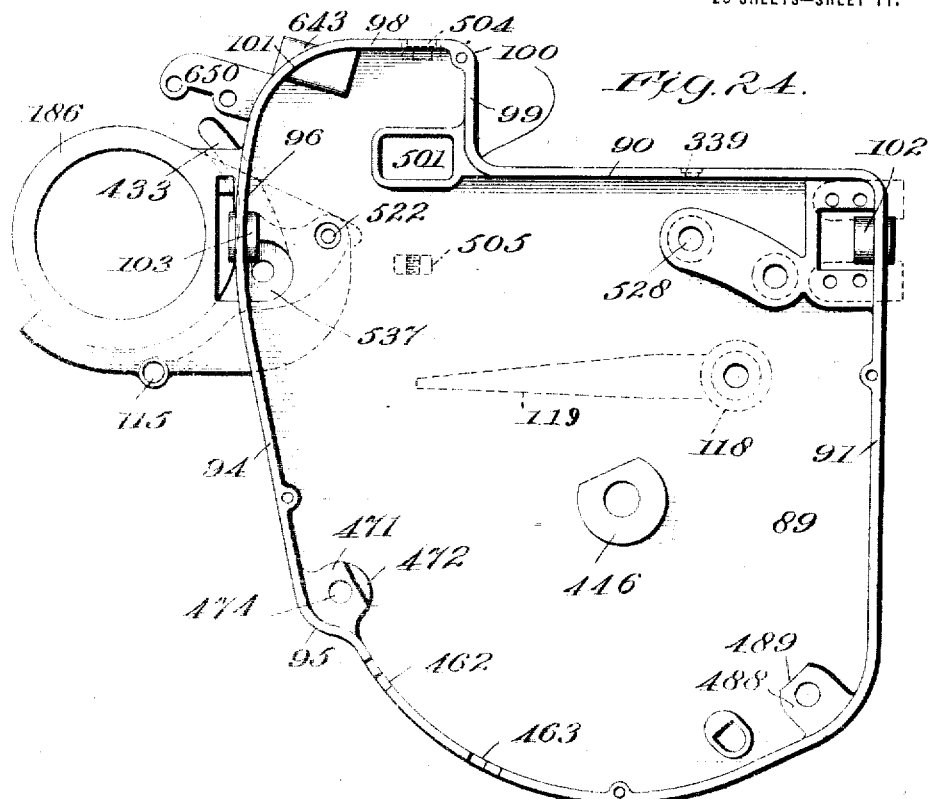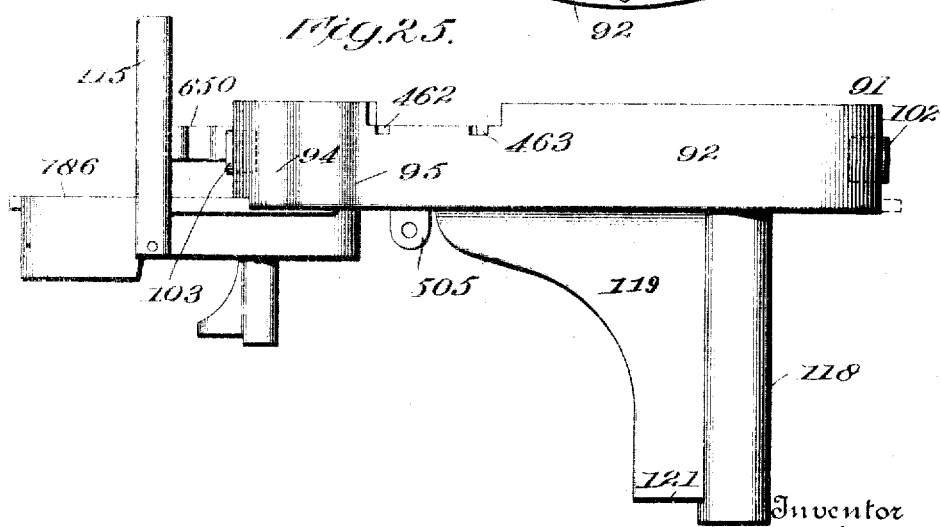

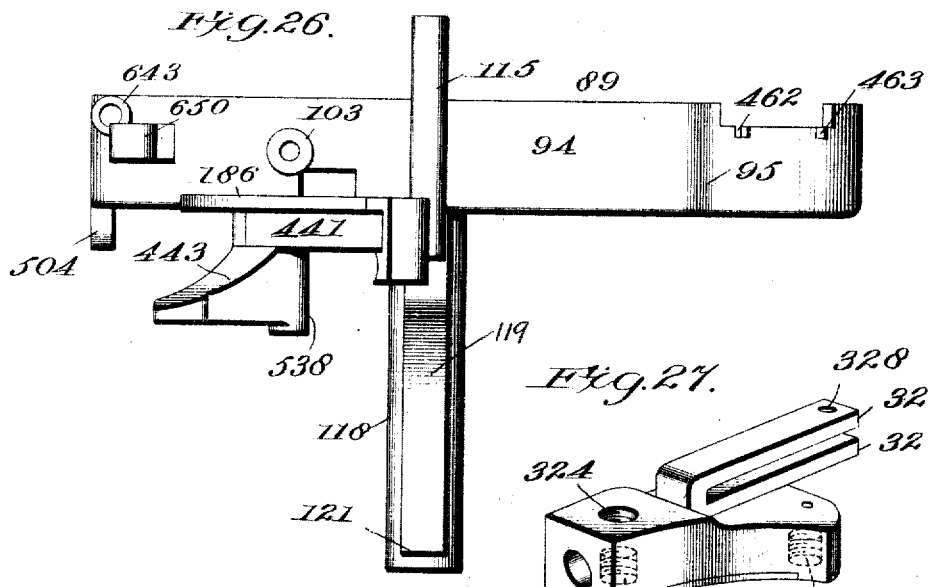
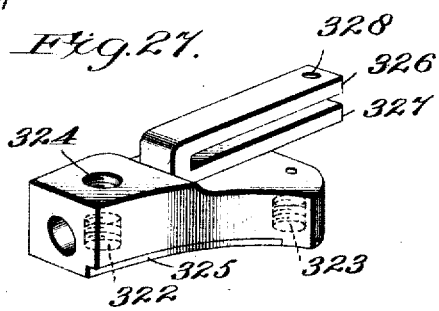
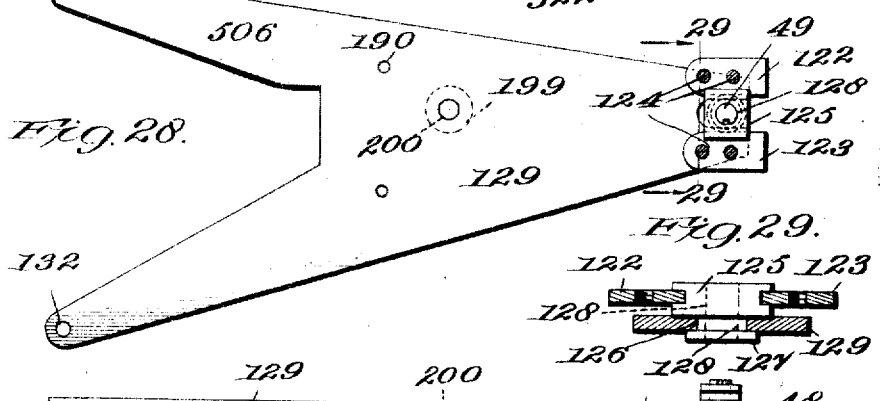
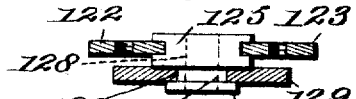
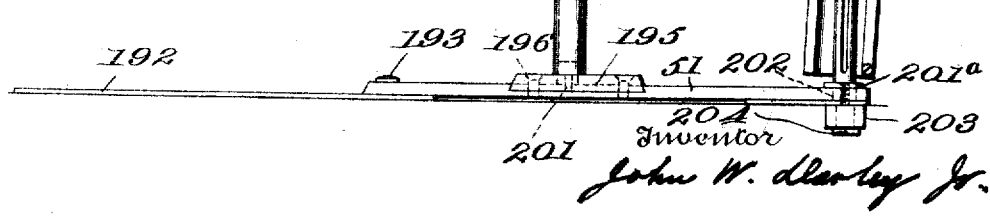

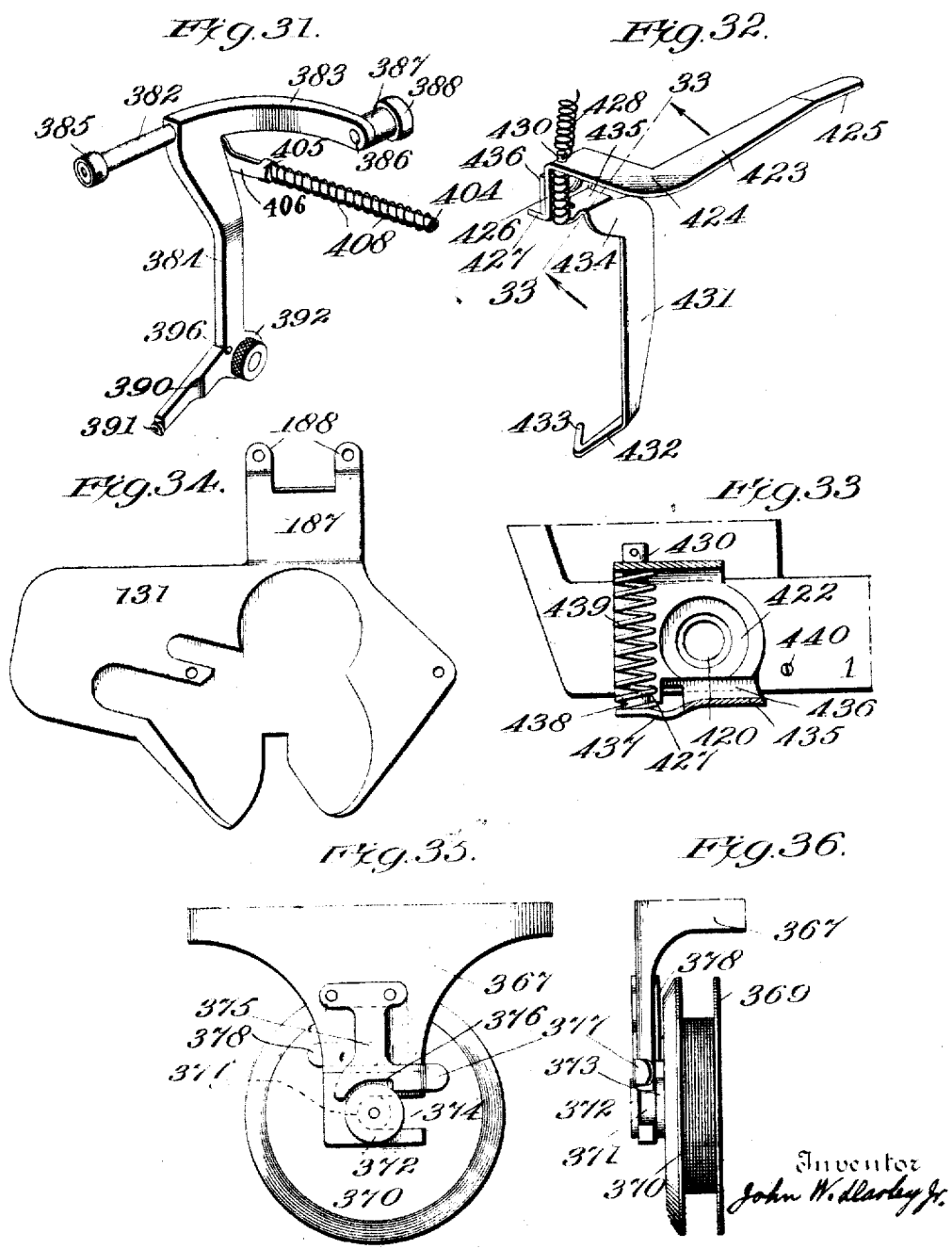

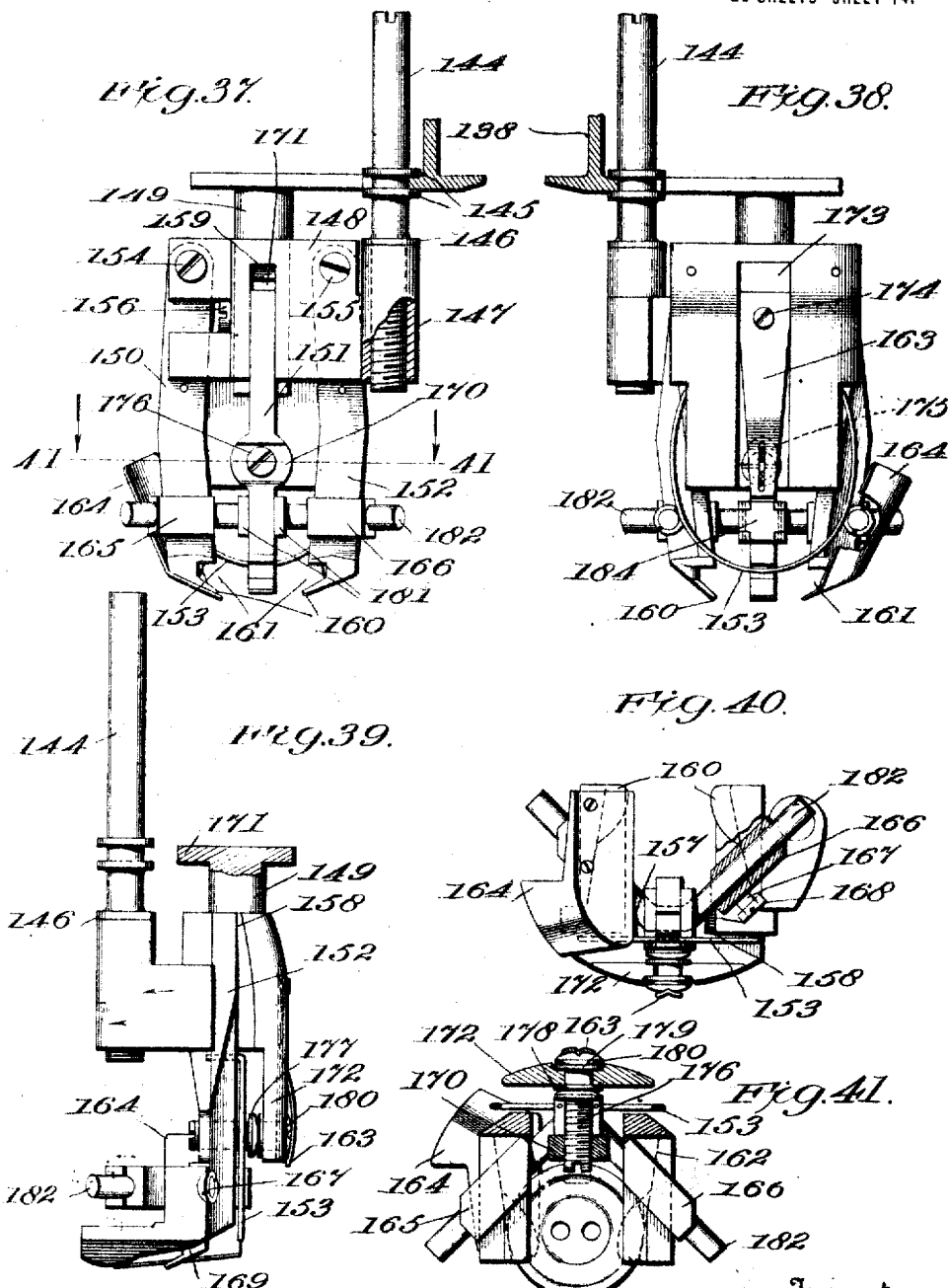

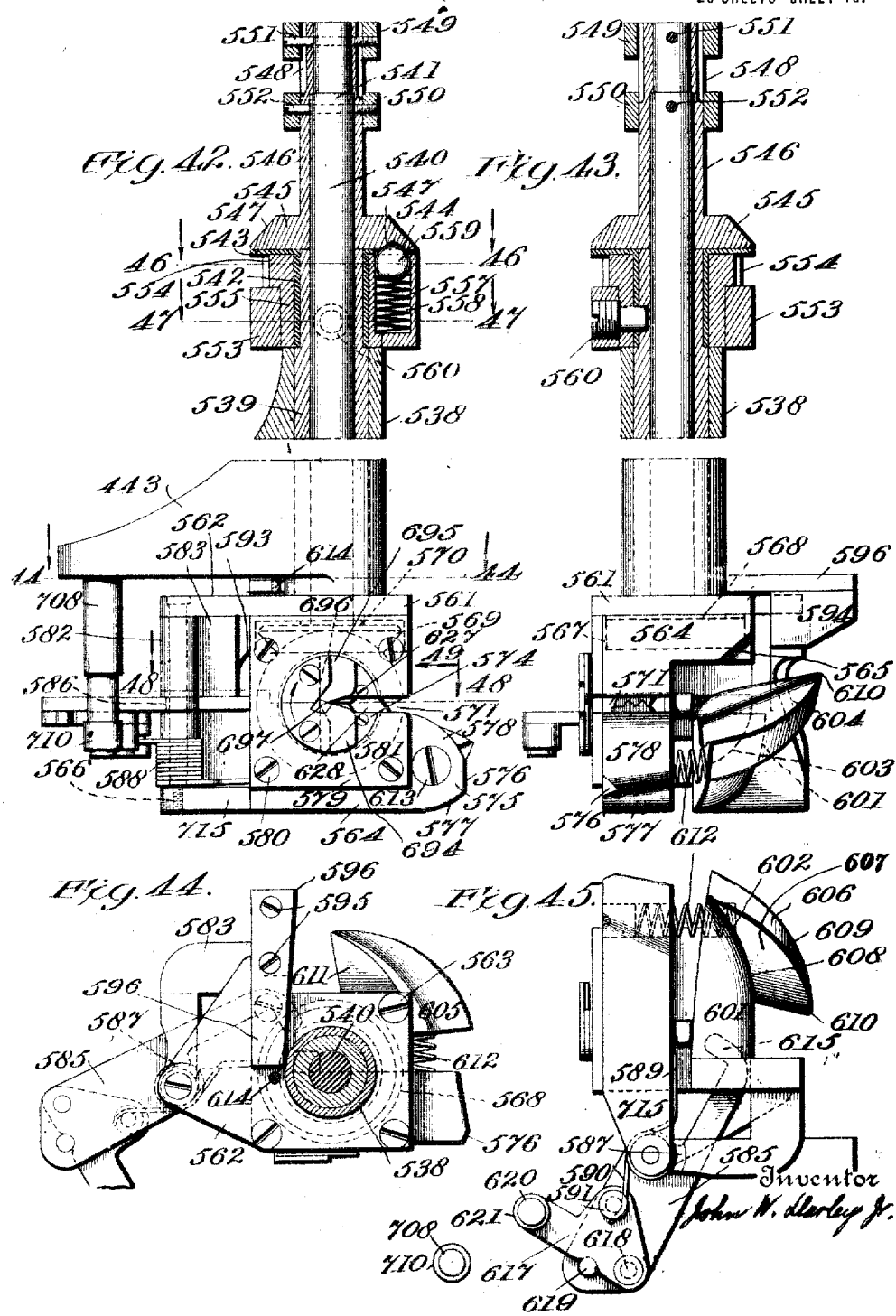

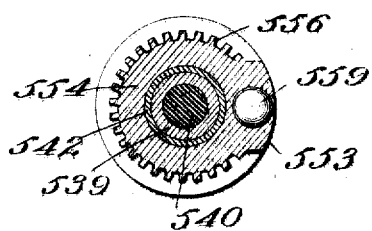
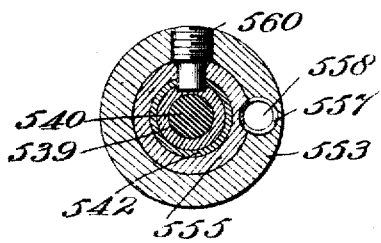
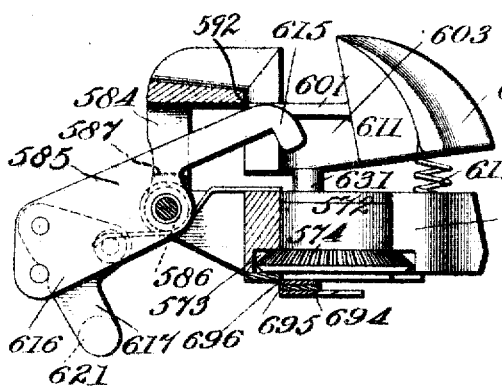
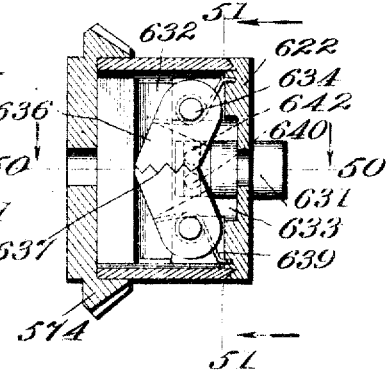
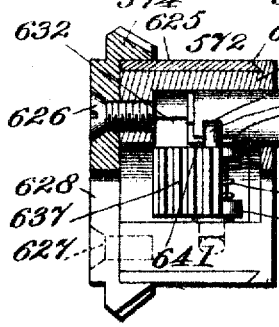
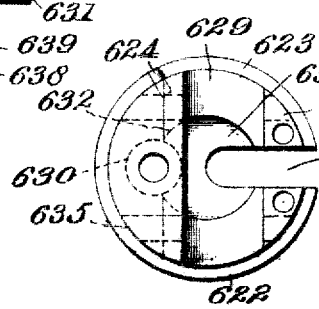
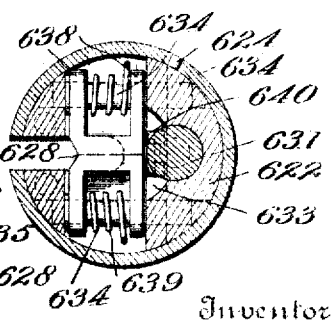

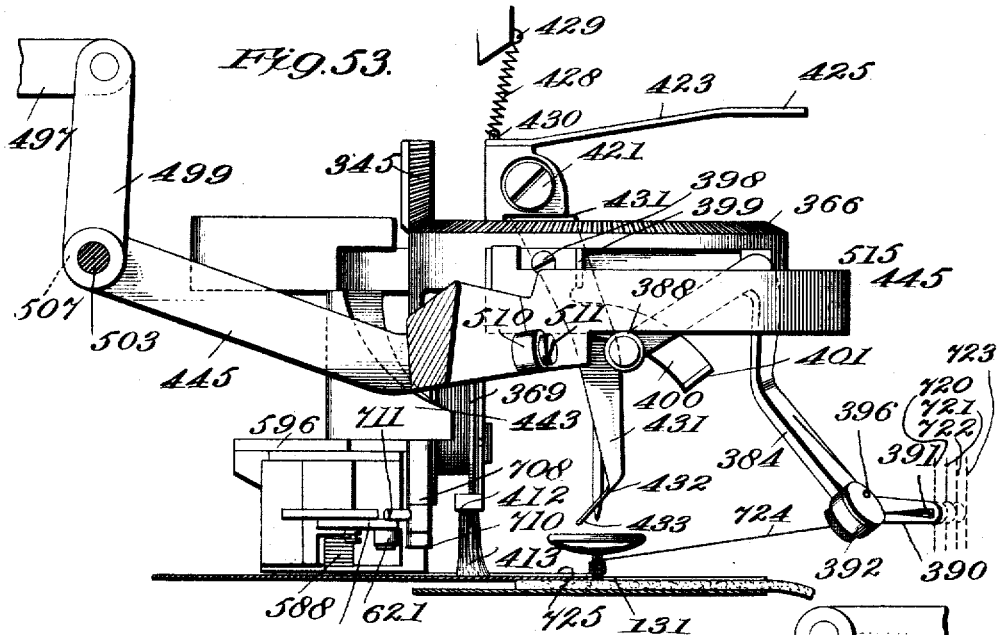
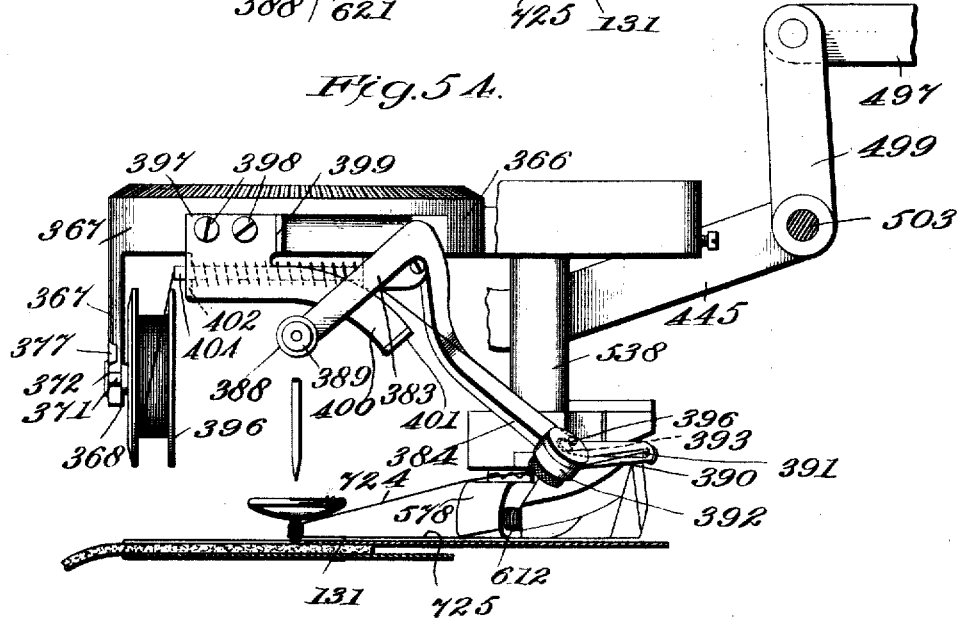

J. W. DARLEY, Jr.
BUTTON SEWING MACHINE.
APPLICATION FILED JUNE 28, 1918.

1,336,346.

Patented Apr. 6, 1920.
23 SHEETS—SHEET 18.

Inventor
John W. Darley Jr.

J. W. DARLEY, Jr.
BUTTON SEWING MACHINE.
APPLICATION FILED JUNE 28, 1919.

1,336,346.

Patented Apr. 6, 1920.
23 SHEETS—SHEET 19.

Inventor
John W. Darley Jr.

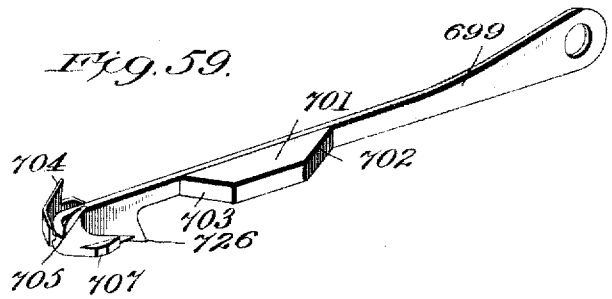
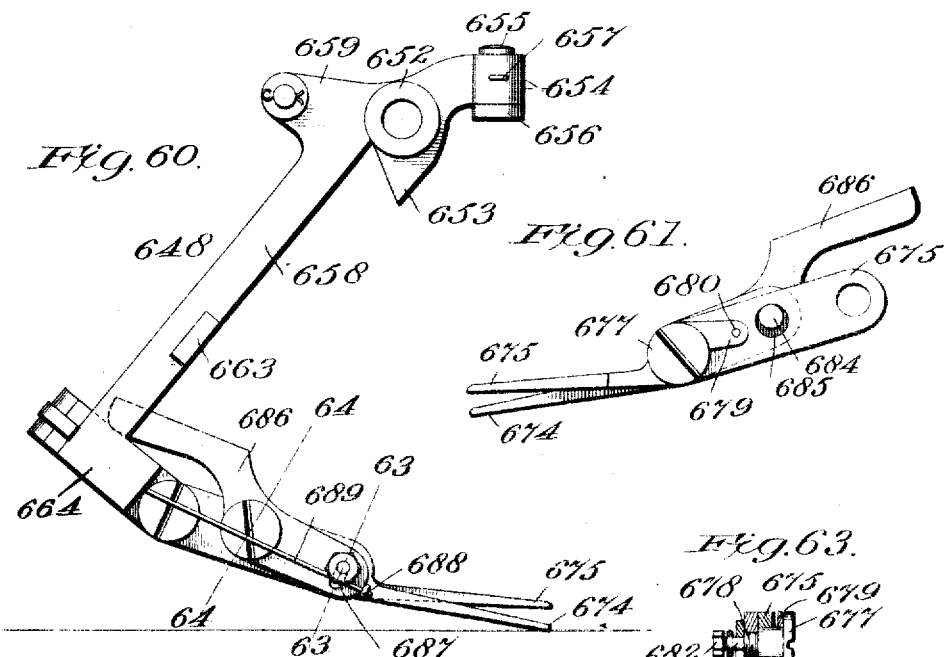
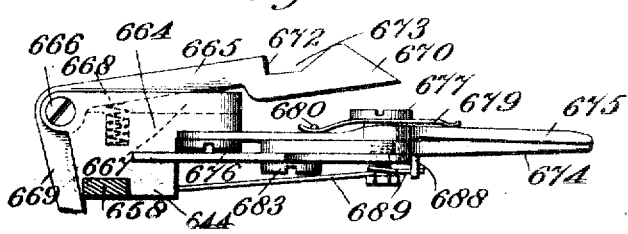
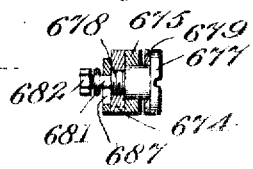

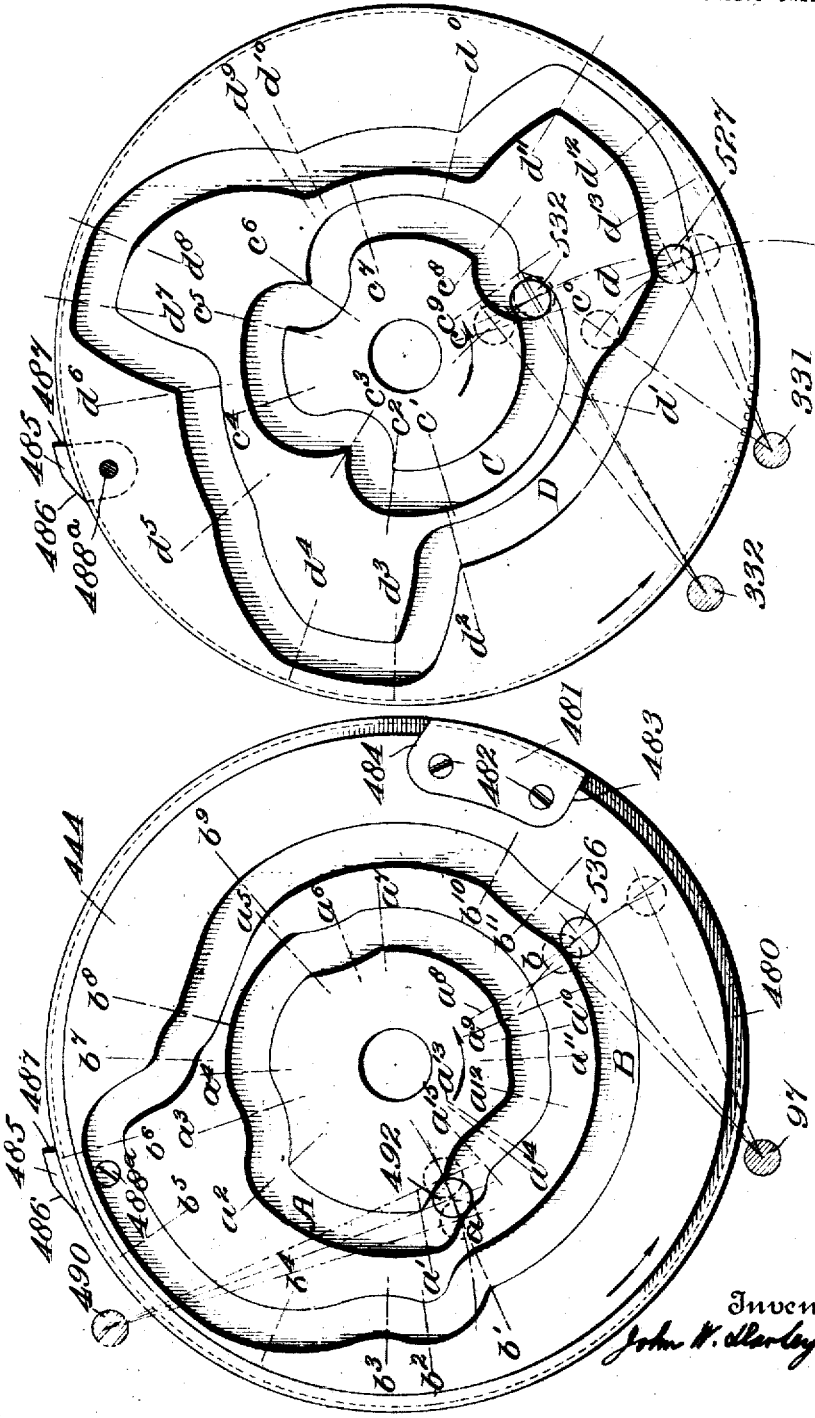

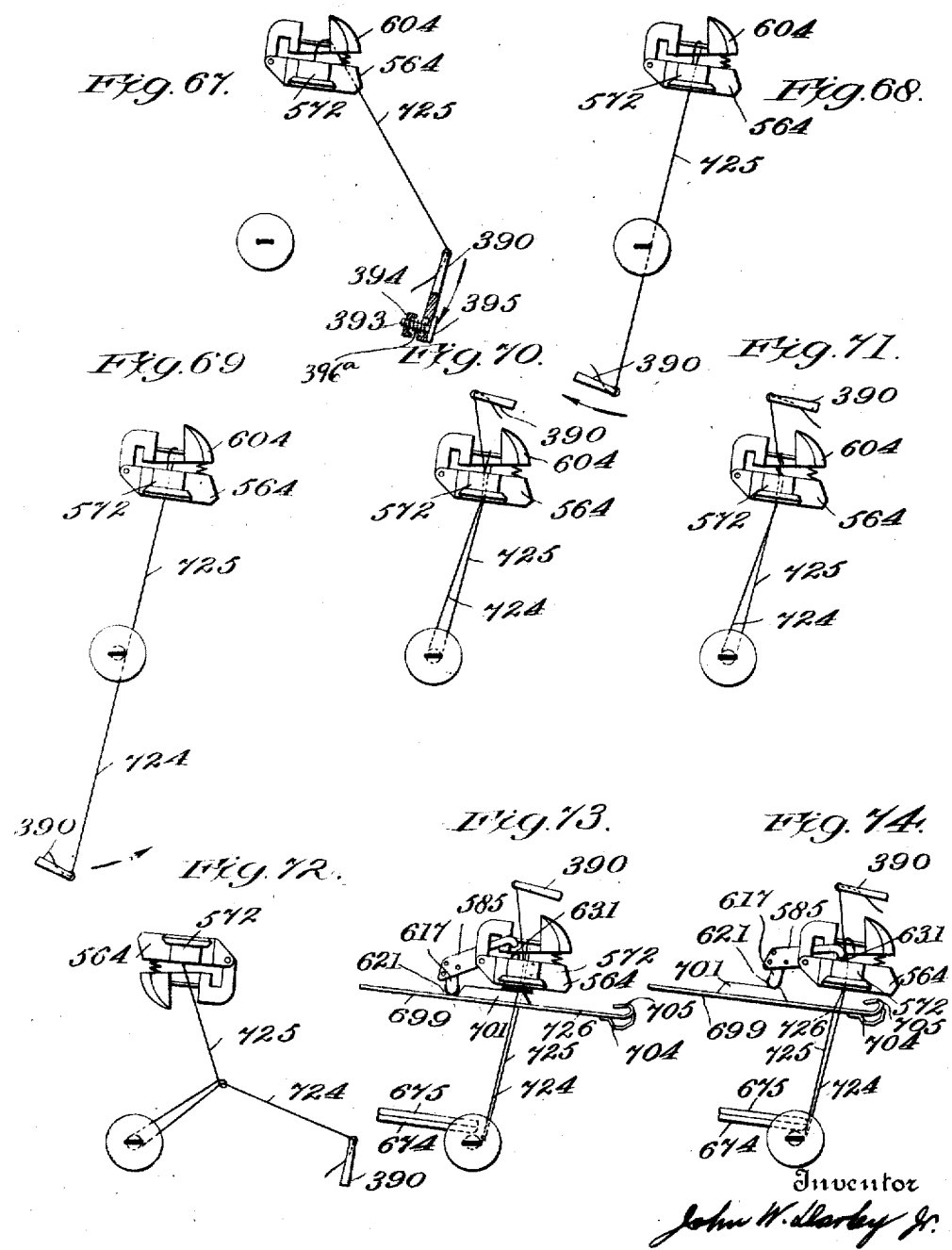

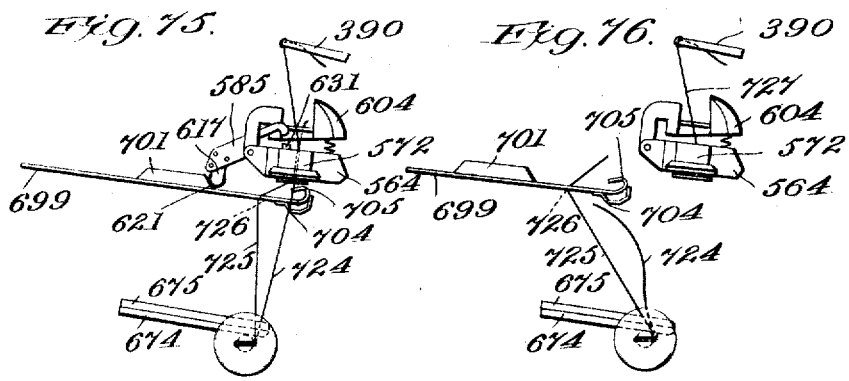
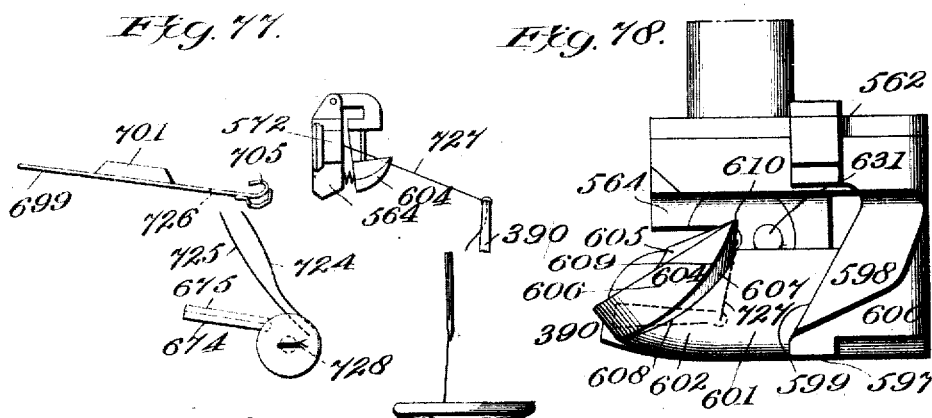
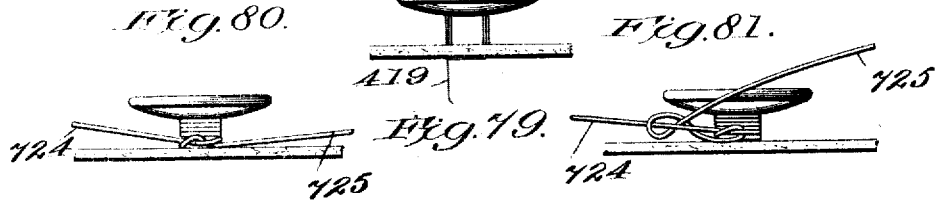
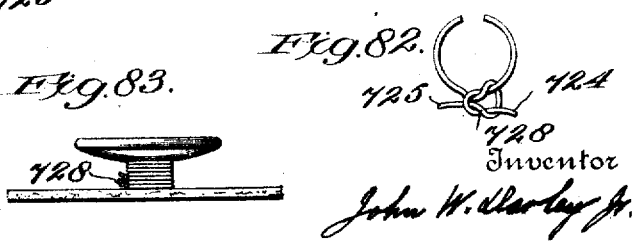

UNITED STATES PATENT OFFICE.

JOHN W. DARLEY, JR., OF BALTIMORE, MARYLAND.

BUTTON-SEWING MACHINE.

1,336,346.  Specification of Letters Patent.  Patented Apr. 6, 1920.

Substitute for application Serial No. 209,156, filed December 27, 1917. This application filed June 28, 1918. Serial No. 242,398.

*To all whom it may concern:*

Be it known that I, JOHN W. DARLEY, Jr., a citizen of the United States, residing at Baltimore, in the State of Maryland, have invented certain new and useful Improvements in Button-Sewing Machines; and I do hereby declare the following to be a full, clear, and exact description of the invention, such as will enable others skilled in the art to which it appertains to make and use the same.

My invention relates to improvements in button sewing machines and is an improvement upon the construction shown in my former application, Serial No. 209,728, filed May 25, 1904.

The object of my invention is to provide a machine which will sew buttons on garments in imitation of hand sewing namely, with the buttons separated from the garment or other fabric by a neck of thread, around which neck another thread is wound, thus securing the buttons to the garments at a distance therefrom, the ends of the wrapping thread being brought together and knotted.

Further objects of my invention are to provide a machine which will sew buttons onto garments or other fabrics, so constructed as to provide means whereby the button and fabric may be shifted at intervals when a four-hole button is used; to provide means whereby the number of turns of the thread wound around the neck of thread by the winding mechanism may be varied; to provide means whereby the ends of the winding or wrapping thread may be doubly knotted; to provide means whereby, after the knot is made, the ends are cut off; to provide means for withdrawing the severed end of the needle thread from the button and fabric after said thread has been severed by appropriate mechanism. Further objects will appear in the detailed description.

In the accompanying drawings:—

Fig. 3 is a top plan view of the same, the top of the cam case and a part of the goose neck being removed.

Fig. 4 is an end view of the machine from the rear, showing the driving mechanism.

Fig. 5 is an end view taken on the opposite or sewing end, parts being broken away and parts being omitted.

Fig. 6 is a side view, on a larger scale, of the power end of the machine, showing the positions assumed by the parts during the sewing operation.

Fig. 7 is a similar view, showing the same parts in the positions assumed during the winding, knot tying, and cutting operations.

Figs. 8 to 12 are detail sectional views of the trip mechanism by which the operation of the machine is controlled, the arrows showing the directions of movements of the various parts.

Fig. 13 is a cross-section, on a larger scale, of a part of the means for driving the winding and knot tying mechanisms, taken on the line 13—13 of Fig. 3 and looking in the direction of the arrows.

Fig. 14 is a top plan view of a part of the mechanism contained within the cam case and the winder gear and extension lever.

Fig. 15 is a detail plan view of the trip mechanism governing the action of the winding mechanism and showing the shifting member of the clutch in the position assumed during the winding operation.

Fig. 16 is a sectional view thereof, taken on the line 16—16 of Fig. 15 and looking in the direction of the arrows.

Fig. 17 is a section of the same on the line 17—17 of Fig. 15, looking in the direction of the arrows.

Fig. 18 is a view, on a larger scale, showing the position assumed by the shifting member of the clutch during the knot tying and cutting operations.

Fig. 19 is a cross-section of the same, taken on the line 19—19 of Fig. 18 and looking in the direction of the arrows.

Fig. 20 is a side view of the winder gear and attached parts, the extension lever and the power applying mechanism for the winder gear and knot tying mechanisms, the parts being in the position they assume during the early portion of the winding operation.

Fig. 21 is a longitudinal section through the winder gear, showing the manner in which it is supported on the cam case.

Fig. 22 is a cross-section on the line 22—22 of Fig. 21, looking in the direction of the arrows.

Fig. 23 is a detail view of the brush for getting rid of the waste ends of the winding thread, and the cutter for cutting the needle thread.

Fig. 24 is a top plan view of the cam case with the cover removed.

Fig. 25 is a side elevation of the same.

Fig. 26 is a front elevation of the same.

Fig. 27 is a detail view of the inner bearing of the power shaft of the cam case.

Fig. 28 is a plan view of a portion of the button chuck supporting mechanism.

Fig. 29 is a cross-section of the same on the line 29—29 of Fig. 28, looking in the direction of the arrows.

Fig. 30 is a side view of the plate shown in Fig. 28, with its related parts.

Fig. 31 is a perspective view of the winder thread guide and its related parts.

Fig. 32 is a perspective view of the means for withdrawing the severed end of the needle thread from the button and fabric.

Fig. 33 is a cross-section thereof taken on the line 33—33 of Fig. 32, looking in the direction of the arrows, and the upper spring being omitted.

Fig. 34 is a top plan view of the presser plate.

Fig. 35 is a side view of a portion of the winder gear, showing the means for removably holding the winder bobbin.

Fig. 36 is a front view of the same.

Fig. 37 is a front view of the button chuck and its related parts.

Fig. 38 is a rear view of the same.

Fig. 39 is a side view of the same.

Fig. 40 is a bottom plan view of the same.

Fig. 41 is a cross-section of the same taken on the line 41—41 of Fig. 37 and looking in the direction of the arrows.

Fig. 42 is a front view of the knotter and twister, their driving and related parts, parts of the latter being shown in section.

Fig. 43 is a side view of the same, partly in section.

Fig. 44 is a cross-section thereof on the line 44—44 of Fig. 42 and looking in the direction of the arrows.

Fig. 45 is a bottom plan view of the same.

Fig. 46 is a cross-section on the line 46—46 of Fig. 42, looking in the direction of the arrows.

Fig. 47 is a similar section on the line 47—47 of Fig. 42, looking in the direction of the arrows.

Fig. 48 is a cross-section thereof, taken on the line 48—48 of Fig. 42 and looking in the direction of the arrows.

Fig. 49 is an enlarged vertical cross-section of the twister, looking in the direction of the arrow 49 in Fig. 42.

Fig. 50 is a horizontal section of the same, taken on the line 50—50 of Fig. 49 and looking in the direction of the arrows.

Fig. 51 is a cross-section thereof, taken on the line 51—51 of Fig. 49 and looking in the direction of the arrows.

Fig. 52 is a front view of the frame of the twister, the driving gear wheel and outside casing being removed.

Fig. 53 is a side view, on a larger scale, of the winder, extension lever, and related parts in the positions they assume after the winding operation is completed.

Fig. 54 is a side view of the same parts, showing the positions assumed just prior to the beginning of the knotting operation.

Fig. 59 is a perspective view of the threading-up hook for the knotter.

Fig. 60 is a front view of the cutting mechanism for the winding thread.

Fig. 61 is a rear view of the cutter.

Fig. 62 is a top plan view of the parts shown in Fig. 60.

Fig. 63 is a cross-section on the line 63—63 of Fig. 60.

Fig. 64 is a cross-section on the line 64—64 of Fig. 60.

Fig. 65 is a top plan view of the grooves governing the twisting and cutting mechanisms.

Figure 1:
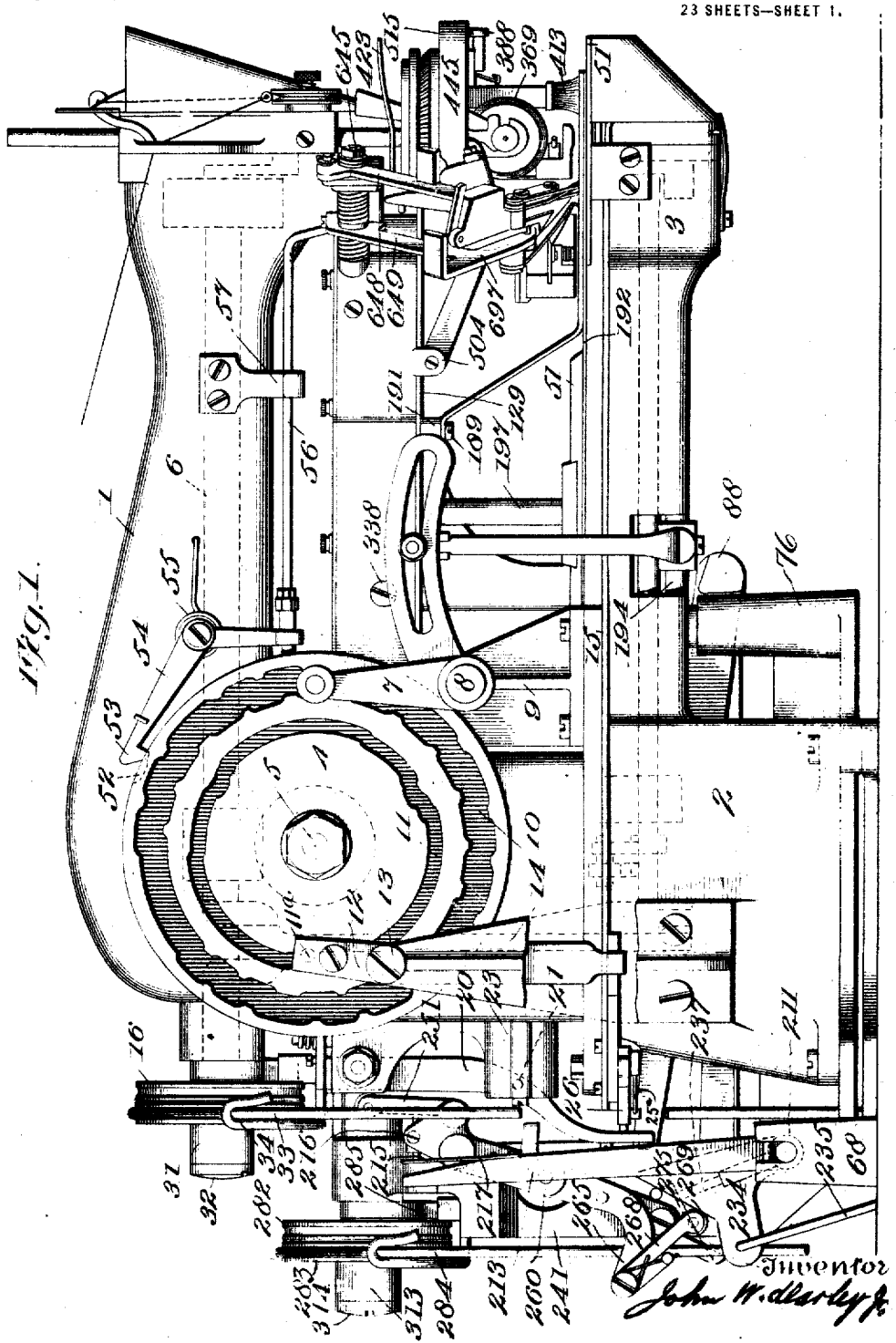
Figure 1 is a side view of a button sewing machine constructed in accordance with my invention.

Fig. 66 is a section on the line 66—66 of Fig. 13, looking in the direction of the arrows. In this figure, the section lines are not shown, as they would interfere with the description of the operation, but the cam is shown as if it were a solid cam. The grooves govern the knotting operation.

Figs. 67 to 77 are diagrammatic views, showing the various positions the knotter, winder, knotter hook, and cutter assume during the operations of winding the neck of thread securing the button to the fabric, tying the knot, rethreading the twister, and severing the ends of the winding thread.

Fig. 78 is a rear view of the knotter and twister, showing the position the thread leading from the twister to the winder assumes in Fig. 77.

Fig. 79 is a front view of the button and fabric and also showing the free end of the needle thread remaining in the button and fabric, after said thread and shuttle thread have been severed.

Fig. 80 is a front view of the button and fabric, showing the neck wound and the first loop of the knot in place.

Fig. 81 is a similar view showing both loops of the knot in place, but the second loop not pulled up.

Fig. 82 is a diagrammatic view showing the knotting of the winding thread, the knot being shown open.

Fig. 83 is a side view of the finished product of the machine.

1 represents the goose neck, carried on the bed 2, having an approximately cylindrical extension 3, which acts as a work support. On a shaft 5, passing through the upright portion of the goose neck, is journaled a cam 4, having grooved faces. 6 represents the main driving shaft of the machine, which drives the shaft 5 by means of a worm wheel and worm, indicated in dotted lines in Fig. 1, and this shaft drives the needle and take-up device in the usual way. This shaft 6 also drives the shuttle by a crank and suitable connections, as indicated in dotted lines at the end and bottom of Fig. 1, in the usual manner. The needle and shuttle coöperate to form the usual lock stitch with their respective threads.

7 indicates a bell crank lever, journaled on a pin 8 carried by the bracket 9, attached to the base plate and provided at one end with a roller engaging the groove 10 of the cam 4. This lever, by means of appropriate connections hereinafter described, shifts the button chuck, presser plate, and bottom bearing plate from side to side. In sewing on a four hole button a longitudinal shifting of these parts must also be provided, and this shifting is accomplished in the following manner:—

The inner face of the cam 4 is provided with a groove 45, in which engages a roller carried by a lever, the lower end of which is grooved as shown at 46, the upper part of said lever and the roller not being shown on the drawing. In the grooved part 46, engages a block 47, which block is revolubly mounted on the cylindrical pin 48, and this pin is adapted to slide up and down on the grooved arm 49 and to be fastened in any desired position thereon by the screw 50.

The lower end of the grooved arm 49 is attached to the bottom plate 51, and as this bottom plate, the presser plate, and the button chuck move in unison, all three will be shifted together longitudinally of the machine by the lever 49 when the parts are properly adjusted for sewing a four-hole button on. In the position shown in Fig. 2, the cylinder 48 is so adjusted in relation to the axis of revolution of the groove 46 that no longitudinal shifting movement is imparted to the bottom plate, which shows the position of the parts in sewing on a two-hole button. If, however, it is desired to sew on a four-hole button, the block 47 is adjusted a suitable distance from said axis of revolution, depending upon the distance apart of the holes in the button, whereupon, during half the sewing operation, the needle thread is passed through one pair of holes of the button, and the button chuck is then shifted longitudinally of the machine and the needle thread is passed through the other pair of holes in the button during the remaining half of the sewing operation.

The cam 4, on one side, is provided with a groove 11, and in this groove is mounted a roller 11ª, carried on the end of a lever 12, which is pivoted at 13 on a bracket 14, secured to the bed 2. The lever 12 is connected to and operates a connecting rod 15, which operates the cutting mechanism for the needle and sewing threads as shown in my application Serial Number 570,856 for Letters Patent of the United States filed July 7, 1910.

Fixed to the shaft 6 is a pulley 16, and fastened to one face of this pulley are two downwardly projecting lugs 17 and 18, shown in dotted lines in Fig. 4. These parts coöperate with an upwardly spring-pressed pin 19, carried in the upper end of a lever 20. The pin 19 is pressed upwardly by a spring in the same manner as the pin 285 is pressed upwardly by the spring 286, hereinafter described. This lever is mounted on a pin 21, carried by a cylindrical portion 22, mounted in a projection 23, suitably attached to the upright part of the goose neck. The lower end of the lever 20 is slotted, as shown at 24, and in this slot engages a spring-pressed pin 25 which is under tension from the spring 25ª, carried by a bell crank lever 26, which is connected to the connecting rod 15. The part 22 being cylindrical, it is obvious that the lever 20 is capable of a slight angular movement around the center of the part 22 and a pin 27, which is pressed by a spring 28ª in the cylinder 28 bearing against the lever 20, the tension of said spring keeps the stop pin 19 and its attached parts in the position shown in Fig. 4. The cylinder 28 is a part of the casting, the lower part of which has already been designated as 23. The lever 20 is acted upon by another spring 29, Fig. 2, which tends to keep it in its proper position in one plane, as shown in said figure, while the spring in the cylinder 28 keeps it in its proper position in the plane at right angles thereto, as shown in Fig. 4.

Loosely mounted on the hub of the pulley 16 is a loose pulley 30, having a hub 31 engaging the hub of the pulley 16 and held in place by the screw 32. Over the pulley 30 runs a cord or band 33, which is constantly driven when the machine is in operation and is adapted to be shifted from the pulley 30 to the pulley 16 when the sewing mechanism is thrown into operation. This shifting is accomplished by means of a belt shifter, having a forked upper end 34, engaging the cord or band 33 and then bent as shown at 35 and held by the clamp plate 36 and screws 37 to the upper end of the lever 20. A hole is bored in the inner end of the belt shifter and also in the goose neck, for the reception of the ends of the spring 29. The lever 20 is provided at its upper end with a nick 38, into which the sharpened bent end 39 of a vibrating lever 40 is adapted to engage. This lever is mounted on a screw 41, passing down into the bracket, which carries the parts 23 and 28 and is surrounded by a spring 42 normally tending to force the end of the lever 40 into the nick 38. In Fig. 11, the full lines show the parts in the position of rest, the lever 40 being disengaged from the lever 20, and the dotted lines show the position assumed by the parts during the sewing operation. The lever 40 is provided with a bent end 43, adapted to be struck by an angular projection 44 on the inner face of the cam 4, to disengage the lever 40 from the lever 20 at the end of the sewing operation, whereupon the spring 29, Fig. 2, forces the lever 20 from the position shown in dotted lines to that shown in full lines. When the lever 20 is moved from the position shown in full lines in Fig. 11 to that shown in dotted lines, the belt 33 is at the same time shifted to the tight pulley 16, whereupon the shaft 6 is driven and the sewing mechanism thrown into operation, the pin 19 carried by the lever 20 being at the same time disengaged from the lugs 17 and 18, carried by the pulley 16. When the sewing operation is finished, the belt shifter carries the cord 33 back from the tight pulley to the loose pulley 30, and at the same time the lever 20 is shifted, bringing the spring-pressed pin 19 into the plane of rotation of the lugs 17 and 18. The pin 19 is pressed downwardly by the curved face of the lug 18. The inertia of the machine, after the belt has been shifted to the loose pulley, causes the lug 18 to force the pin 19 downwardly against the tension of the spring, until it passes the lug 18, when the pin 19 is forced into the space between the lugs 17 and 18, whereupon the remaining inertia of the machine, acting through the lug 17 against the pin 19, moves the lever 20 against the tension of the spring in the cylinder 28 and the lower end of the lever 20, through the bell crank lever 26 and connecting rod 15, operates the cutting mechanism for the needle and shuttle threads.

The cam 4 is made of such a size that by one revolution it will govern the action of the machine in sewing on three buttons, and hence it is evident that between the stopping and starting of the sewing mechanism the said cam will revolve one-third of a revolution. On its periphery, therefore, the cam 4 is provided with three depressions 52, only one of which is shown on the drawing, see Fig. 1. The indented face of the cam is adapted to engage with a hook 53 on the end of a bell crank lever 54, said lever being normally held against said cam by the spring 55 and this lever having its lower end connected to a rod 56, which slides in the guide 57. The other end of said rod is adapted to operate a clamp attached to the needle bar, which acts to clamp the needle thread at suitable intervals during the operation of the sewing mechanism, in the usual manner.

All the parts heretofore described are substantially old and well-known in the art, and the operation of said parts is well understood and acts to attach the button to the garment, as usual, except that the button is separated from the garment by a neck of thread; and the needle thread, when the sewing operation is finished, is allowed to remain passing through the button and the fabric after said thread and the shuttle thread have been severed below the work by appropriate cutting mechanism, as shown in Fig. 79. Said cutting mechanisms are shown and described in my companion application, filed July 7, 1910.

Figure 2:
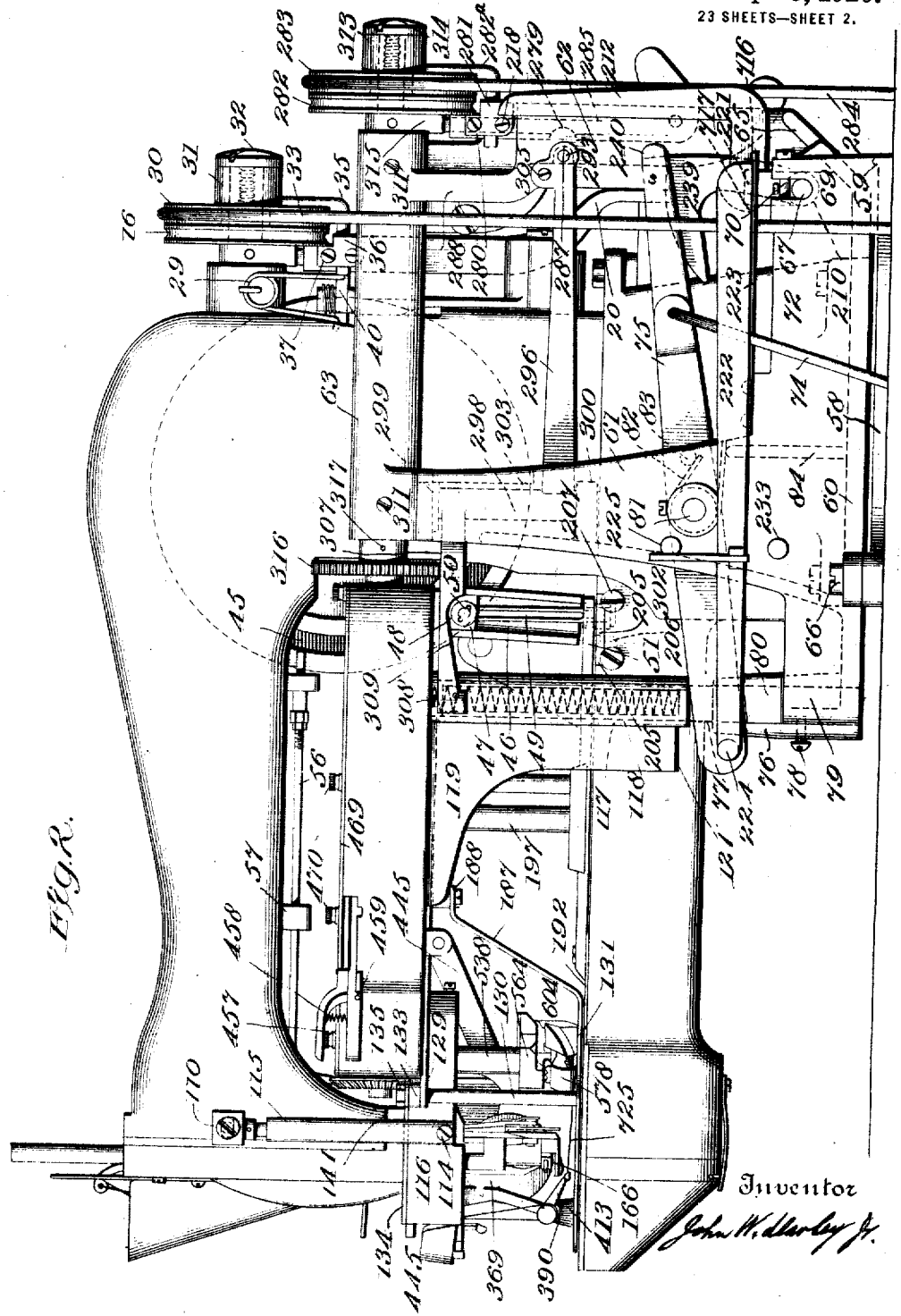
Fig. 2 is a similar side view, taken from the opposite side.

The winding mechanism, the knotter, and the severing means, together with the cam for governing their action, the button chuck, and presser plate are all movably supported in the following manner:

Bolted to the table is a base plate 58, provided with an upwardly projecting ridge 59. Bolted to the bed 2 is an auxiliary frame composed of a flat base piece 60, to which the bed 2 of the machine is bolted, a side piece 72, uprights 61 and 62, and a connecting piece 63, running between said uprights at their upper ends, this piece being semi-cylindrical in form, as shown in Fig. 3. The part 61 is offset from the goose neck and body of the machine, while the part 62 is directly in line with the shaft used for driving all the parts, excepting the sewing mechanism and button shifting mechanism already described. The lower end of the upright 62 is expanded, as shown at 64, Fig. 4, and shades into the cross piece 65 on one end of the machine, this cross piece being inclined downwardly, as best shown in Fig. 2. Normally, the auxiliary frame is bolted to the base plate 58 by means of bolts 66.

The base plate 58, see Figs. 2 and 4, is provided with upwardly extending ears 68 and 69, cut away for the reception of the stub shafts 67. These shafts are retained in position in the cut away portions by bolts such as 70.

The frame 65 is expanded at one end, as shown at 71, embracing one of the stub shafts 67, and the part 72 is perforated and one of the stub shafts 67 passes therethrough. To keep the stub shaft 67 in position, screws 73 are used.

Ordinarily, the frame is bolted to the base plate 58, as already described, but if it is desired to obtain access to the under parts of the machine, the screws 66 are removed and the whole machine is tilted, the stub shafts 67 revolving in the slotted bearings, until the cross-piece 65 strikes the projection 59, when the center of gravity of the machine will be beyond a vertical line passing through the center of said stub shafts, and the machine will rest securely in its tilted position. Of course, during this tilting operation, the belts must be removed from the lower driving pulleys (not shown), and the connecting rod or wire 74 must be disconnected from the lever 75.

The auxiliary frame, already described, has on its inner end a boss 76, nearly in line with the upright 62, which is bored out for the reception of a steel post 77, which is fastened therein by a screw 78. The boss 76 is connected to the main portion of the bracket by a bent portion 79, provided with a stop 80 for the lever 75, which limits the downward motion of the front end of said lever.

The connecting rod or wire 74 runs down to a treadle (not shown) adapted to be operated by the right foot of the operator to lift the cam and associated parts, as hereinafter described. The lever 75 is mounted on a pin 81, mounted in the upright 61, and a spring 82 is connected at one end to the auxiliary frame and at the other end bears against a pin 83 on the lever 75. The part 72 is also provided with an upwardly extending web 84, which acts as a stop for the lever 75 when the latter is pulled down by the rod 74. The lever 75, see Fig. 3, is provided with a projecting portion 85, the end of which is bent, as shown at 86, and perforated for the reception of the bent upper end of the rod 74. A cotter pin 87 is inserted through a perforation in the end of this rod to prevent it from becoming disengaged from the part 86. The front end of the lever 75 is provided with an inwardly transversely projecting portion 88 for the purpose of lifting the cam case, hereinafter described. The top of the part 88 is adapted to make fair contact with the lower part of the cam case hereinafter described.

89 represents the cam case, of the shape shown in plan in Fig. 24, in which figure the cover is removed. This is of an irregular shape and plan, as shown in Figs. 3 and 24, having a straight side 90, parallel to the main driving shaft of the goose neck, another straight side 91 at right angles thereto, a curved portion 92 concentric with the center of the post 447, an angularly disposed portion 94, which is joined to the curved portion 92 by a curve of short radius 95, a curved portion 96 concentric with the center of the screw 97, and an extension formed by the side 98 parallel to the side 90 and joined thereto by the straight portion 99 with curves of short radius, such as 100. The part 96 is joined to the part 98 by the curved part 101.

The cam case is provided with bosses 102 and 103, which furnish bearings for the divided shaft, composed of parts 104 and 105, best shown in Fig. 13, which shaft is the main operating shaft for the various elements included in or attached to the cam case. The center lines of the shafts 104 and 105 are in the same vertical plane as the main driving shaft 6. This brings the axis of the needle bar coincident with the axis of the winder gear.

Attached to the right hand of the front part of the goose neck, is a screw 106, best shown in Fig. 5, around which is placed a washer 107. The screw 106 is provided with a head 108 and with a shoulder 109, the part of the screw within the washer 107 being reduced in diameter so that the thrust of the screw is supported by said washer, leaving a recess between said washer and the head of the screw for the support of the post hereinafter referred to. This post, which is preferably made of steel, has an enlarged flat head 110, Fig. 2, provided with a slightly elongated opening, which fits on the shoulder of the screw, being held between the washer 107 and screw head 108. This post is provided with a shoulder 111 and its lower portion is bored out for the reception of the spring 112, attached to a screw 113 at its upper end, and to a screw 114 at its lower end.

Fitting around the lower reduced end of this steel post, is a hollow sleeve 115, formed integrally with the front portion 116 of an extension of the cam case, see Figs. 2 and 5.

Referring especially to Fig. 2, the post 77 is bored out at its upper part for the reception of a spring 117, and around this post is a sleeve 118, extending downwardly from the cam case, and provided with a strengthening fin 119. The bottom of the cam case rests against the upper end of the spring 117.

The two sleeves 115 and 118 guide the cam case and its attached parts in their vertical movement, the spring 117 being a compression spring and the spring 112 being an extension spring, both, however, tending to lift the cam case and its attached parts. These springs, however, are not strong enough to completely overcome the action of gravity on the cam case and its attached parts, so that the excess of the weight over the tension of said springs will exert sufficient pressure upon the work under the presser plate to keep the same in fixed relation with the button chuck.

The sleeves 115 and 118 are so disposed that a plane passed through their axes would pass directly through the center of gravity of the cam case and its attached parts, so that, as these rise and fall, there is no tendency of any unbalanced weight to cause the sleeves 115 and 118 to bind on their posts. The whole cam case and its attached parts can, therefore, be easily lifted bodily by the lever 75, operated by the rod 74, this lifting action being aided by the springs 112 and 117, already referred to. This motion is effected by the bent end 88 of the lever 75 striking against the lower end 121 of the strengthening fin 119.

In the bottom of the cam case, gains are milled out below and on either side of the bearing boss 102, and in these gains steel pieces 122 and 123, Fig. 28, are placed, the location of these pieces being indicated in dotted lines in Fig. 24, these pieces being fastened to the bottom of the cam case by screws such as 124. Between these pieces, is placed a block 125, cut away on its edges, as shown in Fig. 29, the construction being such that it is free to slide longitudinally. This block is reduced, forming a shoulder 126 near its lower end, and is then provided with an enlarged lower end 127, the whole being provided with a perforation 128, through which the arm 49 passes. The arm 49 is capable of motion longitudinally of the machine in a horizontal plane, but is prevented from motion in a vertical plane and transversely of the machine in any approved manner, and the movement of this arm 49 in a horizontal direction is obtained by a movement of the slotted lever 46, as already described. The block 125 is free to rise and fall, and it is evident from the construction described that it must rise and fall in unison with the corresponding movement of the cam case.

129 represents a forked connecting piece, one end of which is provided with a slightly elongated slot, which is adapted to embrace the shoulder 126, as shown in Fig. 29.

130, Fig. 2, represents a post, the lower end of which is suitably attached to the presser plate 131. This is of the same diameter throughout, except at the top, where it is reduced and passes through a perforation 132 in one of the forked ends of the connecting piece 129. Above the end of the piece 129 is a washer 133, upon which rests the end of the curved yoke 134, being confined there by a nut 135. A precisely similar construction is used in connection with the other fork of the piece 129, the post being shown at 136 on Fig. 5.

The arrangements for holding and adjusting the button chuck will next be described, special reference being had to Figs. 3, 21, 22, 24, and 37 to 39.

Passing through the yoke 134, are two screws on each side, such as 137, Figs. 3 and 22. These pairs of screws pass down and engage a collar 138, Figs. 21 and 22, flanged on its lower end, as shown at 139. The cylindrical part of the collar is cut away, as shown at 140, to provide clearance for the rear side 141 of the front end of the goose neck, Fig. 2, thus permitting the cam case and the parts attached thereto to rise and fall without striking the said goose neck. The bottom of this collar is cut away, as shown in Fig. 22, forming an opening with three rectilinear sides and one circular side. Adjacent to the slot 140, the bottom of the collar is provided with a strengthening piece 142. The collar 138 is recessed on one side, as shown at 143, and the bottom is provided with a slot for the reception of the adjusting screw 144, which is used to adjust the vertical position of the button chuck with reference to the presser plate. The screw 144 passes, at its upper end, through a hole provided in the yoke 134, and it is also provided with collars or flanges 145, fitting around the lower edge of the collar 138, as shown in Fig. 21 and also in Figs. 37 and 38. A collar 146, Fig. 37, is provided on the screw 144, and below this collar the entire portion is screw-threaded and engages in a screw-threaded sleeve 147, forming a part of, or attached to, the button chuck.

The sleeve 147 is formed integral with the block 148, to which the jaws of the button chuck are pivotally attached. Projecting downwardly from the bottom of the collar 138 is a post 149, and the block 148 is provided with a perforation into which the post 149 fits. It is evident from this construction that by turning the screw 144 the block 148 will be caused to rise or fall, being guided in its movement by the post 149 and limited in its upward movement by the shoulder 146.

The button chuck is best shown in Figs. 37 to 41. It consists of the base block 148, in which are pivotally mounted three jaws 150, 151, and 152. The side jaws 150 and 152 are connected by a curved spring 153, which normally tends to force them toward each other. The jaws 150 and 152 are pivoted on the screws 154 and 155, and the jaw 151, which is somewhat shorter than the other two, is pivoted on a screw 156, all these screws being in the block 148. The block 148 is slotted for the reception of these three jaws. The jaw 150 works in the slot 157, the jaw 152 in the slot 158, and the jaw 151 in the slot 159, allowing each of the jaws to work freely in a single plane about their respective pivots, the jaws 150 and 152 moving in substantially the same plane, while the jaw 151 moves in a plane at right angles thereto.

The jaws 150 and 152 are exactly similar in shape, but are symmetrically arranged with relation to each other. Each has a downwardly and inwardly projecting lip 160, forming the bottom side of a groove 161, into which the button is slipped. The side of the groove is inclined as shown by the dotted line 162, Fig. 41. This is for the purpose of forcibly drawing in the button after it has once been inserted between the jaws, if the operator should accidentally happen not to push the button in far enough to fully contact with the central jaw 151, the spring 153 effecting this drawing in action. The jaw 150, however, is provided with a shield 164, screwed thereto. This shield is curved and bent downwardly, as shown in Fig. 37, and serves to prevent the cutting mechanism from getting caught in the button chuck.

The points of suspension of the three jaws are considerably in the rear of the center of the button, as indicated in Fig. 41. Furthermore, each of the jaws 150 and 152 is bent inwardly, as shown in Fig. 37, and then is provided with a forward extension on the lower end, as shown in Fig. 39, and it is in these extensions that the groove 161 is formed. As shown in Fig. 41, these jaws should extend to the front beyond the center of the button, to firmly hold the same, for the purpose just explained, of causing the button to be forcibly drawn against the rear jaw 151.

Located near the lower angle in the jaws 150 and 152, are bearings 165 and 166, having pintles such as 167, integrally formed with the respective bearings and at right angles thereto, which pintles snugly fit in bearing holes in the corresponding jaws and are retained in place by the nuts 168, so that each bearing may have a slight angular movement about the axis of the pintle with reference to its corresponding jaw.

The lower end of the jaw 151 is inclined forwardly, as shown at 169, Fig. 39. Near its lower end, the jaw 151 is enlarged as shown at 170. The post 149 is slotted, as shown at 171, Fig. 22, to furnish a clearance space for the backward movement of the jaw 151.

The rear part of the block 148 is extended downwardly as shown, at 172, Fig. 39. In the rear, this block is gained out, as shown at 173, for the reception of the spring 163, which is held therein by a screw 174. The lower part of the extension 172 is also provided with a slot 175, and a screw 176 passes through this slot and through the enlargement 170 of the jaw 151. This screw is provided with an enlarged body portion 177, rounded on the rear face, as shown in Fig. 41, against which a loose washer 178 rests. This washer is mounted on the smooth rearwardly extending portion of the screw which passes through the part 172, a similar washer 179 being provided outside of the part 172. The rear end of the screw 176 is screw-threaded, and on it is screwed a lenticular shaped nut 180, grooved as shown in Fig. 38, with which an indented portion of the spring 163 is adapted to engage, as indicated in Fig. 41. This is for the purpose of preventing the accidental turning of the screw 176.

The jaw 151 is arranged so that it will move in unison with the jaws 150 and 152, and this is effected by the following construction:—

The lower part of the jaw 151 is provided with a cylindrical hole, shown in dotted lines in Fig. 40, and through this hole a wire 182 is passed, which is then bent until the parts are substantially at right angles to each other, as shown in Fig. 41. The wire may be heated before it is passed through the jaw 151 and then bent. The wire 182 does not fit closely in the jaw 151, but is capable of movement therein. The ends of the wire pass through perforations in the bearings 165 and 166, being adapted to slide in said bearings. The wire 182 is secured in proper relation to the jaw 151 by means of the hole in said jaw already described, and also by means of a compound block, which consists of two side blocks, such as 181, fitting against the opposite sides of the lower part of the jaw 151, as shown in Fig. 37. At their rear ends, the blocks 181 are connected by a cross block 184, which fits in the slots of the blocks 181. The cross block 184 has tenons on each side, which fit into the slots of the blocks 181, as shown in Fig. 38, the two side blocks and the cross block forming a three-sided box with elliptical-shaped slots in the two opposite sides, through which passes the wire 182. As shown in Fig. 40, the side blocks 181 exert a wedging action upon the wire 182, owing to the shape of the wire and to the shape of the slots, and this keeps the front ends of the blocks 181 firmly in contact with the jaw 151. The cross block 184, however, does not fit closely against the rear side of the jaw 151, a slight space being left therebetween, to provide for a movement of the wire 182 independently of the jaw 151. After the parts just described have been placed in position, and pinned together by the pins shown, solder is cautiously applied to the outside point of junction between the wire 182 and the blocks 181, care being taken that the solder does not flow into the hole in the jaw 151. When this has been done, a firm structure is obtained, consisting of the side blocks 181, the cross block 184, and the wire 182. This structure is caused to move in unison with the jaw 151 by means of the wire passing through the hole in said jaw, but is free to turn thereon.

From the construction described, it is obvious that a movement of the screw 176 will cause the three jaws 150, 151, 152 to move toward and away from each other, and thus the distance between the jaws can be varied to suit buttons of different sizes.

It should be noted that the smooth portion of the screw 176 fits snugly in the slot in the part 172 of the block 148, and this prevents any lost motion of the jaw 151 in relation to the chuck block 148. This, in conjunction with the blocks 181 and 184, prevents any tilting of the wire 182, the result being that no matter for what size button the jaws of the button chuck are adjusted, the axis of the button will always be exactly coincident with the axis of the collar 138. Of course, to adjust the jaws of the button chuck for different sized buttons, the screw 176 is turned with a screwdriver, but it sometimes happens that buttons substantially of the same size vary slightly in size, and provision is made to compensate for this by having a slight lost motion between the enlargement 177 of the body portion of the screw 176 and the washer 178.

Referring to Fig. 21, it will be seen that the flange 139 on the collar 138 bears up against the lower flanged end of a ring 185. This ring is made of steel and is screwed by a left handed screw into the forward extension 186, hollowed out to form a ring, on the cam case 89, see Fig. 24. The lower flanged edge of the ring 185 forms a shoulder for the support of the winder gear, 366, and the cam case extension 186 forms an upper shoulder holding the winder gear 366 in place. The ring 185 forms a cylindrical bearing for the winder gear.

It is evident that by the construction already described the presser plate 131 and the button chuck must move in unison, in a vertical direction, with the cam case. The presser plate 131 is connected to the forked connecting piece 129 in the following manner:—

The presser plate has an extension 187, inclined upwardly and rearwardly and terminating in perforated ears 188, shown in Fig. 2, which ears are attached, by means of screws 189, threaded in the perforations 190 to the connecting piece 129. Washers 191, surrounding these screws, are used to keep the proper distance between the ears 188 and the connecting piece 129.

Referring especially to Figs. 2 and 30, the bottom plate 51 is made in two parts, the rear part being thicker and the front part 192 being made thinner, the parts being connected together by a bolt 193, which is also connected with the shaft 194, Fig. 1, through an appropriate mechanism, which is old and well known, which permits the shaft 194 to drive the bottom plate positively in a transverse direction, and yet permits of its free movement in a longitudinal direction when moved by the mechanism hereinafter described.

As shown in Fig. 30, the bottom of the plate 195 is milled out and fits over the bottom plate 51, being secured thereto by screws 196. This plate 195 carries a vertical sleeve 197, which sleeve receives a post 198, having an enlarged head 199, provided with a projection 200, projecting through a perforation in the connecting plate 129 and riveted thereto, as shown in Figs. 28 and 30. The post 198 works freely in the sleeve 197, and a small air hole 201 is provided, passing through the bottom plate 51, to allow the air to escape and prevent a dash-pot action.

The lower end of the grooved arm or post 49 is provided with an enlargement 201ª, below which is a cylindrical portion 202, riveted into the bottom plate 51. 203 represents a square guide block, through which passes a screw 204, which threads into the lower end of the post 49. The block 203 slides in a groove in the bed plate, and one side of the guide-way is formed by the block 205, kept in place by the screw 206 and adjusted by means of the screws 207 to take up any lost motion of the slide 203 in said guide-way.

From this construction, it is evident that the bottom plate 51 and the connecting plate 129 can be shifted in a longitudinal direction, as already described, by the movement of the grooved post 49 and the parts connected thereto.

Furthermore, the screw 193 is connected, as already described, to the shaft 194, causing a positive reciprocation in a transverse direction, while permitting the longitudinal movement of the same, as described. By the connections already described, it is obvious that the connecting plate 129 will be vibrated both longitudinally and transversely in unison with the bottom plate, and as the presser plate and chuck are lifted by the action of the lever 75, the whole structure, including the cam case and attached mechanisms, will move as a whole upwardly, while permitting the levers 7 and 46 to accurately govern the position of the button chuck with reference to the needle. It is further evident, that by means of the screw 144 the button chuck may be adjusted vertically relatively to the related parts, so that various lengths of the thread neck between the button and fabric may be provided for. Furthermore, the parts are so arranged, as already described, that the presser plate, when lowered, comes in contact with the fabric, which has been previously put in, and rests upon it. Consequently, as the presser plate and button chuck move in unison, a neck of thread of the same length will be formed whether the fabric be thick or thin. The length of the neck of thread is dependent only upon the position of the button chuck with reference to the presser plate as adjusted by the screw 144.

The mechanism just described illustrates how the button is sewed on, forming an unwound neck of thread, and it is started in the following manner, reference being had especially to Figs. 1, 2, 3, 4, 6, 7, 9, 11, and 12:

As already stated, the stub shafts 67 support the upper part of the machine, so that it may be tilted back until the back piece 65 strikes the stop 59. In line with the shafts 67, is another shaft 208, and attached to the ends of this shaft by means of screws such as 209, are sleeves 210 and 211. Made integral with the sleeve 210 is an upright lever 212, and similarly, made integral with the sleeve 211 is a lever 213. A sleeve 214 encircles the shaft 208 and fills the space between the sleeves 210 and 211. The upper end of the lever 213 is provided with a spring 215, and this spring is adapted to bear at times against the pin 216, carried by the lever 217. Similarly, the lever 212 is adapted to strike a projecting pin 218 for a purpose hereinafter described. To one side of the lever 213 is fixed an offset 219, having a bent plate 220 thereon. The plate 220 extends toward the front of the machine and is bent to the left, as shown in Figs. 3 and 9. The sleeve 210 is extended upwardly and toward the left, as shown at 221, Fig. 4. This extension has made integral with it an arm or lever 222, Fig. 2. 223 represents a flat spring, bolted at one end to the part 72 and with its rear end bearing against the part 221. This spring, however, has two bearing points, as the part 221 is hollowed out, as indicated in dotted lines in Figs. 2 and 4. The forward end of the arm 222 is provided with a handle 224, projecting sidewise where it may be easily grasped by the operator.

Extending to the left from the part 61, is a post 225, having a notch 226 near its outer end, see Fig. 4. Attached to one side of the lever 222 are ears such as 227, and on a pin mounted in these ears is carried an arm 228, notched as shown at 229, to engage with the notch in the part 225, and also provided on its inner face with two notches, such as 230. 231 represents a spring. This spring is located in a bored out portion of a lug 232, located on the inner side of the lever 222 and bearing against a steel point, which is adapted to engage either one or the other of the nicks 230, so as to hold the arm 228 either in the position shown in Fig. 4 or in engagement with the post 225. The post 225 also limits the upward movement of the arm or lever 222, a slight lost motion being permitted to permit the notched arm 228 to snap over the end of the post 225. 233 represents a similar stop on the part 72, limiting the downward movement of said arm or lever 222.

Made integral with the sleeve 214 is an approximately triangular plate 234, which is connected by means of a wire 235 to the left pedal (not shown.) Also made integral with the sleeve 214 is a projecting cylindrical part 236, which is bored out and into which is let a cylindrical pin 237, being removably fastened therein by a screw 238.

Also made integral with the sleeve 214 is a bent lever 239, adapted at times to interfere with the action of the lever 75, the end of this lever being bent inwardly as shown at 240. The sleeve 214, with its three integral parts, 234, 236, and 239, is freely revoluble on the shaft 208 between the levers 212 and 213.

As already described, the part 65 is extended upwardly, as at 62, and at the rear is provided with a recess 243, as shown in Fig. 4. 241 represents part of this upwardly projecting portion, located opposite to the part 62 and forming with it one upwardly extending frame, the part 241 being enlarged as shown at 242.

The part 242 has a hole in it near its upper end, in which is placed one end of a pin 244, fastened therein by means of a screw 245. Mounted on the pin 244 is a lever 217, provided with a perforated boss 247, through which the pin 244 freely passes. It is also provided with a boss 248 at its upper end. Through this boss passes a screw 249, held in place by a lock nut 250. The front end of the screw 250 bears against a lever 251, which is pivotally mounted on a screw 252, carried in a forward extension of the lever 217. The lever 251 is provided at its upper end with a roller 253, which roller bears against the lever or stop piece 20 and may be adjusted in relation thereto by means of the screw 249.

The lever 217 is provided with a boss 254, provided with a downwardly projecting arm 255, in the end of which is mounted a pin 256.

This boss is shown practically in full size in Figs. 8 to 10, and is provided with a central perforation having a large portion 257 and a smaller portion 258. Through the perforation 258 runs a pin 259, having an enlarged head 260 secured thereto by the screw 261. This pin has an enlarged portion 262, fitting loosely in the perforation 257, and then a smaller portion 263 of the same diameter as the main part of the pin, all these three parts being made integral and the pin fitting loosely in the perforation in the part 254. 264 represents a compression spring, encircling a part of the pin 259 and bearing against the enlargement 262 at one end and against the shoulder formed at the junction of the two perforations 257 and 258. This spring 264 normally tends to push the pin 259 to the left, as shown in Figs. 8 to 10. The head 260 forms a stop limiting the motion of said pin 259 toward the left under the tension of the spring 264.

At the lower end, the lever 217 is bent rearwardly and slightly upwardly, as shown at 265, Figs. 6 and 7. Near its lower end, the lever 217 is provided with a projecting pin 266. Into the end of the part 265 is screwed a headed screw 267, the screw-threaded end being smallest, and then provided with a shoulder, then with a larger shoulder, and finally with a head. On the smaller shoulder, is loosely mounted a lever 268, the lower part of which is provided with a roller 269. 270 represents a pin projecting from the lower part of the lever 217, and a spring 271 is engaged with this pin at one end, passes around the larger shouldered portion of the screw 267, and has its other end engaged with the lever 268, said spring normally tending to throw said lever 268 down into the position shown in Figs. 6 and 7. The pin 266 serves as a stop for the lever 268 in its upward movement, and the pin 270 similarly limits the downward movement of said lever.

Through the parts 241 and 62, is passed a screw 272, the end being screwed into the part 62. This screw passes through the slot 243 and furnishes a bearing for the stopping block 273. Cast on the outside of the part 241 is a boss, through which the screw 272 passes, and between the face of this boss and the head of the screw 272 is mounted a pivoted lever 275, best shown in Fig. 6. On the outside of the part 241 are fixed two pins 276 and 277, which serve to limit the motion of this lever in either direction. A spring 278 is located between the lever 275 and the part 241, one end bearing against the pin 277 and the other end being inserted in a hole in the lever 275, the tendency of said spring being to bring the upper part of the lever 275 in contact with the post 276, as shown in Fig. 6. The lower end of the lever is adapted at certain times to pass above the pin 237, as indicated in Fig. 6, to prevent the plate 234 and all the parts attached to the sleeve 214 from being moved by the left pedal, through the rod 235, from the position shown in Fig. 6, which is the started position, to that shown in Fig. 1, which is the initial position.

The block 273 carries the belt shifting mechanism and the stopping mechanism for the winding mechanism. At about its center, it is cut away, as shown at 279, for a purpose hereinafter described. Fastened to the block 273 near its top, by means of screws 280, is a plate 281, and between the plate 281 and the block 273 is clamped a belt shifter 282ª for the belt of the winding mechanism. At the top, the block 273 is cut away for the passage of the pulley 282. This is a fast pulley which drives the winding mechanism, and there is associated therewith, as hereinafter described, a loose pulley 283, driven by a belt 284, receiving motion from any suitable source of power. In a perforation in the top of the block 273 is mounted the stop pin 285, normally pressed upward by a spring 286 and prevented from turning or from moving upward beyond the position shown in Fig. 4 by any suitable means, the stop mechanism being similar to that already described in connection with the sewing mechanism.

As shown in Figs. 2, 8, 9, and 10, the pin 285 is also cut away to correspond to the contour of the cut-away portion 279 of the block 273. This is cut away to afford clearance for an approximately semi-circular boss 287, carried by the part 62 and the portion 288, which joins the two webs 62 and 241. Bolted to the side of the block 273 is a stop piece 289, consisting of a horizontal part 290 and a vertical part 291, as shown in Fig. 6. The web 241 and the connecting piece 288 are cut away as shown at 292 for the passage of the plate 289 and of the end 263 of the pin 259.

Sliding in a perforation in the boss 287, is a pin 293. The boss, as shown in Figs. 8 to 10, is provided with a perforation of two different sizes, the inner part, adjacent to the plate 289, furnishing a bearing for said pin, and the outer part of the perforation being made larger to provide a clearance space. The other end of the pin 293 is pivotally mounted in the end of the stop lever by means of a screw 294, the perforation in the end of the stop lever, as shown in Fig. 8, being larger than the pin 293, to allow a slight play. 295 represents a spring bearing against the part 62 and against the stop lever, and normally tending to throw said stop lever away from the part 62.

The stop lever is best shown in full and dotted lines in Figs. 2 and 3. It consists of a horizontal part 296, provided with a strengthening rib 297 on its interior. The horizontal part 296 is formed integral with a vertical sleeve 298. 299 represents a screw passing downward through this sleeve and screwed into a lug 300, formed on the inner part of the upright 61, thus forming a long bearing for the stop lever. The strengthening rib 297, at the point of junction of the horizontal and vertical parts already described, is bent and extended upwardly, forming a strengthening rib on the inner side of the sleeve 298, as shown at 301.

The upright 61 is provided with three strengthening ribs, the rib 84 already described, the rib 302 on the opposite side, and the rib 303 near the top of the upright where said upright is bent inwardly, as shown at 304. Several strengthening ribs are provided, because no one of them could continue unbrokenly, because a clearance space had to be provided for the operation of the various levers. The sleeve 298 is confined between the underside of the bent portion 304 and the upper side of the lug 300, and the screw 299 furnishes a long bearing for said sleeve.

As already described, the spring 295 normally tends to throw the end of the arm 296 outwardly. The outward movement of this arm is limited, however, by the head of the screw 305, which screw passes loosely through a perforation in an ear of the arm 296, as shown in Figs. 2 and 4, and into a screw-threaded hole in the web 62, being secured by a set nut 306.

Referring especially to Figs. 2 and 3, the sleeve 298 has made integral with it a horizontal arm 307, located at the top of said sleeve. This arm extends out under the cam case and is joined to a stop pin 308 in the cam case, the action of which will be hereinafter described. This pin is secured in the end of the horizontal arm 307, and at its top is cut away to form approximately a semi-cylinder, as shown in Fig. 3. As shown in Fig. 2, the horizontal arm 307 is cut away, as shown at 309, to afford space for the insertion of a key to engage the screw 50, for the adjustment of the block 48 in position on the grooved post 49, as already described.

A spring 310, shown in Fig. 7, is located with one end in a cavity in the part 288, and bears in a cavity in the block 273, normally pressing said block rearwardly.

In the ends of the part 63, shown in Figs. 2 and 3, are mounted steel bushings (not shown), held in place by screws 311, and within these bushings is mounted the shaft 312, which drives the winding mechanism and to which the pulley 282 is keyed. The hub of the pulley 282 is extended, forming a bearing for the extended hub 313 of the pulley 283, and a headed screw 314, screwed into the end of the shaft 312, holds this loose pulley 283 in position on the hub of the pulley 282. Adjacent to the pulley 282 is the stop piece 315, formed exactly similar to the stop piece 17, already referred to, and it coöperates with the pin 285 in the same manner that the pin 19 coöperates with the stop piece 17. The stop piece 315 and the pulley 282 are fastened to the shaft 312.

On the forward end of the shaft 312, is mounted a spur gear wheel 316, provided with a collar made integral therewith and secured by a pin 317 to said shaft.

As best shown in Figs. 13, 14, and 20, the gear wheel 316 is geared with a smaller gear wheel 318, mounted on the shaft 104. This shaft, at one end, has a bearing in the boss 102, and near the other end it has a bearing in the block which is shown detached in Fig. 27, this block being held within the cam case.

This block is provided with a longitudinal perforation 320, slightly larger than the shaft 104 for the greater portion of its length, but at its end making a bearing 321 for said shaft. The block is also provided with screw-threaded holes 322 and 323, with a screw-threaded hole 324, with a cut away portion 325, and with an extension slotted to form two parallel lips 326 and 327, provided with a perforation 328.

As shown in Fig. 13, this block rests upon annular bushings 329 and 330, being held by screws 331 and 332. Similarly, a shouldered and headed screw 97 is screwed into the opening 324 to form a bearing for a part of the operating mechanism hereinafter referred to. The extension having the lips 326 and 327 is directed rearwardly and forms a guide for the end of the lever 334, whose function is hereinafter explained. A headed bolt 335 passes through the lips 326 and 327, and is screwed into the boss 102, a distance piece or bushing 336 being provided between the ends of the lips, as shown in Fig. 13. As shown in Fig. 14, the lever 334 is cut away, as shown at 337, to clear the bushing 336.

To prevent any lateral displacement of said block with reference to the cam case, I provide a screw 338, passing through a hole 339 in the cam case and also passing through a bushing 340 into a screw-threaded hole (not shown) in said block. When the screw 338 is screwed home, this block is firmly fastened against the side of the cam case.

Secured to the shaft 104 by a screw 341, is a worm 342, which has an extension thereon in the form of a sleeve, having an enlarged clutch head 343, shown on a larger scale in Fig. 18. The shaft 105 has its rear end extending into the center of the clutch head 343, as shown in Fig. 13, the shafts 104 and 105 being in line with each other. The clutch head 343 is provided with only a single tooth, projecting from the face thereof, and this tooth 344 is straight on one face and beveled on the other, or working face.

On the front end of the shaft 105, is keyed a beveled gear wheel 345. The shaft 105 is reduced in diameter in parts, as shown in Fig. 13, forming shoulders 346 and 347. On the front reduced portion is mounted a beveled gear wheel 348, having an extended hub 349, formed integral therewith. On the shaft 105, near the front end but inside of the cam case, is mounted a collar 350 by means of the pin or screw 351. This collar, together with the gear wheel 345, one being on either side of the boss 103, prevents longitudinal movement of the shaft 105. The shoulder 346 and the collar 350 also prevent longitudinal movement of the gear wheel 348 on the shaft 105.

Also mounted on the shouldered portions 346 and 347 of the shaft 105 is a long sleeve 352, best shown in Figs. 13, 15, and 18. The central portion of this sleeve is reduced, as shown, for the purpose of lightening it, and at the other end a groove 353 is cut for the reception of a pin 354, carried by a vibrating lever or plate 355, which controls the longitudinal position of the sleeve on the shaft 105. On one side, this enlarged end is provided with a squared tooth 356, adapted to mesh with a corresponding recess 357 in the gear wheel 348. In Fig. 15, these parts are shown disengaged from each other during the winding operation, and in Fig. 18 they are shown engaged with each other, as in the position of rest and during the knot tying and trimming operations.

The shaft 105, near its rear end, is provided with a squared portion 358, best shown in Fig. 19. Fastened in this squared portion is a pin 359, the ends projecting through said shaft, and on each of these projecting ends is loosely mounted a roller, such as 360, having its edge rounded. The rear end of the sleeve 352 is slotted to form a run-way for the rollers 360, as shown in Fig. 19, and to prevent the walls of the slotted portion of the sleeve from spreading apart, I reduce the diameter of the end, as shown in Fig. 13, and mount thereon a tightly fitting steel tube 362, held thereon by a screw 363. The end of the slotted portion of the sleeve 354 is provided with a projecting tooth 364, one of whose sides is straight, another curved to fit within the tube 362, and the working face inclined as shown at 365. The working face of the tooth 364 and the corresponding working face of the tooth 344 are made at substantially the angle of repose between steel parts when lubricated, so that they may be disengaged from each other without any particular friction to overcome, and so that there may be no tendency for the same to separate during the driving action.

The beveled gear wheel 345 meshes with an annular beveled gear 366, which is the main portion of the winder gear, this gear wheel 366 being mounted upon the steel ring 185 and confined between the edge of this ring and the forward extension of the cam case 186, as already described, and shown in Fig. 21. The winder gear 366 is driven positively, and to one side thereof it is provided with a downward extension 367, shown in side and end elevation in Figs. 35 and 36 and in partial section in Fig. 21. The outer face of this extension is curved as shown in Fig. 54, to correspond with the curve of the cylindrical surface of the gear wheel 366. The lower part of this extension, however, is milled out to form a flattened bearing 368, see Fig. 54, for the reception of the winding spool.

Referring especially to Figs. 35, 36, and 54, this spool consists of plates 369 and 370, united by a sleeve, not shown, and the outer face of the plate 370 is flared to approximately correspond to the cylindrical surface of the gear wheel 366. This spool is mounted upon a bearing 371, which is hollow and is provided with two projecting portions 372 and 373. The inner face of this hollow bearing is riveted or upset to hold the spool in position upon the bearing portion. The bearing 371 is hollow, as already described, and the plate 369 is provided with a pin hole, not shown, so that in winding the spool, the entire spool with the bearing is taken out and slipped into a winding device, with the hole in the bearing engaging the axle of said device and a pin on said device entering the hole in the plate 369, thereby forcing the spool to revolve with the axle of the winding device.

The lower end of the extension 367 is slotted as shown at 374 for the reception of the spool bearing. To secure the spool in position in the extension 367, I provide a spring 375, riveted to the part 367 and of the shape shown in Fig. 35, said spring being cut away, as shown at 376, and provided with a handle portion 377, bent to correspond to the curve of the cylindrical surface of the wheel 366, and adapted to contact with the outer flange 372 of the spool bearing. To remove the spool, the operator takes hold of the handle portion 377 and lifts the end of the spring away from the part 367, whereupon space is afforded for the passage of the flange 372, and the spool and its bearing can be bodily removed from the slot in the part 367. By holding the spring out, as before noted, the spool and its bearing may be reinserted and then the spring snaps back with the part 376 in contact with the flange 372, as shown in Figs. 35 and 36.

To the inner face of the extension 367, I rivet a spring 378, made of light, flat spring steel and bearing slightly against the face of the plate 370. This spring is for the purpose of preventing the spool from overrunning when a sudden pull is given to the thread on said spool.

Opposite the extension 367 and below the gear teeth, the gear wheel 366 is cut away, as shown at 379 and 380, leaving a projection 381, and through a perforation in this projection is passed a pin 382, which serves as a bearing for the winder lever, which has a curved horizontal arm 383 and a depending bent arm 384, best shown in Fig. 31. The pin 382 is kept in place in the projection 381 by means of a collar 385. The free end of the arm 383 is perforated and in this perforation is riveted a post 386, having its central part largest, as shown at 387, and having its ends reduced in size. On the outer reduced end of said post is loosely mounted a roller 388, held in place by a washer 389. The lower end of the arm 384 is bent outward sharply, forming an extension or winder guide 390, which is cut away and provided with a hole 391 for the passage of the winding thread. At the junction of the arm 384 and the extension or winder guide 390, an enlargement 392 is made, which is perforated and provided with a counter-bore, as shown in Fig. 67. Through the perforation passes a pin 393, see Fig. 67, on the screw-threaded end of which is mounted a nut 394, having a milled head and having its inner face counter-bored. The other end of the pin 393 has formed integral with it an enlarged tension head 395. A spring 396ᵃ is placed between the wall of the counter-bore in the enlargement 392 and the counter-bore in the nut 394, and normally holds the head 395 in contact with the outer face of the part 392, as shown in Fig. 53, for example. Through the arm 384, at the angle formed therebetween and the extension 390, is a pin 396, which fits loosely in the hole in the arm and is riveted to or made integral with the head 395. This serves to prevent the rotation of the head 395 and the pin 393, but allows said head to approach to or recede from the part 392, thus governing the tension of the winding thread.

Adjacent to one end of the recess 380, the cylindrical surface of the gear wheel 366 is cut away and in this cut away portion is mounted an irregular shaped bracket 397, curved as shown in Fig. 22 to conform to the outer cylindrical surface of said wheel 366, and secured to said wheel by screws 398. The upper part of this bracket is provided with a projecting portion 399, which serves as a stop, as hereinafter described. The lower end of the bracket 397 is bent downwardly behind the arm 383, forming an extending arm 400, provided with a forwardly bent end 401, which serves as a stop for the outward movement of the arm 383.

Projecting inwardly from one end of the bracket 397, is a flange 402, provided with an opening, and through this opening projects a tube 404. The other end of this tube is soldered to ears 405 on a bent plate 406, pivotally mounted on a screw 407, attached to a shoulder near the junction of the arms 383 and 384. A spring 408 encircles the tube 404 and bears against the flange 402 and the ears 405, and normally tends to throw the outer end of the extension 390 away from the button, thus producing at all times a gentle tension on the winding thread.

The winding thread, as shown in Fig. 54, is drawn from the spool and passes through the tube 404 and is then passed down around the pin 396, then passed forwardly and around the pin 393, and then out through the hole 391 in the extension 390 and to appropriate mechanism hereinafter described.

By the means described, the tension upon the winding thread is regulated. By reason of the location of the pins 393 and 396 and the head 395 on the pin 393, on the outside of the junction of the arm 384 and its extension 390, it will be seen that as the winding mechanism rapidly revolves the tension of the spring 396 will be opposed by the effect of centrifugal force upon the parts 393, 394, 395 and 396, which lightens the pressure upon the thread and consequently reduces its tension. Hence it is evident that the button is wound with a lighter thread tension than the tension during the knot tying and other operations, during which the motion of the winder gear is much slower than during the winding operation. These tension devices may be made of any desired weight, so that the reduction of tension due to the centrifugal force may be of any degree desired.

The flange 402 also carries the means for sweeping the waste ends of thread from the throat plate. Referring especially to Figs. 5, 22, and 23, the flange 402 is provided with a threaded hole, in which works a headed screw 409, and also with perforations 410 for the passage of steadying pins. 411 represents a flat plate, also provided with holes for steadying pins, and by means of said pins and the screw 409, the plate 411 is firmly attached to the flange 402. The lower end of the plate 411 is provided with a hollow head 412, into which bristles 413 are introduced and secured in any suitable manner, forming a brush.

The plate 411 is provided with a slot 414, and adjacent to that slot are two plates 415 and 416, as shown in end view in Fig. 20, attached to the plate by screws such as 417, passing through said plates and into the plate 411. Each of the plates 415 and 416 is provided with an inwardly projecting notch, shown in Fig. 23, and part of these notches is provided with knife-edged portions, but the notches are arranged in different directions, as shown in Fig. 23, so that as the thread is drawn between them it meets the cutting edges of both plates and is immediately severed. The function of this severing device in the plate 411 is to provide a convenient means for determining the length of the loose end of the needle thread when the needle thread is drawn through the needle. There is always a loose end, which is usually trimmed off by the scissors and whose length is indeterminate, but by the use of this device the excess of the needle thread can be quickly severed, leaving the loose end of a determinate length in each case. This is done by bringing the end 418 of the needle thread into the slot 414, Fig. 5, and pulling it against the knife edges of the plates 415 and 416, whereupon the loose end of the thread 418 beyond the eye of the needle will be of exactly the right length.

The end 418 of the sewing thread is the loose end at the beginning of the sewing operation, and this is only provided when the needle is threaded up at the beginning. At the end of the operation of sewing on a button, a loose end of thread 419 is left, see Fig. 79. This end passes through the button and through the fabric, and must be removed therefrom prior to the winding operation, as otherwise it will be gripped in by the winding thread. The mechanism for performing this removal will next be described, reference being had to Figs. 5, 14, 20, 32, 33, and 53.

During the winding operation, the arm 383 is drawn by the tension of the winding thread up against the top of the recess 380, formed in the gear wheel 366, as shown in Fig. 20, and in this position the roller 388 projects outwardly some little distance beyond the circumference of the gear wheel 366. To furnish a clearance space for said roller, the cam case is provided with a groove 441, shown in Figs. 22 and 26. If it should happen that during the winding operation the winding thread should break, the spring 408 would force the arm 383 down into contact with the stop 401, and during the further revolution of the winder gear, this arm would strike some of the knot tying mechanism, producing breakage. To obviate this, I have provided a wing 442, made integral and extending down from the cam case, see Fig. 21, provided with a curved face 443, then as the winding mechanism revolves the roller 388 strikes this curved face 443 and is brought up into the groove 441 and supported by the bottom thereof, until it has passed this knot tying mechanism. As shown in Fig. 22, the groove is extended far enough around to enable the arm 384 and extension 390 to completely clear the knot tying mechanism as the winder gear revolves.

Mounted on the goose neck of the machine is a cylindrical boss or stud 420, see Figs. 33 and 53, and screwed into this boss is a screw 421, having an enlarged head adapted to fit in a recess 422 in a part hereinafter described. The screw and the stud afford a bearing for the compound lever hereinafter described. This lever consists of an upper portion 423, bent at right angles, as shown at 424, and provided with a forwardly extending end 425, adapted to be struck at certain times by an appropriate member of the knot tying mechanism. The inner end of this arm 423 is bent downwardly, as shown at 426, and then toward the left, Fig. 32, as shown at 427, projecting under a part of the goose neck, which acts as a stop therefor, limiting its upward movement.

The upper part 423 of the compound lever is kept in the position shown in Fig. 53 by means of a spring 428, attached to a stud 430 in said lever, and to a screw 429 on the goose neck of the machine. The lower part of the compound lever is formed by a steel plate, bent in several planes, as best shown in Figs. 5, 14, 32, 33, and 53.

It consists of a straight portion 431, having a downwardly bent end 432, terminating in a hook 433, the normal position of which hook is immediately behind the needle. The upper part of the plate 431 is curved upwardly and rearwardly, as shown at 434, then provided with a substantially horizontal portion 435 and a vertical portion 436. On the rear end of the part 435, is a projecting arm 437, having a boss 438 on its upper face, and a spring 439 engages this boss and the lower end of the pin 430, which is connected to the upper part of the compound lever. It is evident from the construction shown, that a movement of the upper part of this compound lever will produce a movement of the lower part of the compound lever by means of the spring 439, unless there is some resistance. If, however, any undue resistance is encountered, as, for example, if the cutters should neglect to cut the needle thread 419, as shown in Fig. 79, the provision of the spring 439 would obviate the breaking of the needle, which might otherwise occur. 440 represents a screw, projecting from the goose neck a slight distance and adapted to be struck by the part 436 to limit the forward movement of the lower part of the compound lever.

Referring to Figs. 65 and 66, 444 represents the upper surface of the horizontal cam disk, and Fig. 66 is a section of the same, taken on the line 66—66 of Fig. 13, looking downward in the direction of the arrows. Both the upper and lower face of this horizontal cam disk are provided with a plurality of grooves, the top face being provided with the grooves A and B, and the bottom face being provided with the grooves C and D. The groove A is adapted to operate the extension lever 445 by means hereinafter described. The groove B is adapted to operate the mechanism for twisting the knots, hereinafter referred to as the twister.

The groove C operates the knotter, and the groove D operates the winder, all as hereinafter described.

Projecting upwardly from the inner face of the cam case 89 is a perforated boss 446, and the cam is mounted on a pin 447, screwed into said boss, the boss forming a lower bearing for said cam. The pin 447 is provided near its upper end with a reduced portion, forming a shoulder, said reduced portion being screw-threaded, and against this shoulder fits a washer 448. 449 represents a nut, provided with an internally screw-threaded hub or sleeve, said hub having a smooth circular surface 450 for a purpose hereinafter described. This hub is adapted to screw down against the top of the washer 448, thus making the upper bearing for the cam 444. Embracing the smooth portion 450, is the slotted end of a plate 451, as shown in Figs. 3 and 15, which plate is provided with a circular slot 452 and also with a radial slot 453. This plate is provided with a curved extension 454, having on its under face a pin 455 for a purpose hereinafter described. The outer part of the plate 451 is reduced in size, as shown at 456, and it carries a spring clip for determining the number of threads applied to the neck of thread between the button and winding mechanism by the winding mechanism. This spring clip includes a handle 457, bent upwardly, and a spring 458 normally holds this handle elevated. The clip is pivoted on a pin 459, passing through the extension 456, and it is provided with a tongue 460, which fits within the radial groove 453, the upper part of the clip being made broad enough to fit over the sides of the groove, as shown in Fig. 15.

The cam case is provided with a cut away portion 461, so that the plate 451 may be swung from side to side, its motion being limited by the walls of said groove. The cut away portion is also provided with two smaller cut away portions 462 and 463, Fig. 24, into which the tongue 460 is adapted to fit, being forced thereinto by the pressure of the spring 458. When the parts are in the positions shown in Fig. 15, with the tongue 460 engaging the cut away portion 462, the machine is set for winding fifteen turns of thread around the neck of thread between the button and fabric. When the tongue 460 is similarly engaged with the cut away portion 463, the machine is set for ten windings, as shown in Fig. 3. Obviously, however, the machine might be set to give any number of turns of the winding thread around the neck of the thread securing the button to the garment. The cover 469 of the cam case, which is removably attached thereto by screws such as 470, is provided with marks in line with the cut away portions 462 and 463, and the spring clip is provided with an upwardly extending pointer 468, adapted to register with these marks when the parts are in the proper position, these marks being numbered "Ten windings," "Fifteen windings."

To prevent the part 451 from being lifted out, a curved steel strip 464 is provided, narrower than the cut away portion 461 of the cam case, as shown in Fig. 2. This strip is held in place by screws 465 and 466, and the inner end of the screw 466 affords a bearing for the spring 467, hereinafter described. Projecting upward from the inner face of the bottom of the cam case, is a perforated boss 471, cut away as shown at 472 to clear the extension 454 of the plate 451, this boss being located inside of the curve 95 and formed integral with the bottom and side of the cam case. In the screw-threaded perforation in the boss 471, the end of a screw 473 engages, said screw having an expanded head, a smooth portion forming a shoulder, and a screw-threaded portion which screws into the opening 474 of the boss 471. The smooth portion of this screw forms a bearing for the flat plate 355, and this plate rests on the boss 471, being confined by the head of the screw 473. This plate is approximately triangular in shape and is provided with a projecting portion, with which the end of the spring 467 engages, thus tending to press the lower part of the plate 355, which acts as a lever, toward the right, as shown in Fig. 15. As already described, a screw 354 passes through one end of the plate or lever 355, and its lower end is milled off so as to form approximately a semi-circle, as shown in Fig. 18, and engages the groove 353 to shift the clutch, as hereinafter described.

The plate 451 is also provided with an opening through which passes one end of a bolt 475, which is confined in place by a nut 476. This bolt also passes into the plate 355, a washer 477 being introduced between the plates 355 and 451. The lower end of this bolt is cut away so as to form an approximately triangular point 478, shown in Fig. 16 and also shown dotted in Fig. 15.

The cam 444 is provided on its periphery with a series of worm teeth 479, which extend completely around the cam and mesh with the worm 342. The upper face of the cam is also provided with a peripheral recess 480, extending completely around the cam. On one part of the upper face of the cam, a milled out portion is provided, and in this is secured a steel plate 481, by means of the screws 482. This plate has a rounded outer edge, lying just above and in line with the outer surface of the gear teeth 479. The edge 483 of the plate 482 is substantially radial and the edge 484 thereof is inclined to a radial line.

When the sewing operation is finished and the winding operation begins, the winding thread is in the position shown in Fig. 67, which is also the position of rest. If the winding mechanism should be started at full speed at once, it would snap the thread, because a large amount of winding thread must be drawn through the tension device at the beginning while the part 390 is passing from the position shown in Fig. 67 to that shown in Fig. 68. When, however, the parts have reached the position shown in Fig. 68, only enough thread need be drawn through the tension device at each revolution of the winding mechanism to furnish one turn of thread for the neck of thread connecting the button with the fabric, and therefore after reaching the position shown in Fig. 68, it is possible to run the winding mechanism at full speed without any danger of snapping the thread. I therefore provide that the winder guide, while traveling from the position shown in Fig. 67 to that shown in Fig. 68, shall be driven at a comparatively slow speed by the cam 444. During this slow driving movement of the winding mechanism, the parts are in the positions shown in Figs. 3 and 18, with the teeth 344 and 364 disengaged and with the tooth 356 engaging the recess 357 in the gear wheel 348.

When, however, the guide has reached the position shown in Fig. 68, the sleeve 352 is shifted from the position shown in Figs. 3 and 18 to the position shown in Fig. 15, disengaging the tooth 356 from the recess 357 in the gear wheel 348, and bringing the tooth 364 into operative relation with the tooth 344, at which time the shaft 104 directly drives the shaft 105, driving the winder gear at its maximum speed, although the cam 444 still continues to revolve.

This shifting is accomplished in the following manner:

As the cam 444 revolves, the inclined face 484 of the plate 481 strikes the pin 455 and forces the latter outward. This pin carries with it the plate 451. This plate is guided by the slot on its inner end and also by the tongue 460 of the spring clip, and is therefore forced to move in a radial direction. The plate 355, being pivotally connected by the bolt 475 to the plate 451, is therefore swung on the screw 473 against the tension of the spring 467, throwing the clutch sleeve 352 from the position shown in Fig. 18 to that shown in Fig. 15, whereupon, as hereinbefore described, the shaft 104 drives the shaft 105, and thereby the winding mechanism, at its maximum speed.

This condition is maintained as long as the pin 455 is in contact with the plate 481, but before said plate leaves said pin it engages with the pin 478 and keeps the parts in the position described until the edge 483 of the plate 481 passes beyond the straight face of the pin 478, whereupon the spring 467 forces the plate 451 inwardly, disengaging the tooth 364 from the tooth 344, and the winder gear is stopped by appropriate mechanism.

The motion of the cam 444 then continues, and by means of the grooves A, B, C, and D and mechanism operated thereby drives the knot tying and thread severing mechanisms until the complete cycle of operations is finished, near the end of which cycle the stopping mechanism is brought into play.

This mechanism is operated in the following manner:—

The cam 444 has on its bottom surface and extending outwardly beyond the gear teeth and having its lower surface flush with the lower face of the cam, an extension 485, having its front end inclined as shown at 486, and its rear edge 487 lying substantially on a radial line and secured to the bottom of the cam in a recess therein by a screw 488ª. As the cam revolves, the inclined face 486 strikes against the pin 308, Fig. 3, forcing the said pin away from the center of the cam until said pin passes beyond the edge 487, when it is free to return to its original position under the tension of the spring 295, see Figs. 3 and 8. This movement of the pin 308, by the connections already described, causes the transfer of the belt 284 from the tight pulley 282 on the shaft 312 to the loose pulley 283, when the shaft is stopped, as hereinafter described.

When the winding operation is finished, the knot tying mechanism is brought into play, and this mechanism will now be described.

The extension lever 445 and the operating means therefor will be described first in this connection.

This lever is operated by the lever 334. The cam case is provided at the junction of the straight side 91 and the curved side 92 with a perforated boss 488, formed integral therewith, and with the internal part cut away as shown at 489 to afford clearance for the cam 444. A screw 490 passes through a perforation in the end of the flat lever 334, and the lower end is threaded in the perforation in the boss 488, said boss and the head of said screw furnishing shoulders to confine the end of said lever in place. This lever is provided with an extension 491, on which is mounted a roller 492, engaging in the cam groove A, Fig. 65, and it is evident that the revolution of the cam will cause various movements of the flat lever 334, as hereinafter described. The flat lever 334 extends between the lips 326 and 327, as shown in Fig. 13. Pivotally mounted on the free end of the lever 334 is a joint 493, the other end of which is pivotally connected to a horizontal link 494, the pivots being arranged at right angles to each other to permit universal movement, as shown in Figs. 3 and 20. The link 494 is reduced in size at 495 to afford clearance for other parts hereinafter described. The other end of this link is reduced, as shown at 496, and engages with ears on the joining piece 497, the joint between these parts being at right angles to the joint at the other end of said link, and the part 497 is pivotally mounted on a pin 498, made integral with or riveted in the vertical arm 499 of the extension lever 445. A nut 500, Fig. 14, is provided to prevent disengagement of the part 497 from the pin 498. The arm 499 passes downward through a hole 501 in the cam case, Fig. 24, and at its lower end terminates in a sleeve 502, the arm 499, sleeve 502, and extension lever 445 being all made of a single piece. This sleeve 502 is pivotally mounted on a long screw 503, headed and shouldered as shown in Fig. 14, and passing through a lug 504 on the bottom of the cam case, which is counter-bored so that the head of the screw may come flush with the outer surface thereof, and the end of which is screw-threaded into the lug 505, formed integral with the bottom of the cam case, see Figs. 24 and 25, whereby a long bearing is formed for the sleeve 502. The upper part of this sleeve is cut away to afford clearance for the prong 506 of the plate 129, as shown at 507, in Figs. 14 and 57.

The extension lever has a stout arm 508, extending forwardly and inclined downwardly slightly and joined to an enlargement 509. This enlargement has screwed into it a screw 511, supporting a roller 510, for a purpose hereinafter described. From the boss or enlargement 509 extends to the left, as shown in Fig. 5, a horizontal extension 512, provided with a vertical extension 513, having a slot 514 for a purpose hereinafter described. The front end of the boss 509 is extended to the right and then around to form a curved portion 515, the end of which comes in close proximity to the part of the cam case which is provided with the groove 441, see Figs. 3 and 22. The lower face of the part 515 is approximately horizontal when the parts are in the positions shown in Fig. 1, and is adapted to strike the roller 388 for a purpose hereinafter described. The boss 509 is also provided with an inwardly extending boss 516, see Figs. 14 and 57, which furnishes a stop against which the projecting part 399 of the bracket 397 is adapted to strike to stop the winding mechanism after the power has been shut off, as before explained. When the stopping occurs the winder guide 390 is in the position shown in Fig. 68, which is the position assumed both at the beginning and the end of the rapid motion of the winder mechanism.

The curved portion 515 of the lever 445 is adapted to strike the end of the lever 423 during the slow movement of the winder guide from the position shown in Fig. 67 to that shown in Fig. 68, for a purpose hereinafter to be described.

The mechanism for slowly operating the winding mechanism at the beginning of its movement from the cam 444 will next be described. This also controls the winder gear during the knot tying operation.

Mounted on the bushing 329 is the perforated end of the lever 517, see Figs. 13 and 14, the free end of which is provided with a curved extension 518, having beveled gear teeth 519 thereon. These teeth mesh with the teeth of the gear wheel 348 on the shaft 105. The cam case is thickened, as shown at 520, Fig. 13, and a recess 521 is cut in the rear of this thickened portion, provided with a hole 522, and in this hole is mounted a pin 523, carrying a frame provided with ears 524. This frame is held and secured in place by a screw 525, passing through a perforation in said pin and screwed into the extension 520 of the cam case, as shown in Fig. 13. On a pin 524ª mounted in the ears 524 is mounted a roller 526, which bears against the under face of the part 518, holding the gear teeth 519 always in mesh with the teeth of the beveled gear wheel 348. The lever 517 is provided with a roller 527 on its upper face, which engages the cam groove D on the under part of the cam. The screw 331 in the bushing on which the bent lever 517 is mounted, passes through the hole 528 of the cam case, see Fig. 24, and is located immediately under the screw 97, already referred to. Mounted on the bushing 330 is another bent lever 529, having a curved extension 530, provided with spur gear teeth 531. The lever 529 is in the same horizontal plane as the lever 517, but is so shaped as to clear it in every position assumed by both these parts during the operation of the machine. The lever 529 is provided on its upper face with a roller 532, which engages the cam groove C.

On a shoulder on the screw 97, Fig. 13, is mounted a third bent lever 533, having a curved extension 534, provided with spur gear teeth 535. On its under side, this lever is also provided with a roller 536, which engages the cam groove B. The lever 533 is in the same horizontal plane with the lever 334, but the parts are so arranged that they never interfere with each other.

The extension 520 of the cam case is recessed out as shown at 537, and this extension is provided with a still further downwardly extending portion 538, cylindrical on one side and merging into the part 443, as shown in Fig. 26, and this part of the cam case furnishes a support for the main portion of the knot tying mechanism, which mechanism is shown in detail in Figs. 42 to 52, inclusive, and in Fig. 78. Through the part 538, which is hollow, extends a sleeve 539, and within this sleeve 539 is mounted a shaft 540, near the upper end of which is provided a shoulder 541. The upper end of the sleeve 539 is cut away, and on this cut away portion is mounted a steel tube 542, having an expanded upper end 543, provided with a perforation 544.

Just above the part 543 of the tube 542, and the top of the sleeve 539, is the expanded head 545 of a sleeve 546, which sleeve fits over the top of the shaft 540. The upper portion of the sleeve 546 is provided with gear teeth 548, annular flanges 549 and 550 are placed over said sleeve, and screws 551 and 552 secure said flanges to the sleeve 546, and also secure said sleeve to the shaft 540, the flanges 549 and 550 acting as guides for the curved end 534 of the lever 533.

A gear wheel 554, as shown in Figs. 42 and 47, has a hub 555, extending downwardly within a perforated block 553 and embracing the tube 542. At its upper end, it is provided with a serie of gear teeth 556, extending only partly around the gear wheel, since said gear wheel makes only one-half of a revolution in either direction. The block 553 is cut away, as shown in Figs. 42 and 47 at 558, and the hub 555 is also cut away opposite the cut away portion in the block, as shown in Figs. 42 and 47, and in these cut away portions, which form one cylindrical hole, is mounted a spring 557, which bears against a ball 559, the part 543 having the perforation 544 cut through it in line with and of the same size as the cut away portions 558. The ball 559 projects through the perforation 544. The under side of the flat face of the part 545 is also provided with a counter-sunk portion 547, into which this ball is adapted to fit, this construction being adopted so that the flanged portion 545 of the sleeve 546 will have a definite stopping position with relation to the gear teeth 556. 560 represents a screw, which is screwed into the block 553 and has its face rounded off to be flush with the exterior of said rounded block, and having its inner part smooth and passing through the hub 555 of the gear wheel, through the tube 542 and into but not through the sleeve 539, compelling the parts 553, 555, 542, and 539 to move in unison. The teeth 556 of the gear wheel 554 are engaged by the teeth on the extension 530 of the bent lever 529, as shown in Figs. 13 and 14.

The lower end of the sleeve 539 is enlarged to form a head 561, having a triangular extension 562, see Fig. 44. Passing through the corners of the head 561 are four screws 563, which fasten the knotter 564 to said head. The part 564, looked at from the right side of the machine, as shown in Fig. 43, is substantially the shape of an inverted L having one corner beveled off as shown at 565 to afford clearance for the arm 390 during certain parts of the operation. At the bottom, this L-shaped portion is provided with an extension 715, and a screw 566 passes through the part 562 and is screw-threaded into the lower one, 715. The top of the knotter 564 is provided with a cylindrical bore 567, shown in dotted lines in Fig. 43, and the bottom of the part 561 is provided with a cylindrical extension 568 fitting therein. The extension 568 fits only into the top of the bore 567, as shown in Fig. 43, leaving a space for the gear wheel 569, which is fixed to the bottom of the shaft 540. A washer 570 is introduced between the lower surface of the extension 568 and the upper face of the gear wheel 569, to form a thrust bearing resisting the action of the spring 558 against the flange 545. As shown in Fig. 48, the L-shaped portion is provided on one side with a slot 571, and is bored for the reception of the twister body 572 and counter-bored, as shown at 573, for the reception of the gear wheel 574, carried by said twister body, this gear wheel meshing with the gear wheel 569. The washer 570 is of such a thickness as to provide for the proper engagement between the teeth of these gear wheels. The outer edge of the L-shaped portion just below the slot 571 is rounded, as shown at 578, and terminates in an extension 575, having a beveled edge 576 and having the lower corner rounded off as shown at 577. The rounded portions 577 and 578 are for the purpose of allowing the thread to slip easily into the proper position during certain parts of the operation of the machine, and the part 576 is cut away to afford clearance for certain parts of the machine.

To the front portion of the L-shaped portion is secured a plate 579, having a horizontal slot running inward to the center in line with the slot 571, this plate being secured by screws 580. This plate is provided with a cylindrical hole 581, in line with the cylindrical hole in the L-shaped piece, which receives the body portion 572 of the twister.

On the screw 566 is mounted a long sleeve 582, which has a rearwardly extending web 583, which is slotted as shown at 584 for the passage of the finger 585, hereinafter described. This finger is mounted upon a bushing 586, carried by the screw 566 and slightly longer than the thickness of the finger 585, so that if any undue strain should occur, this strain would be taken up by the bushing and would not prevent the operation of the finger 585.

A slot 587, Fig. 45, is cut in the lower part of the web 583, leaving the forward lower portion cylindrical, as shown in Fig. 48, and around this cylindrical portion is wound a spring 588, one end of which, as shown at 589, bears against the L-shaped portion already described, and the other end 590 bears in a groove in the pin 591, for a purpose hereinafter described.

The part 583 is cut away to clear the adjacent corner of the parts 561 and 564 during certain parts of the operation, leaving a corner 592 which serves as a stop for the finger 585. As shown in Fig. 42, the part 583 to the left of the corner 592 forms the spandrel of an arch 593, which extends upwardly and toward the right, terminating in a lug 594, which extends rearwardly and upwardly, having its top surface slightly above the top surface of the part 561. To this top surface, by means of the screws 595, is secured a flat steel plate 596, having its inner end extending over the part 561 nearly to a line passing through the center of the shaft 540 and parallel with the front surface of the L-shaped part 564.

The slot 584 for the reception of the finger 585 is substantially in line with the slot 571, already described.

As already described, the web 583 fits between the parts 715 and 562. It then has a downwardly extending portion 597, and in fact the entire lower face, as shown in Fig. 78, except the part to the right of 597, is substantially in line with the lower face of the part 715. The rear face is beveled, as shown at 598, and inclined as shown at 599, and the rear portion is considerably thickened, as shown at 600, and from this thickened and inclined portion extends a portion 601, curved on the rear as shown partially in full lines and partially in dotted lines on Fig. 43, to form at one part substantially the quadrant of a cylinder, terminating in a part 602, which is substantially a portion of a sphere. The top of the part 601, as shown in Fig. 48, is in line with the bottom surface of the slot 584. The front portion of the part 601 is cut away, as shown at 603, to form clearance space for the threads during the twisting operation.

To the end of the part 602 is attached a horn 604, having its upper end provided with a groove, as shown at 605, and having its outer surface curved, as shown at 606. It is also provided with an inner curved surface 607, which joins the curved surface on the part 602 on the line 608, forming a groin, for a purpose hereinafter described. The curved surfaces 606 and 607 are joined together, forming a curved line of intersection 609, and the whole horn terminates in a point 610. A substantially flat surface 611 joins the cut away portion 603 of the part 601 and shades into it, as shown in Fig. 48. Hence it is evident that the whole structure just described is free to move on the screw 566 and is normally kept in the position shown in Figs. 43, 44, 45, 48, and 78 by the tension of the spring 612. The part 575 is provided with a perforation having a right handed screw-thread therein, and the horn is provided on one face with a recess and the spring 612 fits into this perforation or recess, being a left handed spring, and is confined by the screw 613. The spring 612 is provided for the purpose of producing a suitable tension on the beginning end of the winding thread during the knot tying operation, but it is evident that during the winding operation it is necessary that this spring be prevented from yielding under the tension of said thread, in order to provide that there shall be sufficient compression of the spring obtainable during the knot tying operation. To effect this, the part 443 has projecting downward from its lower face a pin 614, against which the plate 596 is adapted to strike, and it is evident that if the knotter, as shown in Fig. 44, were turned in a counter-clockwise direction, the plate 596 would strike the pin 614 and prevent the movement of the structure included with and carried by the web 583, on the screw 566.

As already described, the finger 585 is mounted on a bushing on the part 582, which is supported by the screw 566. This finger has one end curved as shown at 615, and has its outer portion enlarged, as shown at 616. On the lower face of this enlarged portion is mounted a lever 617, approximately a bell crank lever, said lever being mounted on a pin 618, projecting downwardly from said finger. The lever 617 carries the grooved pin 591, already referred to, and the tension of the end 590 of the spring 588 normally tends to force said lever outwardly and into contact with the pin 619, riveted or fastened to and projecting downwardly from the under face of the finger 585, as shown in Fig. 45. Projecting downwardly from the under face of the lever 617 is a pin 620, carrying a roller 621, for a purpose hereinafter described.

The twister mechanism will next be described, special attention being called to Figs. 42 and 48 to 52.

622 represents the frame of the twister, which, as shown in Figs. 49 to 52, is generally cylindrical in shape, with an under cut annular portion 623, and provided with a pin 624. 625 represents a tubular piece of steel, provided with a beveled end to fit in the groove 623 and forming a casing for the twister to keep out dust and dirt, the construction being such that the whole may be readily taken apart. The gear wheel 574 is fastened to the twister body by a screw 626 and also by smaller screws 627. The tube 625, the twister body 622, and the gear wheel 574 are each provided with a radial slot 628, extending from the circumference to the center and having a rounded inner end, as best shown in Fig. 52. The tube 625 fits tightly upon the twister frame 622 under the under-cut edge 623 thereof, and at the other end is confined by the gear wheel 574, which fits over it, as shown in Fig. 50.

The twister frame 622 has milled in it a flat bottomed slot 629, the bottom of which is substantially in line with the outer edge of the under cut groove 623. Through one side of the twister frame is bored a cylindrical hole 630 for the reception of the sliding pin 631, this hole extending into the twister frame up to the inner end of the screw 626, and having a flat bottom, as shown in Fig. 50. Then the twister frame 622 is milled out, forming a flat bottomed slot 632. In addition, a circular slot 633 is cut centrally of the twister frame 622 and at right angles to the slot 632.

Holes 635 are then drilled through the twister frame 622, parallel to the slot 628, and into these holes pins such as 634 are inserted. On these pins are mounted the twister jaws 636. These jaws, as shown in Fig. 49, are similarly arranged and provided with interlocking serrations 637. The combined length of the two jaws is slightly greater than the distance between the two pins 634, so that a pull to the right, as shown in Fig. 49, will bind the jaws together, exerting a toggle action, so that any pull on the thread in this direction will increase the pressure or biting effect of said jaws upon said thread. Each of said jaws is provided with ears such as 638, perforated for the reception of the corresponding pin, and around each pin is wound a spring such as 639, one end of said spring being introduced into a hole in the twister frame 622, as shown in Fig. 49, and the other end of said spring bearing against the solid portion of the corresponding jaw adjacent to the ears 638. The tendency of these springs is to restore the jaws to the positions shown in Fig. 49 after each displacement therefrom, and to keep them there. Each jaw is provided with a projecting pin, such as 640. The inner end of the pin 631 is cut away, as shown at 641, and in the bottom of the cut away portion a flat bottomed slot 642 is formed, into which the pins 640 enter. The reason for this construction is to afford ready means for assembling these parts. The slot 632 is to provide passageway for the pins 640 while the jaws are being placed in position; the slot 628 is for the passage of the thread; and the slot 633 is to provide working clearance around the pins 640.

On the front of the gear 574 is located a cutting device, consisting of three plates, an outer plate 694, a second plate 695, and an inner plate 696. The front or outer plate 694 is nearly L-shaped on one side, as shown in Fig. 42, and has a triangular opening, the lower edge of which terminates in a beveled portion 697, forming a knife edge. The middle plate 695 is also nearly L-shaped, but oppositely disposed, and this plate also has a slot terminating in a beveled off portion forming a knife edge. All three of the cutting plates are fastened to the gear 574 by screws, as shown in Fig. 42, and the right hand edges of the outer plates are rounded, as shown in said figure, so that the thread may be easily guided into the space between the knife edges of the plates 694 and 695. Of course, when the thread is forcibly drawn against these knife edges, it is immediately severed.

In the boss 643 of the cam case, see Fig. 24, is mounted a long pin 644, the reduced end of which is screw-threaded and provided with a nut 645, a washer 647 being provided on the inside of this nut. A screw 646 passes through the boss or lug 643 and through the pin 644, securing the latter in place.

On the pin 644 are loosely mounted two levers 648 and 649. Projecting forwardly from the cam case is a lug 650, having holes therein through which project steel pieces such as 651, which serve as stops for the leftward motion of the levers under the influence of the springs 690 and 691, best shown in Figs. 3 and 5. The front lever 648 includes a sleeve 652, having projecting downwardly therefrom a triangular portion 653, adapted to contact with the boss 650 to provide a limit for the movement of the lever 648 toward the right. The upper end 654 of the lever is bored out, and in the bored out portion is fixed a steel pin 655, having a head 656 on its lower end and secured in place by the cotter pin 657. This head is adapted to strike the steel piece 651 in the lug 650, thereby forming a limit for the movement of the lever 648 to the left.

The lever 648 is also provided with a straight arm 658, having a triangular extension 659. In this extension is revolubly mounted the upper end of a bent link 660, which is prevented from disengagement from said lever by a cotter pin 661 and washer 662. The lower end of the link is bent and engages the slot 514 in the extension lever 445, and this extension lever therefore operates the lever 648, as hereinafter described. The straight arm 658 is provided with a projecting handle 663, so that this lever may be operated by hand during the operation of threading up the winding and knot tying mechanisms.

Figure 56:
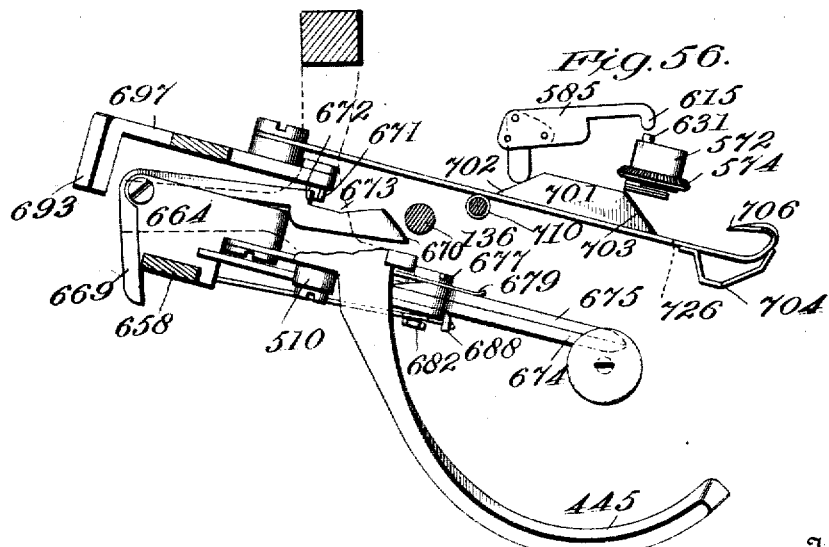
Fig. 56 is a sectional plan view taken on the line 56—56 of Fig. 55, certain parts being omitted.

The lower end of the arm 658, as shown in Fig. 62, is provided with an extension 664, extending rearwardly and sidewise. Pivotally mounted on the outer rear corner of this extension, is a bent latch 665, mounted on a screw 666, and this latch works in a slot 667 in the extension 664. A spring 668, which is mounted in a cut away portion of the extension 664, presses against said latch and normally holds the outer arm 669 of said latch in contact with the arm 658, as shown in Fig. 62. As shown in Fig. 56, the arm 669 extends a considerable distance to the front of the arm 658 for a purpose hereinafter described.

The inner end of the latch 665 is provided with a beveled face 670, which is adapted to strike the post 136 and disengage the lever 648 from the lever 649. The lever 649 is provided with a forwardly projecting pin 671, see Fig. 56, and the latch 665 is provided with a shouldered portion 672, adapted to engage said pin, a clearance slot 673 being also provided.

Carried by the extension 664 is the severing mechanism or thread cutter, composed of a front and lower blade 674 and the rear or upper blade 675. The blade 675 is pivoted on a shouldered screw 676, which enters a screw-threaded perforation in the extension 664.

677 represents a screw, which passes loosely through the rear blade 675, as best shown in Fig. 63. Said screw is provided with a reduced screw-threaded portion 678, which is screwed into a screw-threaded perforation in the front blade 674. A spring 679, provided with a perforation to receive the screw 677, bears against the rear blade 675 and holds it closely in contact with the front blade 674, a pin 680 preventing said spring 679 from turning on the screw 677.

The front end of the screw 677 is provided with a reduced portion 681, Fig. 63, and the front end of this portion is screw-threaded and on it is a nut 682.

683 represents a shouldered screw, provided with a screw-threaded portion which engages a screw-threaded perforation in the front blade 674, and with a reduced portion 684, which engages a hole 685 in the rear blade 675, as best shown in Fig. 34. On the shouldered portion of the screw 683 is pivotally mounted a lever 636, bent as shown in Fig. 60, and having a slot 687, through which the reduced end 681 of the screw 677 passes. The lower end of the lever 686 is bent forwardly to form a lug 688, and in a perforation of this lug one end of a spring 689 engages. This spring is bent around the portion 681 of the screw 677, being confined thereon by the nut 682, and then passes leftwardly, as shown in Fig. 60, and enters into a hole in the extension 664.

The position of the spring 689 is important, because it performs three different functions. In the first place, the tendency of this spring is to hold the front blade 674 down and to hold the rear blade 675 up, so as to keep the jaws always apart, as shown in Fig. 60, until they are forcibly brought together. As the lever 648 moves from the position shown in Fig. 60 to sever the thread, the blade 674 will always be in contact with the presser plate, and the blade 675 will always strike the button no matter how long the neck of thread is. When the blades 674 and 675 are forcibly closed together, at the proper time, by the roller 510 on the extension lever 445, striking against the lever 686 it would require very accurate adjustment to cause this action to take place under all conditions and after the blades began to wear, if some yielding action or lost motion were not permitted, and this is accomplished by the mounting of the lever 686 as already described, as it permits a yield of said lever in the limits of the slot 687, whereby after the blades are tightly closed, if the lever 686 still continues to be pressed down by the roller 510, it may yield.

Furthermore, as the lever 648 is thrown backwardly under the influence of its operating spring, if the spring 689 is not strong enough to separate the blades, this action is positively accomplished by the left hand end of the lever 686 striking against the extension 664.

The rear lever 649 is operated by the front lever 648 by reason of the part 672 on the pawl 665 engaging the pin 671 on the lever 649.

Figure 55:
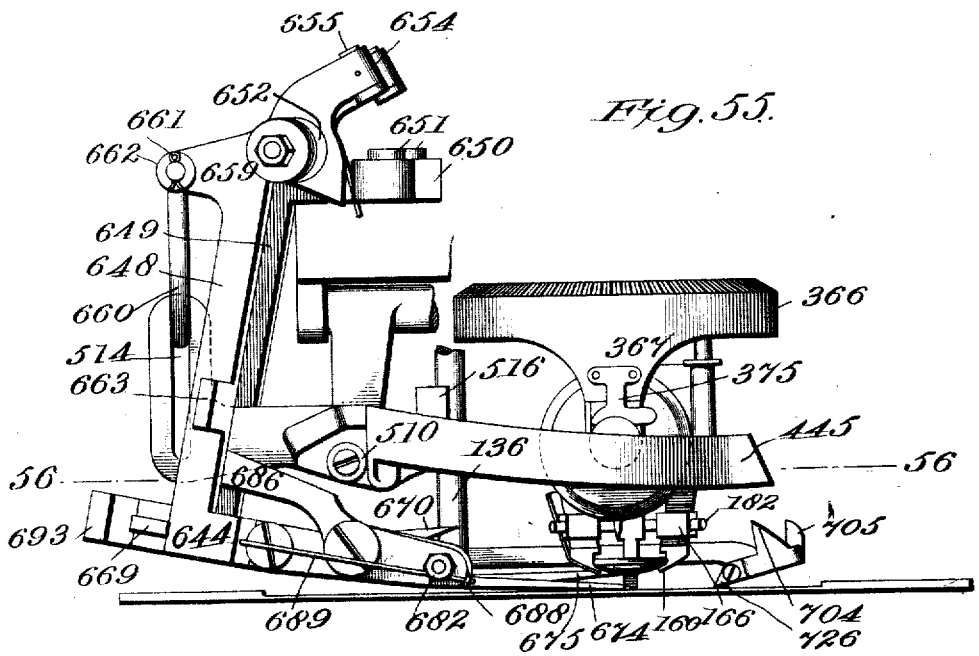
Fig. 55 shows the same parts and the cutting mechanisms in the positions they assume just prior to the release of the threading-up hook for the knotter.

The springs 690 and 691, which operate the levers 648 and 649, are wound around the sleeves carried by said levers, respectively, and one end of each of said springs engages the boss or projection 650, as shown in Fig. 55, and the other end bears against a projection carried by the lever itself, as shown at 692, for example. The lever 649 and the lug 650 are also provided with steel pieces limiting the movement of said lever to the left, as already described in connection with the lever 648, but the front lever 648 moves slightly farther leftward than the rear lever 649, so that there is a slight relative play between said levers. This is for the purpose of making sure that as the levers are retracted, under the influence of their respective springs, the part 672 of the pawl 665 will always pass behind the pin 671.

The lever 649 has at its lower end a forwardly extending portion 693, projecting over the outer corner of the extension 664 of the lever 648.

The lower end of the lever 649 is expanded at 697, the pin 671 and part 693 being carried by this expanded portion. In the lower end of the expansion 697 is a hole into which is screwed a shouldered screw 698, and engaging this screw is the perforated end of a lever 699 shown detached in Fig. 59. A boss 700 aids in holding the left hand end of this lever 699 in position between itself and the headed end of the screw 698.

As best shown in Fig. 59, the main part of the lever 699 consists of a flat steel plate, bent downwardly and provided on one side with a projection 701, having inclined ends 702 and 703. The inner end of this lever is provided with three hooks 704, 705 and 706. The hook 704 takes up the slack, the hook 705 draws the thread back and assists in the cutting operation, and the hook 706 pulls out the loose end of the thread, all as hereinafter described. The lower rear end of this lever is also provided with a projection 707, so that said lever may be pushed down close to the face of the twister and yet by the part 707 have the hook 705 held far enough away from it to prevent said hook from getting caught in the cutter 694.

Projecting downwardly from the end of the part 442 is a post 708, held in a projection in the part 442 by a screw 709, see Figs. 21 and 53. On the lower end of this post is loosely mounted a roller 710, being held thereon by heading the lower reduced end of the post 708, or in any other suitable manner. Projecting from the post 708 in a rearward direction is a pin 711, said pin extending over the path of the lever 699 and preventing it from flying up either on the forward or return stroke.

As the lever 649 is drawn toward the right of the machine by the movement of the lever 648, the inclined faces of the projection 701 on the lever 699 strike against the roller 621, carried by the lever 617 on the bottom of the finger 585 and passes in front of same, the movement of the lever 617 on the pin 618 permitting said motion. On the leftward movement of the lever 699, the curved end 615 of the finger 585 strikes against the pin 631, opening the jaws in the twister, as shown especially in Figs. 48 and 56. As the lever 699 is of a thin piece of metal, the operation by it of the finger would cause a slight outward thrust, tending to push said lever away from the twister, and this tendency is overcome by the roller 710 on the lower end of the post 709, said roller and the pin 711 always keeping this lever in its movement in its proper position relative to the twister, and the projection 707 preventing the hook 705 from going too close to the twister.

The operation of the machine is as follows:—

By means of the screw 176 the chuck jaws 150, 151, and 152 are set to properly hold the button, and the loose space between the washer 178 and body portion 177 of said screw provides freedom for the movement of the jaws outwardly against the tension of the springs 153 and 163, as consequences of which construction the buttons are always held by the jaws under spring tension, and if the buttons vary slightly in size, the jaws automatically adjust themselves to fit, while maintaining the proper centering of the button with reference to the collar 138.

By means of the screw 144 the button may be set at any desired distance from the fabric, which is introduced between the presser plate 131 and bottom plate 51 when the former is lifted by the operation of the right pedal. It will be noted that the right pedal pulls the rear end of the lever 75 downwardly during this operation, which causes the extension 88 on its front end to bear against the abutment 121 of the cam case 89, thus lifting the latter with its attached parts, including the presser plate 131. While the rear end of the lever 75 is in the down position, its extension 240 passes over the curved rear portion of the lever 239, thus preventing the operation of the latter. Hence the machine cannot be started while the presser plate is lifted by the lever 75.

To ascertain if the buttons are adjusted sufficiently high for the thread cutters 674 and 675 to clear, the lever 648 is moved toward the right after the front end of the lever 669 has been pressed toward the left. Hence the thread cutters 674 and 675 can be moved under the button to ascertain if they will have proper space to operate, while the lever 699 is left at the initial position, thus obviating the unthreading of the twister jaws 637 by the lever 699.

The needle and shuttle threads are threaded through the appropriate guides of the sewing mechanism in the well known way, and the end of the needle thread is cut off by the cutters 415 and 416, leaving the end of the needle thread as shown at 418 in Fig. 5 and as hereinbefore described. The winding thread is carried from the bobbin 370, as hereinbefore described; then through the hole 391, around the horn 604, and the end of the thread after passing through the slot 628 is held in the right hand. The lever 648 is then moved toward the right, until the lever 665 releases the pin 671, then the spring 691 forces the lever 649 rapidly toward the left and the various elements of the lever 699 introduce the thread between the jaws 637 and sever it against the cutters 694 and 695, and the beginning end of the winding thread will be as shown at 725 in Figs. 2, 5 and 67.

The operation of sewing will now be described, in the manner in which it takes place when it is not to be followed by the winding, knot tying, and cutting operations:

When the winding, knot tying and cutting operations are not to be performed, the lever 222 is moved upwardly and the notch 229 is placed over the pin 225, thus supporting the lever 222 in the raised position. The spring 231 forces the pointed pin into the upper notch of the arm 228, thus holding the arm in said position.

When the lever 222 is raised and the winding operation thus prevented from occurring, the cam 444 is not operated, and hence the thread cutters 674 and 675 never operate, and the button, by means of the screw 144, can be placed in contact with the fabric if desired.

When the lever 222 is raised, the lever 213 is moved rearwardly, thus bringing the incline of the plate 220 against the head 260 of the pin 259, and drawing it toward the left sufficiently to prevent its end 263 from engaging the plate 289 on the stopping block 273 thus preventing the starting of the winder mechanism.

If now the left pedal be depressed, the rod 235 will be moved downwardly, thus pulling the levers 234, 236 and 239 to the rear.

It will be noticed that when the lever 239 is pulled to the rear, its upper curved portion rests under the extension 240 of the lever 75, and hence said lever cannot operate to lift the presser plate 131 while the machine is running.

When the lever 234 is pulled to the rear, its inclined rear portion bears against the roller 269, thus forcing the bottom end of the lever 217 rearwardly to the position shown in Fig. 6, and causing the roller 253 at its upper end to press the stopping block 20 forwardly, thus shifting the belt 33 from the pulley 30 to the pulley 16, and removing the stopping pin 19 from the path of the stopping piece 17, thus starting the sewing mechanism.

When the stopping block 20 is moved forwardly by the roller 253, the rear end 39 of the pawl 40 holds same in position until the sewing operation is completed, when one of the pieces 44 on the cam 4 strikes the forward end of the pawl 40, thus removing its rear end 39 from engagement with the stopping block 20, and the latter is forced rearwardly by the spring 29, shifting the belt 33 from the pulley 16 to the pulley 30, and bringing the pin 19 into the path of the stopping piece 17.

The inertia of the moving parts then causes them to move, and the projection 18 forces the pin 19 downwardly against the tension of a spring, similar to the spring 286, which immediately forces the upper end of the pin 19 into the notch between the projections 17 and 18 of the stopping piece, and the remaining inertia of the parts acting through the projection 17 against the upper end of the pin 19, forces the upper end of the stopping block 20 toward the right, Fig. 4 against the tension of the spring in the cylinder 28, which immediately restores the stopping block 20 to its initial position, as shown in Figs. 1, 2, 4 and 7. When the upper end of the stopping block 20 is moved forwardly, the rearward motion of its lower end removes the slot 24 from the pin 25 mounted in the bell crank lever 26, the other arm of which is adapted to reciprocate the rod 15.

The rod 15 is then operated by the lower end of the lever 12 to produce the proper movements of the thread cutting devices for the needle and shuttle threads, as described in my application Serial Number 570,856, filed July 7, 1910, which application is divided out from my application for United States Letters Patent, filed April 6, 1910, Serial No. 553,772.

The upper end of the lever 12 is provided with a roller which engages in the groove 11 of the cam 4, which groove produces in the rod 15 the appropriate movement (as specified in the application filed July 7, 1910, hereinbefore referred to), from the time the upper end of the stopping block 20 is moved forwardly to the time when it moves rearwardly. Before the rearward movement, the pin 25 has been moved opposite the slot 24 by the operation of the cam groove 11, lever 12, and rod 15, so that the slot 24 in the lower end of the stopping block 20 can embrace said pin, when the upper end of the stopping block moves rearwardly. Then the leftward movement of said upper end, due to the inertia of the moving parts, will give a sudden rearward movement to the rod 15 for a purpose explained in the said application filed July 7, 1910. A clearance space is provided in the groove for the roller at the upper end of the lever 12, to permit of the leftward movement of the upper end of the stopping block 20.

During the sewing operation, the button is moved sidewise by the cam groove 10, so that the needle will pass through the holes in the button alternately. If a four hole button is to be sewed on, the block 47 is moved sufficiently below the position shown in Figs. 2 and 30 to enable the groove 46 to move the button forwardly and backwardly to properly distribute the stitches in the various holes.

The operation of the sewing device, including the thread cutter for the needle and shuttle threads, attaches the button to the fabric as shown in Fig. 79, leaving the severed end of the needle thread 419 passed through the needle and fabric, as there shown. When the fabric, with the attached button, is pulled from the machine, the thread 419 pulls freely through same, leaving the machine ready to attach the next button.

When a button is to be attached to a fabric with a wound neck, the notch 229 is removed from the pin 225 and the spring 231 forcing the pin into the lower notch of the arm 228, holds the arm 228 in the position shown in Fig. 4.

The spring 223 acting against the corner 716 of the lever 222 forces the latter to the position shown in Fig. 2, then the corner 717 of the lever 222 strikes the spring 223 and prevents said lever from moving below the position shown in Fig. 2.

When the lever 222 is in the position shown in Fig. 2, the plate 220 is moved out of the path of the head 260 of the pin 259. Hence when the lower end of the lever 217 is moved rearwardly by the operation of the left pedal, as hereinbefore explained, the pressure of the spring 264 forces the end 263 of the pin 259 behind the plate 289 of the stopping block 273, as shown in Fig. 9.

The sewing operation then starts, continues and stops as hereinbefore explained, and when the stopping block 20 moves rearwardly under the tension of the spring 29, it moves the upper end of the lever 217 rearwardly and the portion below the supporting pin 244 forwardly, thus causing the pin 259 to move the stopping block 273 forwardly against the tension of the spring 310.

The forward movement of the stopping block 273 shifts the belt 284 from the pulley 283 to the pulley 282 and moves the pin 285 out of the path of the stopping piece 315, thus starting the shaft 312 which drives the winding, knot tying and thread cutting mechanisms.

The cam 444 then starts to revolve in the direction of the arrow in Fig. 65, and the operations hereinafter explained take place.

These operations are mainly controlled by the four grooves A, B, C, and D in the cam 444, and of these A controls the extension lever 445, B controls the twister 572, C controls the knotter 564, and D controls the winder gear 366 during the beginning of the winding operation, and during the knot tying and thread cutting operations.

Referring to Figs. 65 and 66, the lines marked $a$, $b$, $c$, and $d$ are the starting points of their respective grooves with reference to the rollers 492, 536, 532, and 527, respectively. When the cam starts to move in the direction of the arrows, the movement from $c$ to $c^0$ causes the knotter 564 to be turned backwardly so that the plate 596 strikes the pin 614, thus supporting the pull of the thread. This position is shown in Fig. 68. The cam groove B is also shaped to cause the shaft 540 to move backward in unison with the knotter 564 to prevent the groove 628 of the twister from moving out of line with the groove 571 of the knotter. From the point $c^0$ to a point, later to be noticed, the cam groove is concentric with the axis of the cam disk 444, so that the support of the thread's tension by the pin 614 will continue until said point is reached.

The movement from $a$ to $a'$ causes the extension lever 445 to be lifted to its highest point, so that the stop 399 on the winder gear will clear the stop 516 on said lever, as shown in Fig. 20, and the movement from $d$ to $d'$ moves the winder guide 390 from the position shown in Fig. 67 to that shown in Fig. 68, during which motion the thread 725 slips around the horn 604, changing its position from that shown in Fig. 67 to that shown in Figs. 68 to 74. During the lifting movement of the lever 445, the bottom of the slot 514 bears against the link 660, thus preventing a rightward movement of the lever 648, and since the extension 693 of the lever 648 projects beyond the lever 648, a similar movement of the lever 649 is also prevented.

If the plate 451 is in the position shown in Fig. 15, the edge 484 of the plate 481 strikes the pin 455, moving it outwardly and causing the pin 354 in the end of the lever 355 to move the sleeve 352 rearwardly, thus bringing the projection 364 into the path of the projection 344, and the shaft 104 will drive the winder gear 366 positively, (the cam 444 revolving continuously.)

During this movement, the outer cylindrical surface of the plate 481 will support the pin 455, and as the cam continues its motion, the said plate will move under the pin 475 of the lever 355, then pass from under the pin 455, while continuing to support the pin 475.

The further movement of the cam causes the edge 483 of the plate 481 to pass from under the pin 475, then the spring 467 causes the pin 354 of the lever 355 to force the sleeve 352 forwardly and disengage the projections 344 and 364, then the shaft 104 will cease to drive the winder gear 366, the latter having made about 14½ revolutions, and the inertia of said gear and its connected parts will then cause it to move until the stop 399 strikes the stop 516; that is, into the position shown in Fig. 68. The spring 467 forces the sleeve 352 forwardly until the front face of the projection 356 bears against the face of the gear 348.

When the plate 451 is in the position shown in Fig. 3, the plate 481 strikes the pin 455 sufficiently later than it strikes said pin when the plate 451 is in the position shown in Fig. 15, to cause a loss of five revolutions of the winder gear 366. Hence for said position of said plate 451, the winder gear will have made nine and one-half revolutions when the sleeve 352 shifts, as above described.

Shortly before the edge 483 of the plate 481 passes from under the pin 475, the line $a^2$ of groove A has reached the roller 492 and the extension lever 445 starts downwardly to bring the stop 516 into the path of the stop 399. The projections 344 and 364 are then disengaged while the lever 445 is descending, and the first downward movement of the lever 445 is completed when the line $a^3$ reaches the roller 492, and the under surface of the part 515 of said lever forces the roller 388 downwardly, thus forcing the hole 391 in the winder guide 390 to the position 720 shown in Fig. 53, and illustrated diagrammatically in Fig. 69, thus pulling a length of the thread 724 through the hole 391.

About the time the line $a^3$ reaches the roller 492, the line $d^2$ reaches the roller 527, but during the movement from $d'$ to $d^2$ the roller 527 has been moved to its shortest distance from the center of the cam, and by this movement the slot 357 in the gear 348 has been moved past the position assumed by the projection 356 when the stop 399 strikes the stop 516. Hence during the movement from $d^2$ to $d^3$, as the gear 348 is moved around, the slot 357 comes opposite the projection 356, and the spring 467 forces the latter into the former, and the gear 348 controls the winder gear 366. When the line $D^3$ has reached the roller 527, the winder guide 390 has reached the position shown in Figs. 54 and 70, remaining there until the line $d^4$ has reached the roller 527. The thread 724 is thus passed through the slot 571 into the slot 628 of the twister. When the line $c'$ reaches the roller 532, the knotter 564 moves forwardly to the position shown in Figs. 44 and 70, so that the plate 596 will leave the pin 614, then the thread 725 will be kept taut by the tension of the spring 612, and during the movement from $c'$ to $c^2$ the knotter will remain in the position shown in Fig. 70.

During part of the movement from $d^2$ to $d^3$, the movement $a^3$ to $a^4$ occurs, which slightly raises the lever 445 to remove the pressure of the lower surface of 515 from the roller 388.

Shortly after the line $d^3$ reaches the roller 527, the line $b'$ reaches the roller 536, and the twister 572 is turned one revolution in the direction of the arrow in Fig. 42, said revolution being completed when the line $b^2$ reaches the roller 536, the cam groove D from $d^3$ to $d^4$ serving at the same time to keep the winder guide 390 in the position shown in Figs. 54 and 70. The parts are then in the positions shown in Fig. 71, with the first loop twisted.

The movement from $c^2$ to $c^3$ moves the knotter 564 from the position shown in Fig. 71 to that shown in Fig. 72. During this movement, the winder guide is moved from the position shown in Fig. 71 to that shown in Fig. 72 by the portion of the cam groove D, between $d^4$ and $d^5$.

The movement $c^3$ to $c^4$ moves the knotter 564 from the position shown in Fig. 72 to that shown in Fig. 70, and the movement from $d^5$ to $d^6$ moves the winder guide 390 from the position shown in Fig. 72 to that shown in Fig. 69.

During the early part of the movement of the knotter 564 from the position shown in Fig. 71 to that shown in Fig. 72, the portion of the cam groove B, between $b^2$ and $b^3$, causes the shaft 540 to turn in unison with the knotter 564 to prevent the slot 628 in the twister 572 from moving out of alinement with the slot 571 in the knotter.

After the thread 724 has passed out of the slot 571, during the movement of the winder guide 390 from the position shown in Fig. 71 to that shown in Fig. 72, the twister 572 makes one more turn in the direction of the arrow in Fig. 42, said motion being caused by the portion of the cam groove B between $b^3$ and $b^4$. The portion between $b^4$ and $b^5$ is shaped to cause the slot 628 to remain in alinement with the slot 571, while the knotter is moving backward to the position shown in Fig. 70.

While the point of the groove D at $d^6$ is moving past the roller 527, that is, while the winder guide 390 has a slight dwell in the position shown in Fig. 69, the portion of the cam groove A between $a^5$ and $a^6$ moves the lever 445 downward, so that it will press the roller 388 downwardly, thus moving the hole 391 in the winder guide to the dotted line 721 in Fig. 53, thus pulling the first loop of the knot tight.

The movement $d^6$ to $d^7$ of the cam groove D moves the winder guide 390 from the position shown in Fig. 69 to that shown in Fig. 70, during which movement the portion of the cam groove A between $a^6$ and $a^7$ raises the lever 445 so that the lower surface of the part 515 will clear the roller 388. During these movements, the thread 724 is again placed in the twister slot 628. The portion of the groove B between $b^6$ and $b^7$ then causes the twister 572 to make two revolutions in an opposite direction to that of the arrow in Fig. 42, which, however, makes but one twist of the thread 724 around the thread 725, for the first turn merely places the thread 724 under the thread 725.

The portion of the groove C between $c^5$ and $c^6$ then moves the knotter 564 from the position shown in Fig. 71 to that shown in Fig. 72, and the portion of the groove B between $b^7$ and $b^8$ preserves the alinement of the slots 571 and 628.

While this is occurring, the winder guide 390 is moved by the portion of the groove D between $d^8$ and $d^9$ from the position shown in Fig. 71 to that shown in Fig. 72.

The knotter is then moved backward by the portion of the cam groove C between $c^6$ and $c^7$ from the position shown in Fig. 72 to that shown in Fig. 73, (which is the same as that shown in Figs. 44, 67, 70, 71, 72, 74, 75, and 76), the cam groove B between $b^8$ and $b^9$ operating to preserve the alinement of the slots 571 and 628.

The portion of the cam groove D between $d^9$ and $d^{10}$ then moves the winder guide 390 from the position shown in Fig. 72 to that shown in Fig. 69, and the threads 724 and 725 will be looped together as shown in Fig. 81. While the portion of the cam groove D from $d^{10}$ to $d^0$ is moving past the roller 527, the portion of the cam groove A between $a^8$ and $a^9$ moves the hole 391 to the position 722 in Fig. 53. The portion $a^9$ to $a^{1m}$ causes the pull of the winder guide 390 on the thread 724 to be relaxed, and the portion $a^{10}$ to $a^{11}$ causes the hole 391 to be moved to the position 723 in Fig. 53, thus tightening the knot 728 as shown in Fig. 83.

The portion $a^{11}$ to $a^{12}$ then causes the lever 445 to rise to remove its pressure from the roller 388, and the portion $d^{10}$ to $d^{11}$ of the groove D causes the winder guide 390 to move from the position shown in Fig. 69 to that shown in Fig. 73, again placing the thread 724 in the slot 628.

The portion of the cam groove A between $a^{12}$ and $a^{13}$ moves the lever 445 downwardly and through the link 660 moves the lever 699 and cutters 674 and 675 toward the right, to the position shown in Figs. 55, 56, and 73. During the rightward motion of the lever 699, its cam 701 moves the roller 621 to the right against the tension of the spring 588, which tension near the end of said movement of the lever 699 forces the roller into the position shown in Fig. 73. The portion of the cam groove A between $a^{13}$ and $a^{14}$ then brings the end 670 of the lever 665 into contact with the post 136, thus releasing the edge 672 from the pin 671 and allowing the spring 691 to move the lever 699 swiftly toward the left.

During the leftward movement of the lever 699, the cam 701 on the rear face thereof strikes and moves the roller 621 rearwardly, as shown in Fig. 74, causing the lever 585 to force the pin 631 forwardly, thus opening the jaws 637. The lever 585 moves against the tension of the spring 588, and the jaws 637 against the tension of the springs 639.

Shortly after the jaws 637 are opened, the hook 726 pulls the thread 725 out from between same, the hook 704 takes up the slack in the thread 724, and the hook 705 pulls the thread 724 between the jaws 637. The cam 701 then passes from under the roller 621, the spring 588 presses the lever 585 away from the pin 631, the jaws 637 close, under the tension of the springs 639, upon the thread 724, as shown in Fig. 75, and the further leftward movement of the hook 705 pulls the thread 724 between the cutters 694 and 695 and severs it, as shown in Fig. 76. The end of the thread leading to the winder bobbin 370 is held between the jaws 637 and extends therefrom, as shown at 727. During the further operation of the machine, the portion of thread 727 becomes the beginning portion of the winding thread for the next button, as shown at 725 in Fig. 67.

Figure 57:
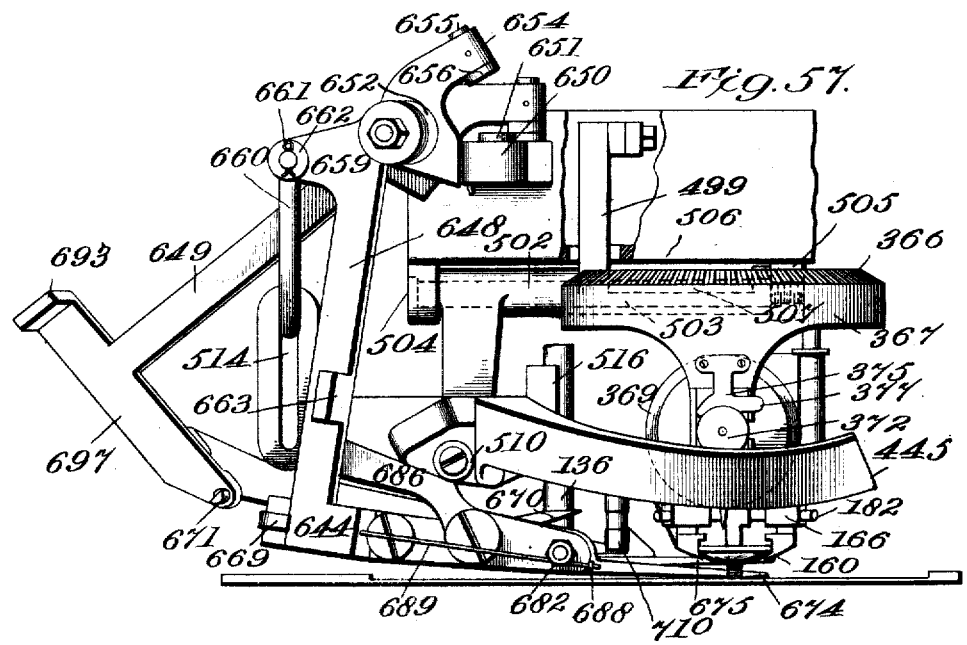
Fig. 57 shows the same parts as shown in Fig. 55, in the positions assumed after the threading-up hook for the knotter has been released.
Figure 58:
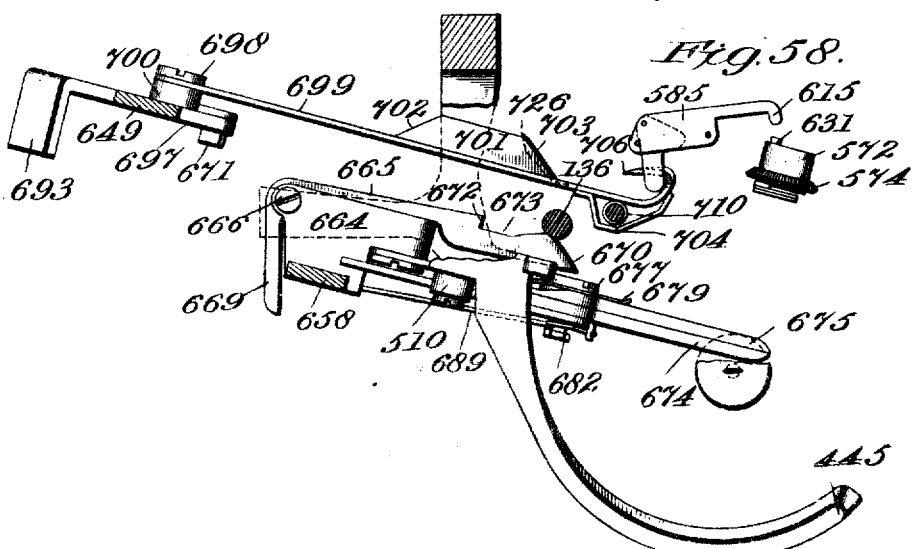
Fig. 58 is a view similar to Fig. 56, showing the parts in the positions assumed after the threading-up hook for the knotter has been released.

As the cutters 674 and 675 move from the position shown in Figs. 55, 56, and 73 to that shown in Figs. 57, 58, and 76, the cutter blades embrace the threads 724 and 725, and the further movement of the lever 445 downwardly, caused by the portion of the cam groove A between $a^{14}$ and $a^{15}$ brings the roller 510 against the lever 686, as shown in Figs. 57 and 58, thus causing the cutters 674 and 675 to sever the ends of the threads 724 and 725 just outside the knot 728, as shown in Figs. 77 and 83.

The portion of the groove A between $a^{15}$ and $a$ then causes the lever 445 to return to the initial position, as shown in Fig. 1, and the severed ends 724 and 725 are left lying on the top of the presser plate, as shown in Fig. 77.

While the upward motion of the lever 445 is taking place, the knotter 564 and winder guide 390 are moved forwardly to the positions shown in Fig. 77, which motion of the former is caused by the portion of the cam groove C between the lines $c^8$ and $c^9$, (the portion of the cam groove B between $b^{10}$ and $b^{11}$ acting to preserve the alinement of the slots 571 and 628), and which motion of the latter is caused by the portion of the cam groove D, between $d^{12}$ and $d^{13}$.

This forward motion of the knotter 564 during the forward motion of the winder guide 390 is provided to insure the placing of the thread 727 behind the horn 604, as shown in Fig. 78, it being evident that since the bearing 382 of the winder guide 390 is moved eccentric to the axis of the knotter 564, that the pull of the thread 727 on the winder guide 390, as the latter moves around, will pull its lower end downwardly to the position shown in Fig. 78, and the forward movement of the knotter 564 provides that the horn 604 will be forward of the thread 727 during said downward movement.

The portion of the cam groove C between $c^9$ and $c$ then moves the knotter 564 back to the initial position, as shown in Fig. 67 (the portion of the cam groove B between $b^{11}$ and $b$ coöperating to preserve the alinement of the slots 571 and 678), and the portion of the cam groove D between $d^{13}$ and $d$ moving the winder guide 390 to the position shown in Fig. 67. During this movement, the thread 727 slips around the horn 604 into the position shown at 725 in Fig. 67, and the shaft 312 is stopped as hereinafter explained. During the early part of the rapid movement of the winder gear 366 when the neck of thread for the next button is being wound, the severed ends of the threads 724 and 725 are brushed from the presser plate by the brush 413.

Near the end of the movement of the cam 444, the inclined edge 486 of the stop 485 strikes the pin 308, thus forcing same outwardly and pressing the pin 293 inwardly against the tension of the spring 295, which presses the pin 259 from engagement with the plate 291, as shown in Fig. 9, to the position shown in Fig. 10, and as shown in said figure, the spring 310 forces the plate 291 against the pin 293, which relation of the parts continues until the pin 308 drops behind the edge 487 of the stopping piece 485, then the spring 295 forces the pin 293 rapidly outwardly, and the spring 310 forces the block 273 from the position shown in Fig. 7 to that shown in Fig. 6, thus moving the belt 284 from the tight pulley 282 to the loose pulley 283, and bringing the pin 285 into the path of the stop piece 315, the inertia of the moving parts continuing the motion and the projection 715 forces the pin 285 downwardly against the tension of the spring 286, which immediately forces the upper end of the pin 285 between the projections 315 and 715, as shown in Fig. 4, thus stopping the shaft 312, then the cam 444 will be in the position shown in Fig. 3.

It will be noted that when the lower end of the lever 217 is moved rearwardly by the lever 234 during the starting of the machine, the pin 256 attached to said lever is moved out of the path of the pawl 275, the lower end of which is then moved over the pin 237, attached to the sleeve 208. Hence the left pedal cannot be lifted nor the operation of the machine interfered with.

When, however, the pin 259 is pressed from engagement with the plate 291 by the pin 293, the effect of gravity on the lever 217 moves it from the position shown in Fig. 7 to that shown in Fig. 1, during which motion the pin 256 strikes the upper end of the pawl 275, thus removing the lower end of the latter from the path of the pin 237, as shown in Fig. 1, and the left pedal is free to be raised preparatory to starting the machine for the next operation.

When the left pedal is raised, the levers attached to the sleeve 208 move forwardly, during which motion the upper end of the lever 234 lifts the roller 269 until it passes same, and the spring 271 forces the roller 269 down into the path of the incline on the rear of said lever.

The forward movement of the lever 239 removes its upper curved portion from the path of the projection 240 on the lever 75, and the latter is then free to be operated to lift the presser plate 131.

It has been hereinbefore described how the sewing operation can be performed without being followed by the winding, knot tying, and thread cutting operations, by simply lifting the front end of the lever 222. Hence it is evident that if for any reason, as by breakage of needle, button, or thread, the sewing operation is not properly performed, (while the lever 222 is set to cause the winding, knot tying, and thread cutting operations to follow the sewing operation), by simply raising the front end of the lever 222 the winding, knot tying and thread cutting operations may be prevented from occurring.

If for any reason, after the sewing operation is completed the winding, knot tying or thread cutting operations are not properly performed, as by breakage of thread, the winding, knot tying, and thread cutting operations may be repeated on the same button, without resewing same, by simply pressing the front end of the lever 222 downwardly, against the tension of the spring 223 acting against the corner 717 of said lever.

When the front end of the lever 222 is pressed downwardly, the spring 215, attached to the lever 213, presses against the pin 216 of the lever 217, thus forcing the roller 253 against the stopping block 20, and the lever 212 acting against the pin 218 forces the stopping block 273 inwardly, and it is held by the pin 259, and the winding, knot tying, and thread cutting operations proceed as before explained.

When the front end of the lever 222 is released, after being depressed, as it may be any time after the pin 259 starts to hold the stopping block 273, the spring 223 forces the front end of said lever upwardly until the corner 716 strikes the spring 223, and the lever 222 stops in the position shown in Fig. 2.

The operation of the machine thus attaches the button to the fabric, as shown in Fig. 79, then winds a thread about the threads shown in said figure, and knots the two ends of the winding thread together, as shown in Fig. 82, pulls said knot tight, and cuts the winding thread ends off outside the knot, leaving the finished product as shown in Fig. 83.

I claim:—

1. In a button sewing machine, the combination of sewing mechanism, winding mechanism, knot tying mechanism, cutting mechanism, and means for automatically operating said mechanisms, substantially as described.

2. In a button sewing machine, the combination of sewing mechanism, winding mechanism, knot tying mechanism, cutting mechanism, and means for automatically operating said mechanisms in succession at the proper time, substantially as described.

3. In a button sewing machine, the combination of sewing mechanism, winding mechanism, knot tying mechanism, cutting mechanism, and means for automatically operating said mechanisms in succession at the proper times and for stopping them at the proper times, substantially as described.

4. In a button sewing machine, the combination of sewing mechanism, winding mechanism, knot tying mechanism, cutting mechanism, means for automatically operating the same in succession, and means for preventing the operation of said mechanisms except at the proper time, substantially as described.

5. In a button sewing machine, the combination of sewing mechanism, winding and knot tying mechanisms, cutting mechanism, means for starting the winding, knot tying, and cutting mechanisms into operation, and means for locking the sewing mechanism until said winding, knot tying, and cutting mechanisms have finished their operations, substantially as described.

6. In a button sewing machine, the combination of sewing mechanism, winding mechanism, knot tying mechanism, cutting mechanism, and means for automatically stopping said knot tying and cutting mechanisms after the knot has been tied and thread cut, substantially as described.

7. In a button sewing machine, the combination of sewing mechanism, winding mechanism, knot tying mechanism, cutting mechanism, and operating means therefor, including devices for automatically stopping the sewing mechanism and starting said winding, knot tying and cutting mechanisms named, substantially as described.

8. In a button sewing machine, the combination of sewing mechanism, winding mechanism, knot tying mechanism, cutting mechanism, and operating means therefor, including devices for stopping the winding, knot tying, and cutting mechanisms and unlocking the sewing mechanism so that it may be started for the next operation, substantially as described.

9. In a button sewing machine, the combination of sewing mechanism, winding mechanism, a knotter including means for twisting the winding thread to form a loop therein, a winder guide coöperating with said knotter to form said loop, and means for operating said sewing and winding mechanisms, knotter and winder guide, substantially as described.

10. In a button sewing machine, the combination of sewing mechanism, winding mechanism, a knotter including a twister to form loops in the winding thread, a winder guide, an extension lever, and means for operating said sewing and winding mechanisms, knotter, twister, winder guide and extension lever, substantially as described.

11. In a button sewing machine, the combination of sewing mechanism, winding mechanism, a knotter including a twister to form loops in the winding thread, a winder guide, an extension lever, and a cam provided with grooves for operating said knotter, twister, winder guide and extension lever, substantially as described.

12. In a button sewing machine, the combination of sewing mechanism, winding mechanism, a knotter including a twister to form loops in the winding thread, a winder guide, an extension lever, a cam provided with grooves, and levers operated by said cam to operate said knotter, twister, winder guide and extension lever, substantially as described.

13. In a button sewing machine, the combination of sewing mechanism, a winder guide, a twister including means for gripping the end of the winding thread carried by said guide, and means for operating said winder guide to place the winding thread between the gripping means, substantially as described.

14. In a button sewing machine, the combination of sewing mechanism, a winder guide, a knotter, including a twister having gripping means, and means for operating said winder guide to place the winding thread between said gripping means, substantially as described.

15. In a button sewing machine, the combination of sewing mechanism, a winder guide and a knotter, comprising a twister having gripping means and a slot therein, and means for operating said winder guide to place the winding thread in said slot, substantially as described.

16. In a button sewing machine, the combination of sewing mechanism, a winder guide, a knotter, including twister having gripping means, and means for operating said winder guide to place the beginning end of the winding thread between said gripping means, substantially as described.

17. In a button sewing machine, the combination of sewing mechanism, a winder guide, and a knotter including a twister having gripping means and provided with a slot, and means for operating said winder guide to place the ending thread of the winding thread in said slot during the knot tying operation, substantially as described.

18. In a button sewing machine, the combination of sewing mechanism, winding mechanism including a device for producing a tension on the winding thread, a twister for forming a loop in the winding thread, and means for drawing the loop of the winding thread tight under a tension heavier than the winding tension, substantially as described.

19. In a button sewing machine, the combination of sewing mechanism, winding mechanism including a tension device for the winding thread, a twister and means for drawing a loop of winding thread, made by said twister, tight by means of said tension device, substantially as described.

20. In a button sewing machine, the combination of sewing mechanism, winding mechanism including a tension device for the winding thread, a knot tying mechanism and means for increasing the tension on the winding thread during the knot tying operation, substantially as described.

21. In a button sewing machine, the combination of sewing mechanism, winding mechanism including a device for producing a tension on the winding thread, a knotter, gripping means carried thereby for holding one end of the winding thread, and means for increasing the tension on the winding thread to draw the loop tight, substantially as described.

22. In a button sewing machine, the combination of sewing mechanism, winding mechanism including a device for producing a tension on the winding thread, knot tying mechanism including gripping means for holding one end of the winding thread, means for operating said knot tying mechanism to form successive loops, and means for increasing the tension on the winding thread to draw the knot tight, substantially as described.

23. In a button sewing machine, the combination of sewing mechanism, winding mechanism including a winder guide, a knotter, means carried by said knotter for gripping one end of the winding thread, means for operating said knotter to form a loop, and means for increasing the tension on said winding thread to draw said loop tight, said last-named means including an extension lever to extend said winder guide, whereby said loop is drawn tight, substantially as described.

24. In a button sewing machine, the combination of sewing mechanism, winding mechanism including a device for producing a tension on the winding thread, a knotter, means carried thereby for gripping one end of the winding thread, means for operating said knotter to form a loop, and means for increasing the tension on the winding thread to draw said loop tight, said last named means including an automatically operating extension lever which extends a part of the winding mechanism, whereby the loop is drawn tight, substantially as described.

25. In a button sewing machine, the combination of sewing mechanism, winding mechanism including a device for producing a tension on the winding thread, knot tying mechanism, means for operating said knot tying mechanism to form a loop, and means for tightening said loop, including a part of the winding mechanism and automatically operating means controlling the action of the loop tightening means, substantially as described.

26. In a button sewing machine, the combination of sewing mechanism, a winder guide, a knotter, means for drawing the strands of the winding thread into said knotter, means for twisting said strands to form a loop, means for moving said knotter to deliver said loop, and means for moving said knotter and winder guide away from each other to tighten said loop, substantially as described.

27. In a button sewing machine, the combination of sewing mechanism, a winder guide, a knotter, an extension lever adapted to operate on the winding thread and means for moving said winder guide, knotter, and extension lever to tighten the winding thread, substantially as described.

28. In a button sewing machine, the combination of sewing mechanism, a winder guide, a knotter, a twister to form a loop in the winding thread, means for turning said knotter to deliver the loop so formed, and means for advancing said winder guide and for withdrawing said knotter to draw the loop tight, substantially as described.

29. In a button sewing machine, the combination of sewing mechanism adapted to pass a sewing thread through a fabric, a winder guide adapted to apply a winding thread to said sewing thread, a knot tying mechanism comprising a slotted central piece and a projecting horn and thread guides hinged thereto, and adapted to coöperate with said winder guide to form a knot in the winder thread, substantially as described.

30. In a button sewing machine, the combination of sewing mechanism adapted to pass a sewing thread through a fabric, a winder guide adapted to apply a winding thread to said sewing thread, a knot tying mechanism comprising a slotted central piece and a projecting horn and thread guides hinged thereto, and adapted to coöperate with said winder guide to form a knot in the winder thread, and a spring to produce tension on said horn and guides, substantially as described.

31. In a button sewing machine, the combination of sewing mechanism adapted to pass a sewing thread through a fabric, a winder guide adapted to apply a winding thread to said sewing thread, a knot tying mechanism comprising a slotted central piece and a projecting horn and thread guides hinged thereto, and adapted to coöperate with said winder guide to form a knot in the winder thread, and a spring to produce tension on said horn and guides, said central piece having a stop to limit the movement of said horn and guides under the tension of said spring, substantially as described.

32. In a button sewing machine, the combination of sewing mechanism adapted to pass a sewing thread through a fabric, a winder guide adapted to apply a winding thread to said sewing thread, a knot tying mechanism comprising a slotted central piece and a projecting horn and thread guides hinged thereto, and adapted to coöperate with said winder guide to form a knot in the winder thread, and a spring to produce tension on said horn and guides, said central piece having a stop to limit the movement of said horn and guides under the tension of said winding thread during the knot tying operation, substantially as described.

33. In a button sewing machine, the combination of sewing mechanism adapted to pass a sewing thread through a fabric, a winder guide adapted to apply a winding thread to said sewing thread, a knot tying mechanism comprising a slotted central piece and a projecting horn and thread guides hinged thereto, and adapted to coöperate with said winder guide to form a knot in the winder thread, and a spring to produce tension on said horn and guides, said central piece having an automatically controlled stop to prevent the movement of said horn and thread guides under the tension of said spring during the winding operation, substantially as described.

34. In a button sewing machine, the combination of sewing mechanism, winding mechanism and a twister consisting of a casing slotted for the passage of the winding thread and having grippers for the winding thread mounted therein, a gripper operating pin projecting through a perforation in said casing, and a gear wheel carried on one end of said casing, substantially as described.

35. In a button sewing machine, the combination of sewing mechanism, winding mechanism, knot tying mechanism, the latter including an automatic clamp for seizing the thread during the knot tying operation, consisting of two pivotally mounted spring-closed jaws, and means for opening said jaws against the spring tension, substantially as described.

36. In a button sewing machine, the combination of sewing mechanism, winding mechanism, knot tying mechanism, the latter including an automatic clamp for holding the thread during the knot tying operation, consisting of a casing, two pivotally mounted spring-operated jaws therein, and means projecting outside of the casing for opening said jaws simultaneously, substantially as described.

37. In a button sewing machine, the combination of sewing mechanism, winding mechanism, knot tying mechanism, the latter including an automatic clamp for holding the thread during the knot tying operation, consisting of a casing, two pivotally mounted spring-operated jaws in said casing, and a pin for opening said jaws, said pin being slotted and said jaws being provided with pins entering the slot in said first named pin, substantially as described.

38. In a button sewing machine, the combination of sewing mechanism, winding mechanism and a twister including an automatic clamp for holding the winding thread during the knot tying operation, said clamp consisting of a casing, pivotally mounted spring-operated jaws therein, said jaws being provided with serrated gripping faces and the length of said jaws being greater than the distance between the pivots of said jaws, so that as the thread is pulled the jaws hold it more tightly, substantially as described.

39. In a button sewing machine, the combination of sewing mechanism, winding mechanism, a knot tying mechanism including a supporting frame, a twister carried thereby, and a cutter on said twister, substantially as described.

40. In a button sewing machine, the combination of sewing mechanism, winding mechanism, a knot tying mechanism including a supporting frame, pivotally mounted jaws therein, springs normally forcing said jaws together, a pin for opening said jaws, and a cutting device carried by said frame and located opposite said pin, substantially as described.

41. In a button sewing machine, the combination of sewing mechanism, winding mechanism and knot tying mechanism including a cam casing, a knotter supported thereby, and a horn hinged to said knotter and having a part adapted to strike against a part of said cam casing to limit its movement in one direction, substantially as described.

42. In a button sewing machine, the combination of sewing mechanism, winding mechanism and knot tying mechanism including a cam casing provided with a pin, a knotter supporting said cam casing, and a horn hinged to said knotter and having a part adapted to strike against said pin to limit the movement in one direction, substantially as described.

43. In a button sewing machine, the combination of sewing mechanism, winding mechanism and knot tying mechanism including a cam casing provided with a pin, a knotter supported by said cam casing, and a horn hinged to said knotter and provided with a plate adapted to strike against said pin to limit the movement of the knotter in one direction, substantially as described.

44. In a button sewing machine, the combination of sewing mechanism, winding mechanism, and knot tying mechanism including a knotter comprising a casing, a twister carried thereby, a horn and thread guides hinged to said casing, a spring located between said casing and said horn, and means for adjusting said spring, substantially as described.

45. In a button sewing machine, the combination of sewing mechanism, winding mechanism, a winder guide, a knotter, a slotted twister having grippers therein, said winder guide operating to draw the strands of the winding thread into said twister, a lever for operating said twister to form a loop, a lever for advancing the knotter to deliver said loop, and a lever for advancing the winder guide to tighten said loop, substantially as described.

46. In a button sewing machine, the combination of a supporting frame, a presser plate carried by said frame, cutting mechanism resting on said presser plate, and means for preventing the lifting of said presser plate until the cutting operation is finished, substantially as described.

47. In a button sewing machine, the combination of sewing mechanism, winding mechanism, knot tying mechanism, cutting mechanism, and means for throwing the last three named mechanisms out of operation when desired, substantially as described.

48. In a button sewing machine, the combination of winding mechanism, knot tying mechanism, and a cam preventing the operation of the knot tying mechanism until the winding mechanism has finished its operation, substantially as described.

49. In a button sewing machine, the combination of winding mechanism, knot tying mechanism, and cuttting mechanism, with a cam for preventing the operation of the last two mechanisms named until the winding mechanism has finished its operation, substantially as described.

50. In a button sewing machine, the combination of sewing mechanism, winding mechanism, knot tying mechanism, cutting mechanism, a cam locking the winding and knot tying mechanisms until the sewing mechanism has finished its operation, and for locking the sewing mechanism against operation until the winding, knot tying, and cutting operations are finished, substantially as described.

51. In a button sewing machine, the combination of sewing mechanism, winding mechanism, knot tying mechanism, cutting mechanism, and a cam preventing the operation of the cutting mechanism until the knot tying mechanism has finished its work, substantially as described.

52. In a button sewing machine, the combination of sewing mechanism, winding mechanism, knot tying mechanism, cutting mechanism, and a cam causing the operation of the cutting mechanism when the knot tying mechanism has finished its work, substantially as described.

53. In a button sewing machine, the combination of sewing mechanism, winding mechanism, knot tying mechanism, cutting mechanism, a cam for preventing the operation of the cutting mechanism until the knot tying mechanism has finished its work, and for preventing the operation of the knot tying mechanism until the winding mechanism has finished its work, substantially as described.

54. In a button sewing machine, the combination of sewing mechanism, winding mechanism, knot tying mechanism, and cutting mechanism, with a cam for causing the operation of the cutting mechanism after the knot tying mechanism has finished its work, and for causing the operation of the knot tying mechanism after the winding mechanism has finished its work, substantially as described.

55. In a button sewing machine, the combination of cutting mechanism, knot tying mechanism, winding mechanism, and sewing mechanism, with a cam for preventing the operation of the cutting mechanism until the knot tying mechanism has finished its work, and for preventing the operation of the knot tying mechanism until the winding mechanism has finished its work, and means for preventing the operation of the winding mechanism until the sewing mechanism has finished its work, substantially as described.

56. In a button sewing machine, the combination of sewing mechanism, winding mechanism, knot tying mechanism, and cutting mechanism, with constantly running belts, a treadle, connections whereby the movement of said treadle puts the sewing mechanism into operative connection with one of said belts, and automatic means compelling the successive operation of said mechanisms in the order named after the sewing mechanism has been started, substantially as described.

57. In a button sewing machine, the combination of sewing mechanism, including a presser plate, winding mechanism, knot tying mechanism, and cutting mechanism, constantly running belts, a treadle and connections whereby the movement of said treadle puts the sewing mechanism into operative connection with one of said belts, a second treadle for lifting said presser plate, and locking means whereby neither of said treadles can be operated unless the other is in its initial position, substantially as described.

58. In a button sewing machine, the combination of sewing mechanism, including a presser plate, a treadle for starting the machine in operation to sew on a button, a treadle for lifting said presser plate, and means for preventing the operation of either of said treadles unless the other is in its initial position, substantially as described.

59. In a button sewing machine, the combination of sewing mechanism, winding mechanism, knot tying mechanism, and cutting mechanism, with common means for locking the winding mechanism when the sewing mechanism is in operation, locking the sewing mechanism when the winding mechanism is in operation, and locking the sewing mechanism and preventing the operation of the cutting mechanism until the winding operation is finished, substantially as described.

60. In a button sewing machine, the combination of sewing mechanism, winding mechanism, knot tying mechanism, and a cam for controlling the winding mechanism and for operating the knot tying mechanism, substantially as described.

61. In a button sewing machine, the combination of sewing mechanism, winding mechanism, knot tying mechanism, constantly running driving means, and means operated by said driving means for controlling the winding mechanism and operating the knot tying mechanism, substantially as described.

62. In a buttton sewing machine, the combination of sewing mechanism, winding mechanism, knot tying mechanism, an operating cam, said cam being adapted to prevent the operation of the knot tying mechanism until the winding mechanism has finished its work, and means operated by said cam for stopping said winding mechanism, substantially as described.

63. In a button sewing machine, the combination of sewing mechanism, winding mechanism, knot tying mechanism, and cutting mechanism, means for shifting the button at the middle of the sewing operation, and operating devices, substantially as described.

64. In a button sewing machine, the combination of sewing mechanism, knot tying mechanism, cutting mechanism, means for severing the excess of thread, and automatic means for operating the cutting mechanism after the knot tying and severing operations are completed, substantially as described.

65. In a button sewing machine, the combination of sewing mechanism, winding mechanism, knot tying mechanism, and cutting mechanism arranged to operate successively in the order named, a treadle and connections for starting the sewing mechanism, and means for holding the said treadle locked after it has once been moved to start the sewing mechanism until the cutting operation has been finished, substantially as described.

66. In a button sewing machine, the combination of sewing mechanism, winding mechanism, knot tying mechanism, cutting mechanism, a treadle and connections for starting the sewing mechanism into operation, and means compelling the complete operation of all of said mechanisms in the order named until the cutting operation has been finished, substantially as described.

67. In a button sewing machine, the combination of sewing mechanism, winding mechanism, knot tying mechanism, cutting mechanism, a presser plate, a treadle and connections for starting said sewing mechanism into operation, a second treadle for lifting the presser plate, means compelling the action of the sewing mechanism, winding mechanism, knot tying mechanism, and cutting mechanism in the order named, and means preventing the lifting of the presser plate until the cutting operation is finished, substantially as described.

68. In a button sewing machine, the combination of sewing mechanism, including button holding means, winding mechanism, and means for vibrating said button holding means transversely to said sewing mechanism independently of said winding mechanism, substantially as described.

69. In a button sewing machine, the combination of sewing mechanism, including button holding means, winding mechanism, and means for reciprocating said button holding means longitudinally to said sewing mechanism independently of said winding mechanism, substantially as described.

70. In a button sewing machine, the combination of sewing mechanism, including button holding means, winding mechanism, and means for vibrating and reciprocating said button holding means respectively transversely and longitudinally to said sewing mechanism independently of said winding mechanism, substantially as described.

71. In a button sewing machine, the combination of sewing mechanism, including button holding means, knot tying mechanism, and means for shifting said button holding means independently of said sewing and knot tying mechanisms, substantially as described.

72. In a button sewing machine, the combination of sewing mechanism, including button holding means, winding mechanism, cutting mechanism for the winding thread, and means for shifting said button holding means independently of said cutting mechanism, substantially as described.

73. In a button sewing machine, the combination of sewing mechanism, a cam case, button holding means supported thereby, and means for shifting said button holding means independently of said cam case, substantially as described.

74. In a button sewing machine, the combination of sewing mechanism, a cam case, button holding means supported thereby, and means for reciprocating said button holding means independently of said cam case, substantially as described.

75. In a button sewing machine, the combination of sewing mechanism, including button holding means, winding mechanism, operating means therefor, and means for shifting said button holding means independently of said winding mechanism and operating means, substantially as described.

76. In a button sewing machine, the combination of sewing mechanism, including button holding means, winding mechanism, knot tying mechanism, and means for shifting said button holding means independently of said winding and knot tying mechanisms, substantially as described.

77. In a button sewing machine, the combination of sewing mechanism, including button holding means, winding mechanism, knot tying mechanism, and cutting mechanism, and means for shifting said button holding means independently of said winding, knot tying, and cutting mechanisms, substantially as described.

78. In a button sewing machine, the combination of sewing mechanism, including button holding means, winding mechanism, knot tying mechanism, cutting mechanism, a cam case on which said button holding means is supported, operating mechanism in said cam case, and means for shifting said button holding means independently of said winding mechanism, knot tying mechanism, cutting mechanism, cam case, and operating mechanism, substantially as described.

79. In a button sewing machine, the combination of sewing mechanism, including a button chuck and presser plate, winding mechanism, and means for shifting said button chuck and presser plate independently of said winding mechanism, substantially as described.

80. In a button sewing machine, the combination of sewing mechanism, including a button chuck and presser plate, knot tying mechanism, and means for shifting said button chuck and presser plate independently of said knot tying mechanism, substantially as described.

81. In a button sewing machine, the combination of sewing mechanism, including a button chuck and presser plate, winding mechanism, cutting mechanism for the winding thread, and means for shifting said button chuck and presser plate independently of said cutting mechanism, substantially as described.

82. In a button sewing machine, the combination of sewing mechanism, a cam case, a button chuck and presser plate supported thereby, and means for shifting said button chuck and presser plate independently of said cam case, substantially as described.

83. In a button sewing machine, the combination of sewing mechanism, including a button chuck and presser plate, winding mechanism, knot tying mechanism, and means for shifting said button chuck and presser plate independently of said winding and knot tying mechanisms, substantially as described.

84. In a button sewing machine, the combination of sewing mechanism, including a button chuck and presser plate, winding mechanism, knot tying mechanism, and cutting mechanism, and means for shifting said button chuck and presser plate independently of said winding, knot tying, and cutting mechanisms, substantially as described.

85. In a button sewing machine, the combination of sewing mechanism, including a button chuck and presser plate, winding mechanism, knot tying mechanism, cutting mechanism, a cam case on which said button chuck and presser plate are supported, operating mechanism in said cam case, and means for shifting said button chuck and presser plate independently of said winding mechanism, knot mechanism, cutting mechanism, cam case, and operating mechanism, substantially as described.

86. In a button sewing machine, the combination of sewing mechanism, including a button chuck, presser plate, and bottom plate, and means for moving said button chuck and presser plate relatively to said bottom plate, substantially as described.

87. In a button sewing machine, the combination of sewing mechanism, including a button chuck and presser plate, a bottom plate, and means for moving said button chuck and presser plate together and vibrating them in relation to said bottom plate, substantially as described.

88. In a button sewing machine, the combination of sewing mechanism, including a button chuck and presser plate, a bottom plate, and means for moving said button chuck and presser plate together and reciprocating them in relation to said bottom plate, substantially as described.

89. In a button sewing machine, the combination of sewing mechanism, including a button chuck and presser plate, a bottom plate, and means for moving said button chuck and presser plate together and vibrating and reciprocating them in relation to said bottom plate, substantially as described.

90. In a button sewing machine, the combination of sewing mechanism, including a button chuck and presser plate, a bottom plate, and means for moving said button chuck and presser plate together vertically in relation to said bottom plate, substantially as described.

91. In a button sewing machine, the combination of sewing mechanism, including a button chuck, presser plate, and bottom plate, and means for moving said button chuck and presser plate together away from said bottom plate, substantially as described.

92. In a button sewing machine, the combination of sewing mechanism, including a button chuck and presser plate, a bottom plate, and means for moving said button chuck and presser plate together away from and vibrating them in unison with said bottom plate, substantially as described.

93. In a button sewing machine, the combination of sewing mechanism, including a button chuck and presser plate, a bottom plate, and means for moving said button chuck and presser plate together away from and reciprocating them in unison with said bottom plate, substantially as described.

94. In a button sewing machine, the combination of sewing mechanism, including a button chuck and presser plate, a bottom plate, and means for moving said button chuck and presser plate together away from and vibrating and reciprocating them in unison with said bottom plate, substantally as described.

95. In a button sewing machine, the combination of sewing mechanism, including a button chuck and presser plate, a bottom plate, means for moving said button chuck and presser plate together vertically in relation to said bottom plate, and means for vibrating said button chuck, presser plate and bottom plate in unison, substantially as described.

96. In a button sewing machine, the combination of sewing mechanism, including a button chuck, and presser plate, winding mechanism, cutting mechanism for the winding thread, and means for moving said button chuck and presser plate relatively to said cutting mechanism, substantially as described.

97. In a button sewing machine, the combination of sewing mechanism, including a button chuck and presser plate, winding mechanism, cutting mechanism for the winding thread, and means for moving said button chuck and presser plate together and vibrating them in relation to said cutting mechanism; substantially as described.

98. In a button sewing machine, the combination of sewing mechanism, including a button chuck and presser plate, winding mechanism, cutting mechanism for the winding thread, and means for moving said button chuck and presser plate together and reciprocating them in relation to said cutting mechanism, substantially as described.

99. In a button sewing machine, the combination of sewing mechanism, including a button chuck and presser plate, winding mechanism, cutting mechanism for the winding thread, and means for moving said button chuck and presser plate together and vibrating and reciprocating them in relation to said cutting mechanism, substantially as described.

100. In a button sewing machine, the combination of sewing mechanism, including a button chuck and presser plate, winding mechanism, cutting mechanism for the winding thread, and means for moving said button chuck together vertically in relation to said cutting mechanism, substantialy as described.

101. In a button sewing machine, the combination of sewing mechanism, including a button chuck and presser plate, a cam case supporting said button chuck, a bottom plate, and means for moving said button chuck and presser plate relatively to said bottom plate, substantially as described.

102. In a button sewing machine, the combination of sewing mechanism, including a button chuck and presser plate, a cam case supporting said button chuck, a bottom plate, and means for moving said button chuck and presser plate together and vibrating them in relation to said bottom plate, substantially as described.

103. In a button sewing machine, the combination of sewing mechanism, including a button chuck and presser plate, a cam case supporting said button chuck, a bottom plate, and means for moving said button chuck and presser plate together and reciprocating them in relation to said bottom plate, substantially as described.

104. In a button sewing machine, the combination of sewing mechanism, including a button chuck and presser plate, a cam case supporting said button chuck, a bottom plate, and means for moving said button chuck and presser plate together and vibrating and reciprocating them in relation to said bottom plate, substantially as described.

105. In a button sewing machine, the combination of sewing mechanism, including a button chuck and presser plate, a cam case supporting said button chuck, a bottom plate, and means for moving said cam case, button chuck and presser plate together vertically in relation to said bottom plate, substantially as described.

106. In a button sewing machine, the combination of sewing mechanism, including a button chuck and presser plate, a cam case supporting said button chuck, operating mechanism supported in said cam case, a bottom plate, and means for moving said cam case, button chuck and presser plate together relatively to said bottom plate, substantially as described.

107. In a button sewing machine, the combination of sewing mechanism, a driving shaft provided with a gear wheel, a driven shaft having a pinion thereon meshing with said gear wheel, winding mechanism, connections between said pinion and said winding mechanism, and means for moving said pinion and connections in a vertical plane tangentially to said gear wheel without disengaging said pinion from said gear wheel, substantially as described.

108. In a button sewing machine, the combination of sewing mechanism, a driving shaft provided with a gear wheel, a driven shaft having a pinion thereon meshing with said gear wheel, knot tying mechanism, connections between said pinion and said knot tying mechanism, and means for moving said pinion and connections in a vertical plane tangentially to said gear wheel without disengaging said pinion from said gear wheel, substantially as described.

109. In a button sewing machine, the combination of sewing mechanism, a driving shaft provided with a gear wheel, a driven shaft having a pinion thereon meshing with said gear wheel, cutting mechanism, connections between said pinion and said cutting mechanism, and means for moving said pinion and connections in a vertical plane tangentially to said gear wheel without disengaging said pinion from said gear wheel, substantially as described.

110. In a button sewing machine, the combination of sewing mechanism, a driving shaft provided with a gear wheel, a driven shaft having a pinion meshing with said gear wheel, winding mechanism, knot tying mechanism, cutting mechanism, connections between said pinion and said mechanisms, and means for moving said pinion and connections in a vertical plane without disengaging said pinion from said gear wheel, substantially as described.

111. In a button sewing machine, the combination of a treadle, a cam operated thereby, sewing mechanism, locking means for said sewing mechanism, a lever on which said cam acts, and means for releasing said locking means by the movement of said lever, substantially as described.

112. In a button sewing machine, the combination of sewing mechanism, a treadle, a cam operated thereby, locking means for said sewing mechanism, a lever having thereon a spring controlled arm provided with a roller on which said cam acts, and means for releasing said locking means by the movement of said lever, substantially as described.

113. In a button sewing machine, the combination of sewing mechanism, a treadle, a cam operated thereby, locking means for said sewing mechanism, a lever on which said cam acts, and adjustable means for releasing said locking means by the movement of said lever, substantially as described.

114. In a button sewing machine, the combination of sewing mechanism, a cam operated thereby, locking means for said sewing mechanism, a lever having a roller on which said cam acts, means for releasing said locking means by the movement of said lever, and a pivoted arm acting as a stop to temporarily hold said cam when the treadle is moved, substantially as described.

115. In a button sewing machine, the combination of sewing mechanism, including a presser plate, means for lifting said presser plate, means for starting said sewing mechanism, and a lock for said lifting means, said starting means and lock being so connected as to operate together, substantially as described.

116. In a button sewing machine, the combination of sewing mechanism, winding mechanism, a lock for the winding mechanism, and a lever for starting said sewing mechanism, said lever acting also to start the winding mechanism on the stopping of the sewing mechanism, substantially as described.

117. In a button sewing machine, the combination of sewing mechanism, winding mechanism, a lock for the winding mechanism, and a lever for starting said sewing mechanism, said lever having a latch adapted to function with the lock of the winding mechanism when the sewing mechanism is unlocked, substantially as described.

118. In a button sewing machine, the combination of sewing mechanism, winding mechanism, a lock for said winding mechanism, and a lever for starting said sewing mechanism, said lever having a latch adapted to unlock the winding mechanism when the sewing mechanism stops, substantially as described.

119. In a button sewing machine, the combination of sewing mechanism, winding mechanism, a lock for said winding mechanism, a lever for starting said sewing mechanism, said lever having a latch engaging said lock to unlock the winding mechanism when the sewing mechanism stops, and means for disengaging said latch from the lock of the winding mechanism to stop said mechanism, substantially as described.

120. In a button sewing machine, the combination of sewing mechanism, winding mechanism, a lock for said winding mechanism, a lever for starting said sewing mechanism, said lever having a latch adapted to unlock the winding mechanism when the sewing mechanism stops, and means for engaging to said latch to unlock the winding mechanism when the sewing mechanism stops, substantially as described.

121. In a button sewing machine, the combination of sewing mechanism, winding mechanism, a lock for said winding mechanism, a lever for starting said sewing mechanism, said lever having a latch adapted to unlock the winding mechanism when the sewing mechanism stops, and means for disengaging said latch to unlock the winding mechanism when the sewing mechanism stops, said means including a cam having a projection and a lever adapted to be operated by said projection and having a pin engaging said latch, substantially as described.

122. In a button sewing machine, the combination of winding mechanism having a shaft provided with stops, a stop block having a pin coöperating with said stops, said block having an angle plate, a lever having a latch, and a lever having a pin adapted to push said latch away from said plate, substantially as described.

123. In a button sewing machine, the combination of sewing mechanism having a shaft provided with fast and loose pulleys thereon, winding mechanism having a shaft provided with fast and loose pulleys thereon, locking mechanisms for each of said shafts, including a belt shifter, and connections whereby when the sewing mechanism is stopped the belt is shifted from the fast to the loose pulley on its shaft and from the loose to the fast pulley on the shaft of the winding mechanism, substantially as described.

124. In a button sewing machine, the combination of sewing mechanism having a shaft provided with fast and loose pulleys thereon, winding mechanism having a shaft provided with fast and loose pulleys thereon, locking mechanisms for each of said shafts, including a belt shifter, and a lever for moving the belt from the fast to the loose pulley on the shaft of the sewing mechanism, and from the loose to the fast pulley on the shaft of the winding mechanism when the sewing mechanism is stopped, substantially as described.

125. In a button sewing machine, the combination of sewing mechanism having a shaft provided with fast and loose pulleys, a winding mechanism having a shaft provided with fast and loose pulleys, a belt shifter for said sewing mechanism, a spring normally acting on said belt shifter to shift the belt from the fast to the loose pulley on the shaft of the sewing mechanism, a lever for moving said belt shifter in the opposite direction, and connections whereby said lever is operated, substantially as described.

126. In a button sewing machine, the combination of sewing mechanism, winding mechanism, means for operating said mechanisms successively in the order named, and means operative during the sewing operation for preventing the operation of the winding mechanism, substantially as described.

127. In a button sewing machine, the combination of sewing mechanism, winding mechanism, means for operating said mechanisms successively in the order named, means operative during the sewing operation for preventing the operation of the winding mechanism, and devices for locking said last named means, substantially as described.

128. In a button sewing machine, the combination of sewing mechanism, winding mechanism, knot tying mechanism, means for operating said mechanisms successively in the order named, and means operative during the sewing operation for preventing the operation of the winding and knot tying mechanisms, substantially as described.

129. In a button sewing machine, the combination of sewing mechanism, winding mechanism, knot tying mechanism, means for operating said mechanisms successively in the order named, means operative during the sewing operation for preventing the operation of the winding and knot tying mechanisms, and devices for locking said last named means, substantially as described.

130. In a button sewing machine, the combination of sewing mechanism, winding mechanism, knot tying mechanism, cutting mechanism, means for operating said mechanisms successively in the order named, and means operative during the sewing operation for preventing the operation of the winding, knot tying and cutting mechanisms, substantially as described.

131. In a button sewing machine, the combination of sewing mechanism, winding mechanism, knot tying mechanism, cutting mechanism, means for operating said mechanisms successively in the order named, means operative during the sewing operation for preventing the operation of the winding, knot tying, and cutting mechanisms, and devices for locking said last named means, substantially as described.

132. In a button sewing machine, the combination of sewing mechanism, knot tying mechanism, operating means for said mechanisms, and means operable during the sewing operation for preventing the operation of the knot tying mechanism, substantially as described.

133. In a button sewing machine, the combination of sewing mechanism, knot tying mechanism, operating means for said mechanisms, means operable during the sewing operation for preventing the operation of the knot tying mechanism, and devices for locking said last named means, substantially as described.

134. In a button sewing machine, the combination of sewing mechanism, cutting mechanism, operating means therefor, and means operable during the sewing operation for preventing the operation of the cutting mechanism, substantially as described.

135. In a button sewing machine, the combination of sewing mechanism, cutting mechanism, operating means therefor, means operable during the sewing operation for preventing the operation of the cutting mechanism, and devices for locking said last named means, substantially as described.

136. In a button sewing machine, the combination of sewing mechanism, winding mechanism, operating means for said mechanisms, and means for starting said winding mechanism into operation at any time at will, substantially as described.

137. In a button sewing machine, the combination of sewing mechanism, winding mechanism, means for operating said mechanisms successively in the order named, and means operable by the user for starting the winding mechanism to repeat the winding operation, substantially as described.

138. In a button sewing machine, the combination of sewing mechanism, winding mechanism, and means for starting the winding mechanism at any time and for preventing the operation of said winding mechanism, substantially as described.

139. In a button sewing machine, the combination of sewing mechanism, winding mechanism, means for operating said mechanisms successively in the order named, and means for starting the winding mechanism at any time and for preventing the operation of said winding mechanism, substantially as described.

140. In a button sewing machine, the combination of sewing mechanism, winding mechanism, operating means for said mechanisms, a lever capable of three positions, the normal or inoperative position not affecting the winding mechanism, and connections whereby the movement of said lever in one direction starts said winding mechanism and the movement of said lever in the other direction prevents the operation of said winding mechanism, substantially as described.

141. In a button sewing machine, the combination of sewing mechanism, winding mechanism, knot tying mechanism, operating means for said mechanisms, a lever capable of three positions, the normal or inoperative position not affecting the winding and knot tying mechanisms, and connections whereby the movement of the lever in one direction starts the winding mechanism and in the other direction prevents the operation of the winding and knot tying mechanisms, substantially as described.

142. In a button sewing machine, the combination of sewing mechanism, winding mechanism, knot tying mechanism, cutting mechanism, means for operating said mechanisms successively in the order named, a lever capable of three positions, the normal or inoperative position not affecting the winding, knot tying and cutting mechanisms, and connections whereby the movement of the lever in one direction starts the winding mechanism and the movement of said lever in the other direction prevents the operation of the winding, knot tying, and cutting mechanisms, substantially as described.

143. In a button sewing machine, the combination of sewing mechanism, knot tying mechanism, operating means for said mechanisms, a lever capable of three positions, the normal or inoperative position not affecting the knot tying mechanism, and connections whereby the movement of said lever in one direction starts said knot tying mechanism and the movement of said lever in the other direction prevents the operation of said knot tying mechanism, substantially as described.

144. In a button sewing machine, the combination of sewing mechanism, cutting mechanism, operating means for said mechanisms, a lever capable of three positions, the normal or inoperative position not affecting the cutting mechanism, and connections whereby the movement of said lever in one direction starts said cutting mechanism and the movement of said lever in the other direction prevents the operation of said cutting mechanism, substantially as described.

145. In a button sewing machine, the combination of a cam case, guides therefor, and means for lifting said cam case, substantially as described.

146. In a button sewing machine, the combination of a cam case, guides therefor, means for partially counterbalancing the effect of gravity on said cam case, and means for lifting said cam case, substantially as described.

147. In a button sewing machine, the combination of a cam case provided with sleeves, guiding posts with which said sleeves engage, said posts being located in a line with the center of gravity of said case, supporting springs, and means for lifting said cam case, substantially as described.

148. In a button sewing machine, the combination of a cam case, guides therefor, winding mechanism carried thereby, and means for lifting said cam case and winding mechanism, substantially as described.

149. In a button sewing machine, the combination of a cam case, winding mechanism carried thereby, knot tying mechanism also carried thereby, and means for lifting said cam case and said mechanisms, substantially as described.

150. In a button sewing machine, the combination of a cam case, winding, knot tying, and cutting mechanisms carried thereby, and means for lifting said cam case, substantially as described.

151. In a button sewing machine, a button chuck including a supporting block, side jaws pivoted on said block, an end jaw pivoted on said block, said side jaws having holding faces inclined toward each other and the holding face of said end jaw, and springs operating on said jaws, whereby if a button is not pushed home against the end jaw, it is drawn in, against said end jaw, by the side jaws, substantially as described.

152. In a button sewing machine, a button chuck including a block, jaws pivotally mounted on said block, a screw for simultaneously adjusting all of said jaws and having a recessed head, and a spring having a projecting portion engaging said recessed head, substantially as described.

153. In a button sewing machine, a button chuck including a supporting block, jaws pivotally mounted on said block, means for adjusting said jaws, and a guard on one of said jaws, substantially as described.

154. In a button sewing machine, the combination of sewing mechanism, winding mechanism including a winder gear wheel and a winder guide hinged thereto, substantially as described.

155. In a button sewing machine, the combination of sewing mechanism, winding mechanism including a winder gear wheel and a winder guide hinged thereto, said gear wheel being provided with stops to limit the movement of said winder guide with reference to said gear wheel, substantially as described.

156. In a button sewing machine, the combination of sewing mechanism, winding mechanism including a winder gear wheel, a winder guide hinged to said gear wheel, and means for stopping the movement of said winder gear wheel, substantially as described.

157. In a button sewing machine, the combination of sewing mechanism, winding mechanism including a winder gear wheel, a winder guide hinged to said gear wheel, said gear wheel being provided with stops to limit the movement of said winder guide with reference to said gear wheel, and means for stopping the movement of said winder gear wheel, substantially as described.

158. In a button sewing machine, the combination of sewing mechanism, winding mechanism including a cam case having a perforated extension, a bushing secured in said extension, an annular gear wheel mounted on said bushing and having a downwardly extending portion carrying the winder spool, and a winder guide hinged to said gear wheel, substantially as described.

159. In a button sewing machine, the combination of sewing mechanism, winding mechanism including a winder gear wheel, a winder guide hinged to said gear wheel, and a spring normally tending to throw one end of said winder guide away from said gear wheel, substantially as described.

160. In a button sewing machine, the combination of sewing mechanism, winding mechanism including a winder gear wheel, a winder guide hinged thereto, a thread tube hinged to said winder guide at one end and supported by said gear wheel at the other end, a spring surrounding said tube, and stops to limit the movement of the winder guide with reference to the winder gear wheel, substantially as described.

161. In a button sewing machine, the combination of sewing mechanism, winding mechanism including a winder gear wheel, a winder guide hinged thereto, and means carried by said winder guide for keeping the thread taut during the knot tying operation, substantially as described.

162. In a button sewing machine, the combination of sewing mechanism, winding mechanism including a cam case having a perforated extension provided with an inclined portion, a winder gear wheel mounted in the perforation in said extension, a winder guide hinged to said gear wheel, and adapted to contact with said inclined portion when not under tension, substantially as described.

163. In a button sewing machine, the combination of sewing mechanism, winding mechanism including a cam case having a perforated extension, said extension having a curved inclined portion and a flat bottomed groove, a winder gear wheel, a winder guide hinged to said gear wheel, and having a roller adapted to engage said inclined part and to engage the bottom of said groove, substantially as described.

164. In a button sewing machine, the combination of sewing mechanism, winding mechanism including a winder gear wheel, means for operating it, and a brush carried thereby, substantially as described.

165. In a button sewing machine including a needle carrying a thread, the combination of holding means for the beginning end of the needle thread, a winder gear wheel, and cutters supported by said wheel to cut said needle thread to the proper length to be held by said holding means, substantially as described.

166. In a button sewing machine, the combination of sewing mechanism, winding mechanism including a winder gear wheel, means for operating it, and a brush and cutters carried by said gear wheel, substantially as described.

167. In a button sewing machine, the combination of sewing mechanism, winding mechanism including an annular winder gear wheel and a winder guide, winder spool, brush, and cutters carried thereby, substantially as described.

168. In a button sewing machine, the combination of sewing mechanism, winding mechanism including an annular winder gear wheel, a bushing supporting said gear wheel, a yoke and collar movably supported on said bushing, and a button chuck supported on said yoke, substantially as described.

169. In a button sewing machine, the combination of sewing mechanism, winding mechanism including an annular winder gear wheel, a bushing supporting said gear wheel, and a flanged yoke and collar movably supported on said bushing, said yoke being capable of movement in any direction in a horizontal plane, substantially as described.

170. In a button sewing machine, the combination of sewing mechanism, winding mechanism including a cam case, a winder gear wheel supported thereby, a winder guide hinged to said gear wheel, and an extension lever pivoted on said cam case, substantially as described.

171. In a button sewing machine, including sewing and winding mechanisms, the combination of a cam case, a winder gear wheel supported thereby, and an extension lever having a stop against which part of said winder gear wheel strikes to stop said wheel, substantially as described.

172. In a button sewing machine, the combination of sewing mechanism, an extension lever and an ejector for the severed end of the needle thread, operated by said lever, substantially as described.

173. In a button sewing machine, the combination of sewing mechanism, an extension lever, means for severing the needle thread, and an ejector for the severed end of the needle thread, operated by said lever substantially as described.

174. In a button sewing machine, the combination of sewing mechanism, driving means, an extension lever, means for severing the needle thread, and an ejector for the severed end of the needle thread, pivotally mounted on the goose neck of the machine and operated by said lever, substantially as described.

175. In a button sewing machine, the combination of sewing and winding mechanisms, an extension lever, cutting mechanism, and means operated by said lever to lock said cutting mechanism during the winding operation, substantially as described.

176. In a button sewing machine, the combination of sewing mechanism, an extension lever, cutting mechanism, and means to advance said cutting mechanism by the movement of said lever, substantially as described.

177. In a button sewing machine, the combination of sewing mechanism, an extension lever and cutting mechanism, said lever having means thereon to operate said cutting mechanism to sever the thread, substantially as described.

178. In a button sewing machine, the combination of sewing mechanism, an extension lever, cutting mechanism, said lever having means thereon for operating said cutting mechanism, and means to advance said cutting mechanism by the movement of said lever, substantially as described.

179. In a button sewing machine, the combination of sewing and winding mechanisms, an extension lever, spring retracted cutting mechanism, and means operated by said lever to lock said cutting mechanism during the winding operation, substantially as described.

180. In a button sewing machine, the combination of sewing mechanism, an extension lever, spring retracted cutting mechanism, and means to advance said cutting mechanism by the movement of said lever, substantially as described.

181. In a button sewing machine, the combination of sewing mechanism, an extension lever and spring retracted cutting mechanism, said lever being provided with means to operate said cutting mechanism, substantially as described.

182. In a button sewing machine, the combination of sewing mechanism, an extension lever, spring retracted cutting mechanism, said lever having means thereon for operating said cutting mechanism, and means for advancing said cutting mechanism by the movement of said lever, substantially as described.

183. In a button sewing machine, the combination of sewing mechanism, an extension lever, a hooked lever, and means for advancing said hooked lever by the movement of said extension lever, substantially as described.

184. In a button sewing machine, the combination of sewing mechanism, an extension lever, a hooked lever, means for advancing said hooked lever by the movement of said extension lever, and means for releasing said hooked lever, substantially as described.

185. In a button sewing machine, the combination of sewing mechanism, an extension lever, a spring retracted hooked lever, and means for advancing said hooked lever by the movement of said extension lever, substantially as described.

186. In a button sewing machine, the combination of sewing mechanism, an extension lever, a spring retracted hooked lever, means for advancing said hooked lever by the movement of said extension lever, and means for disengaging said hooked lever from said extension lever, substantially as described.

187. In a button sewing machine, the combination of sewing mechanism, an extension lever, cutting mechanism, a hooked lever, and connections whereby said extension lever locks the cutting mechanism and hooked lever, substantially as described.

188. In a button sewing machine, the combination of sewing mechanism, an extension lever, spring retracted cutting mechanism, a spring retracted hooked lever, and connections whereby said extension lever locks said cutting mechanism and said hooked lever, substantially as described.

189. In a button sewing machine, the combination of sewing mechanism, an extension lever, cutting mechanism, a hooked lever, and means for advancing said cutting mechanism and hooked lever by the movement of the extension lever, substantially as described.

190. In a button sewing machine, the combination of sewing mechanism, an extension lever, cutting mechanism, a hooked lever, said extension lever being provided with means for operating said cutting mechanism, and connections whereby said cutting mechanism and said hooked lever are advanced by the movement of said extension lever, substantially as described.

191. In a button sewing machine, the combination of sewing mechanism, an extension lever, cutting mechanism, a hooked lever, means for advancing said mechanism and said hooked lever by the movement of the extension lever, and means for disengaging said hooked lever from said extension lever, substantially as described.

192. In a button sewing machine, the combination of sewing mechanism, an extension lever, spring retracted cutting mechanism, a spring retracted hooked lever, means for advancing said cutting mechanism and hooked lever by the movement of said extension lever, and means for disengaging said hooked lever from said extension lever, substantially as described.

193. In a button sewing machine, the combination of sewing mechanism, cutting mechanism, a hooked lever, and a spring operated catch on said cutting mechanism engaging said hooked lever, substantially as described.

194. In a button sewing machine, the combination of sewing mechanism, spring retracted cutting mechanism, a spring retracted hooked lever, said cutting mechanism being provided with a spring catch engaging said hooked lever, and means for simultaneously operating said mechanism and said lever, substantially as described.

195. In a button sewing machine, the combination of sewing mechanism, spring retracted cutting mechanism, a spring retracted hooked lever, said cutting mechanism being provided with a spring operated catch engaging said hooked lever, means for simultaneously operating said mechanism and said lever, and a pin or post against which said catch strikes during the simultaneous movement of said mechanism and said lever to disengage said catch from said hooked lever, substantially as described.

196. In a button sewing machine, the combination of sewing mechanism, cutting mechanism, and a hooked lever having an extension adapted to strike said cutting mechanism, whereby said hooked lever is prevented from movement when the cutting mechanism is quiescent, substantially as described.

197. In a button sewing machine, the combination of sewing mechanism, spring retracted cutting mechanism and a spring retracted hooked lever having an extension adapted to strike said cutting mechanism and to prevent the operation of said lever except when said cutting mechanism is operated, substantially as described.

198. In a button sewing machine, the combination of sewing mechanism, cutting mechanism, a hooked lever adapted to strike said cutting mechanism, and means for simultaneously operating said cutting mechanism and said lever, substantially as described.

199. In a button sewing machine, the combination of sewing mechanism, cutting mechanism, a hooked lever provided with an extension adapted to strike said cutting mechanism, said cutting mechanism being provided with a spring operated catch adapted to strike said lever, and means for simultaneously operating said cutting mechanism and said lever, substantially as described.

200. In a button sewing machine, the combination of sewing mechanism, an extension lever having a slotted part, cutting mechanism, and a link pivotally mounted on said extension lever and entering said slot, substantially as described.

201. In a button sewing machine, the combination of sewing mechanism, an extension lever having a slotted part, pivotally mounted spring retracted cutting mechanism, and a link pivotally mounted on said cutting mechanism and engaging the slotted part of said extension lever, substantially as described.

202. In a button sewing machine, the combination of sewing mechanism, an extension lever provided with a roller, cutting mechanism provided with pivotally supported blades, said blades being operated by said roller to sever the thread, substantially as described.

203. In a button sewing machine, the combination of a presser plate, cutting mechanism including a pivoted lever, a pair of blades, one of said blades being pivotally mounted on said lever and the other of said blades being pivotally mounted on said first named blade, and a spring always tending to press one of said blades on said presser plate and to press said blades apart, substantially as described.

204. In a button sewing machine, the combination of a presser plate, cutting mechanism including a pivoted lever, a pair of blades, one of said blades being mounted on said lever and the other of said blades being mounted on said first named blade and adapted to slide on said presser plate, a spring always tending to force said blades apart, and a lever pivotally mounted on one of said blades and engaging the pivot axis between said blades, substantially as described.

205. In a button sewing machine, the combination of a presser plate, cutting mechanism including a pivoted lever provided with stops to limit its movement in both directions, a pair of blades, one of said blades being pivoted on said lever, and the other of said blades being loosely pivoted on said first named blade and adapted to slide on said presser plate, a lever pivoted on said first named blade and loosely engaging the pivot point of the second named blade, and a spring engaging said levers and normally tending to force one of said blades downwardly and the other upwardly, substantially as described.

206. In a button sewing machine, the combination of a presser plate, cutting mechanism including a pivoted lever provided with stops to limit its movement in both directions, a pair of blades, one of said blades being pivoted on said lever, and the other of said blades being loosely pivoted on said first named blade and adapted to slide on said presser plate, a lever pivoted on said first named blade and loosely engaging the pivot point of the second named blade, a spring engaging said levers and normally tending to force one of said blades downwardly and the other upwardly, and a second spring holding said blades in contact with each other, substantially as described.

207. In a button sewing machine, the combination of a presser plate, cutting mechanism including a pivoted lever provided with stops to limit its movement in both directions and an operating handle, a pair of blades, one of said blades being pivoted on said lever and the other of said blades being loosely pivoted on said first named blade and adapted to slide on said presser plate, a lever pivoted on said first named plate, and loosely engaging the pivot point of the second named blade, a spring engaging said levers and normally tending to force one of said blades downwardly and the other upwardly, and a second spring holding said blades in contact with each other, substantially as described.

208. In a button sewing machine, the combination of a presser plate, cutting mechanism including a pivoted lever provided with stops to limit its motion in both directions and an operating handle, said lever terminating in an enlarged head, a spring pressed latch pivotally mounted on said head, and a pair of blades pivotally supported by said head and adapted to slide on said presser plate, substantially as described.

209. In a button sewing machine, the combination of a presser plate, cutting mechanism including a pivoted lever provided with stops to limit its motion in both directions and an operating handle, said lever terminating in an enlarged head, a spring pressed latch pivotally mounted on said head, a pair of blades pivotally supported by said head, one of said blades being pivotally mounted in said head and the other of said blades being pivotally mounted on said first named blade and adapted to slide on said presser plate, and a spring for holding the blades in contact with each other, substantially as described.

210. In a button sewing machine, the combination of a presser plate, cutting mechanism including a lever provided with stops to limit its motion in both directions and an operating handle, said lever terminating at its lower end in an enlarged head, a spring pressed latch pivotally mounted on said head, a pair of cutting blades, one blade being pivotally mounted on said head and the other blade pivotally mounted on said first named blade and adapted to slide on said presser plate, a lever pivotally mounted on one of said blades and engaging the pivot point of the other of said blades, a spring one end of which is secured in said head and the other end of which is coiled around the pivot point between the two blades and enters a projection in said second named lever, and a second spring holding said blades in contact with each other, substantially as described.

211. In a button sewing machine, the combination of sewing mechanism, a pivoted lever terminating at its lower end in an expanded head, a pair of blades, one of which is pivotally mounted on said head, a pivot pin passing through said blade and screwed into said second blade, a lever loosely pivoted on said first named blade and having a slotted end loosely engaging the end of said pivot pin, a spring one end of which is secured in said head and the other end coiled around said pivot pin and passed through the end of said second named lever, and a second spring mounted on said pivot pin and tending to always press said blades together, substantially as described.

212. In a button sewing machine, the combination of sewing mechanism, cutting mechanism provided with a spring operated latch and a hook lever provided with a projection adapted to engage said latch, both of said levers being mounted on a common pivot pin, substantially as described.

213. In a button sewing machine, the combination of sewing and winding mechanisms, cutting mechanism including a lever provided with a latch, a hook lever for acting on the winding thread, provided with a projection engaging said latch, both of said levers being mounted on the same pivot and provided with stops to limit the movement thereof in both directions, and springs normally pressing said levers outwardly, said hook lever having a projecting portion adapted to engage the lever of the cutting mechanism, substantially as described.

214. In a button sewing machine, the combination of sewing mechanism, a pivot pin supported by the machine frame, spring retracted cutting mechanism, said cutting mechanism including a lever provided with a spring pressed latch, a hook lever provided with a projection engaging said latch, and a pin on the machine frame for engaging said latch and disconnecting said hook lever from the lever of the cutting mechanism, substantially as described.

215. In a button sewing machine including winding mechanism, the combination of a presser plate, a hooked lever adapted to slide on said presser plate for operating upon the winding thread, said lever being provided with an upright part pivotally mounted, and a second part secured thereon and provided with a plurality of hooks at its end, and a projection on one side, substantially as described.

216. In a button sewing machine including winding mechanism, the combination of a presser plate, a hooked lever adapted to slide on said presser plate for operating upon the winding thread, said lever being provided with an upright part pivotally mounted, and a second part secured thereon and provided with a plurality of hooks at its end, and a projection on one side, said upright portion being provided with forwardly extending projections, substantially as described.

217. In a button sewing machine including winding mechanism and a twister, the combination of a presser plate, a lever adapted to slide on said presser plate for operating upon the winding thread, including an upright portion pivotally mounted and provided with stops to limit its movement in either direction, a spring for normally moving the lower end of said upright portion outward, said upright portion being provided with forwardly extending projections, a second portion secured on said upright portion and provided with a plurality of hooks at one end, with an inclined cam face for opening the twister, and with a guiding projection near one end to keep said part in its proper relation to the twister, substantially as described.

218. In a button sewing machine including winding mechanism, the combination of a presser plate, a hooked lever adapted to slide on said presser plate for operating upon the winding thread, composed of an upright portion, a flat portion secured on said upright portion and provided with a plurality of hooks at one end, with an inclined cam faced projection at one side and with a projection on the other side, and a roller carried by the cam face to prevent the deflection of said hooked lever from its proper path, substantially as described.

219. In a button sewing machine, the combination of sewing and winding mechanisms, twisting mechanism provided with gripping means, a hooked lever for operating on the winding thread and provided with a cam, and connections operated by said cam to open said gripping means at the proper time, substantially as described.

220. In a button sewing machine, the combination of sewing and winding mechanisms, twisting mechanism provided with grippers, a hooked lever for operating on the winding thread, said lever being provided with a cam, and means for operating said grippers to release them by a movement in one direction of said hooked lever, and preventing the operation of said grippers by a movement of said hooked lever in the other direction, substantially as described.

221. In a button sewing machine, the combination of sewing and winding mechanisms, twisting mechanism having grippers, a hooked lever for operating on the winding thread and having a cam and connections, including a lever and a finger operated by said cam to open the grippers at the proper time, substantially as described.

222. In a button sewing machine, the combination of sewing and winding mechanisms, twisting mechanism having grippers, a hooked lever for operating on the winding thread and having a cam and connections, including a spring retracted lever and finger operated by said cam to open the grippers at the proper time, whereby said grippers are opened by the movement of said hooked lever in one direction and prevented from being opened by the movement of said lever in the opposite direction, substantially as described.

223. In a button sewing machine, the combination of driving means, a grooved cam operated by said driving means, a lever operated by said cam, an extension lever operated by said first named lever, and winding mechanism provided with a winder guide operated by said extension lever, substantially as described.

224. In a button sewing machine including winding mechanism, the combination of driving means, a grooved cam operated by said driving means, a lever operated by said cam, an extension lever operated by said first named lever, and cutting mechanism locked by said extension lever during the winding operation, substantially as described.

225. In a button sewing machine, the combination of driving means, a grooved cam operated by said driving means, a lever operated by said cam, an extension lever, connections between said levers, and winding mechanism provided with a winder guide and knot tying mechanism operated by said cam, substantially as described.

226. In a button sewing machine, the combination of driving means, a grooved cam operated by said driving means, a lever operated by said cam, an extension lever operated by said first named lever, and an ejector for the needle thread operated by said extension lever, substantially as described.

227. In a button sewing machine including winding mechanism, the combination of driving means, a grooved cam operated by said driving means, a lever operated by said cam, an extension lever operated by said first named lever, cutting mechanism operated by said extension lever, and mechanism for acting on the strands of the winding thread operated by said cutting mechanism, substantially as described.

228. In a button sewing machine including winding mechanism, the combination of driving means, a grooved cam operated by driving means, a lever operated by said said driving means, a lever operated by said cam, an extension lever operated by said first named lever, cutting mechanism operated by said extension lever, means for operating upon the winding thread strands, said means being operated by said cutting mechanism, and devices for releasing said last named means, substantially as described.

229. In a button sewing machine, the combination of driving means provided with a worm, a grooved cam provided with teeth engaging said worm, a lever driven by said cam, an extension lever operated by said first named lever, winding mechanism including a winder guide adapted to be struck by a part of said extension lever, spring retracted cutting mechanism operated by said extension lever, spring retracted means for operating on the strands of the winding thread after the knot is tied, said means being operated by the cutting mechanism, and devices for disengaging said last named means from said cutting mechanism, substantially as described.

230. In a button sewing machine, the combination of driving means, a grooved cam driven thereby, a lever having a toothed sector driven by said cam, a shaft provided with a gear wheel at each end, twisting mechanism provided with a gear wheel meshing with said last named gear wheel, a sleeve surrounding said shaft, knotting mechanism carried by the sleeve, and means including a spring pressed ball for causing the twisting mechanism to always stop at the same point relative to the knotting mechanism, substantially as described.

231. In a button sewing machine, the combination of sewing mechanism, winding mechanism and driving means therefor to cause said winding mechanism to move slowly at first and then rapidly, thereby preventing the breaking of the thread, substantially as described.

232. In a button sewing machine, the combination of sewing mechanism, winding mechanism, driving mechanism therefor, adapted to drive said winding mechanism directly and rapidly at the end of the winding operation, and devices for driving said winding mechanism slowly and indirectly from said driving means at the beginning of the operation, substantially as described.

233. In a button sewing machine, the combination of sewing mechanism, driving mechanism, winding mechanism, a cam operated by said driving mechanism, an intermediate shaft provided with a clutch, and means driven by said cam for operating said clutch, whereby said winding mechanism will be driven slowly by the operation of said cam at the beginning of the winding operation and then rapidly and directly by said driving means, substantially as described.

234. In a button sewing machine, the combination of sewing mechanism, driving means, a grooved cam driven thereby, winding mechanism, an intermediate shaft provided with a clutch, indicating means operated by said cam for stopping the winding operation when the required number of turns has been made, and connections whereby the movement of said indicating means shifts said clutch, whereby the winding mechanism is driven slowly by said cam at the beginning of the winding operation and then rapidly and directly by said driving means, substantially as described.

235. In a button sewing machine, the combination of sewing mechanism, driving means, a grooved cam driven thereby, winding mechanism, an intermediate shaft provided with a clutch, adjustable indicating means operated by said cam for stopping the winding operation when the required number of turns has been made, and connections whereby the movement of said indicating means shifts said clutch, whereby the winding mechanism is driven slowly by said cam at the beginning of the winding operation and then rapidly and directly by said driving means, substantially as described.

236. In a button sewing machine, the combination of winding mechanism for the neck of thread, including a winder guide, knot tying mechanism, and means for causing said winder guide to pass outside the knot tying mechanism during the operation of knot tying, substantially as described.

237. In a button sewing machine, the combination of winding mechanism, including a winder guide, knot tying and cutting mechanisms, and means for causing said winder guide to pass outside of the knot tying mechanism during the operations of knot tying and cutting, substantially as described.

238. In a button sewing machine, the combination of button holding means, winding mechanism, including a winder guide, knot tying mechanism, and means for causing said winder guide to pass between said button holding means and said knot tying mechanism during the winding operation, and outside of said knot tying mechanism during the knot tying operation, substantially as described.

239. In a button sewing machine, the combination of button holding means, winding mechanism, including a winder guide, knot tying mechanism, cutting mechanism, and means for causing said winder guide to pass between said button holding means and said knot tying mechanism during the winding operation, and to pass outside of said knot tying mechanism during the knot tying and cutting operations, substantially as described.

240. In a button sewing machine, the combination of sewing mechanism, winding mechanism, knot tying mechanism, including means for making a loop in the winding thread, and means for holding each strand of said loop under tension, substantially as described.

241. In a button sewing machine, the combination of sewing mechanism, winding mechanism, knot tying mechanism, including means for making a loop in the winding thread, and means for holding one strand of said loop under frictional tension and the other strand under spring tension, substantially as described.

242. In a button sewing machine, the combination of twisting mechanism provided with a slot, winding mechanism provided with a winder guide hinged thereto, and means for causing said winder guide to place the ending strand of the winding thread in the slot of the twister to form the first loop of the knot, substantially as described.

243. In a button sewing machine, the combination of twisting mechanism, provided with a slot, winding mechanism, including a winder guide hinged thereto, and means for causing said winder guide to place the ending strand of the winding thread in the slot of the twister to form the first loop and to repeat the operation to form the second loop, substantially as described.

244. In a button sewing machine, including cutting mechanism, the combination of twisting mechanism provided with a slot, winding mechanism provided with a winder guide hinged thereto, and means for causing said winder guide to place the ending strand of the winding thread in the slot of the twisting mechanism to form the first loop, to repeat this operation to form the second loop, and to repeat this operation before the cutting operation, substantially as described.

245. In a button sewing machine, the combination of twisting mechanism, winding mechanism, including a winder guide, a spring pressed horn, and means for causing said winder guide to pass the beginning end of the winding thread into the twister over said spring pressed horn, substantially as described.

246. In a button sewing machine, the combination of knot tying mechanism including a twister having a slot adapted to receive the winding thread, means for cutting said winding thread, and winding mechanism provided with a winder guide which passes the ending strand of the winder thread into the slot of the twister, substantially as described.

247. In a button sewing machine, the combination of knot tying mechanism provided with a slot, winding mechanism provided with a winder guide which passes the ending strand of the winding thread into the slot of the twister, a spring retracted hooked lever, and means for advancing said hooked lever into operative relation with the strands of the winding thread, substantially as described.

248. In a button sewing machine, the combination of knot tying mechanism provided with a slot, winding mechanism provided with a winder guide which passes the ending strand of the winding thread into the slot of the twister, a spring retracted hooked lever, means for advancing said hooked lever into operative relation with the strands of the winding thread, and devices for releasing said hooked lever, substantially as described.

249. In a button sewing machine, the combination of sewing mechanism, winding mechanism and knot tying mechanism, the latter including an automatic clamp for holding the winding thread during the knot tying operation, said clamp comprising a slotted frame undercut at one end and slotted to receive the gripping jaws, a slotted chamfered tube fitting over and against said frame, and pivotally mounted gripping jaws in said frame, substantially as described.

250. In a button sewing machine, the combination of sewing mechanism, winding mechanism, knot tying mechanism, cutting mechanism, and means for simultaneously throwing said winding, knot tying and cutting mechanisms out of operation when desired, substantially as described.

251. In a button sewing machine, the combination of sewing mechanism including button holding means, winding mechanism, knot tying mechanism, cutting mechanism, and means for vibrating said button holding means independently of said mechanisms, substantially as described.

In testimony whereof, I affix my signature.

JOHN W. DARLEY, Jr.